(12) United States Patent
Eshraghi et al.

(10) Patent No.: US 11,194,016 B2
(45) Date of Patent: Dec. 7, 2021

(54) DIGITAL FREQUENCY MODULATED CONTINUOUS WAVE RADAR USING HANDCRAFTED CONSTANT ENVELOPE MODULATION

(71) Applicant: UHNDER, INC., Austin, TX (US)

(72) Inventors: Aria Eshraghi, Austin, TX (US);
Curtis Davis, St. Louis, MO (US);
Murtaza Ali, Cedar Park, TX (US);
Paul Dent, Pittsboro, NC (US)

(73) Assignee: Uhnder, Inc., Austin, TX (US)

( * ) Notice: Subject to any disclaimer, the term of this patent is extended or adjusted under 35 U.S.C. 154(b) by 300 days.

(21) Appl. No.: 16/259,379

(22) Filed: Jan. 28, 2019

(65) Prior Publication Data

US 2019/0154796 A1  May 23, 2019

Related U.S. Application Data

(63) Continuation of application No. 15/953,826, filed on Apr. 16, 2018, now Pat. No. 10,191,142, which is a
(Continued)

(51) Int. Cl.
*G01S 7/35* (2006.01)
*G01S 13/931* (2020.01)
(Continued)

(52) U.S. Cl.
CPC .............. *G01S 7/352* (2013.01); *G01S 7/282* (2013.01); *G01S 13/325* (2013.01); *G01S 13/87* (2013.01);
(Continued)

(58) Field of Classification Search
CPC .... G01S 7/352; G01S 7/282; G01S 2007/358; G01S 13/87; G01S 13/325
See application file for complete search history.

(56) References Cited

U.S. PATENT DOCUMENTS 1,882,128 A  10/1932  Fearing
3,374,478 A   3/1968  Blau
(Continued)

FOREIGN PATENT DOCUMENTS

EP  0725480   11/2011
EP  2374217    4/2013
(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Marcus E Windrich
(74) *Attorney, Agent, or Firm* — Gardner Linn

(57) ABSTRACT

A radar system for mobile applications includes transmitters and receivers. The transmitters are configured for installation and use in a mobile application. Each of the transmitters is configured to generate a radio signal. The receivers are configured for installation and use in the mobile application. Each of the receivers is configured to receive radio signals that include transmitted radio signals transmitted by the transmitters and reflected from objects in the environment. A first transmitter of the transmitters is configured to frequency modulate the transmitted radio signal using a shaped frequency pulse which is defined by a sequence of chips. The sequence of chips is selected to realize a selected frequency pulse shape.

20 Claims, 37 Drawing Sheets

Related U.S. Application Data continuation of application No. 15/492,159, filed on Apr. 20, 2017, now Pat. No. 9,945,935.

(60) Provisional application No. 62/469,165, filed on Mar. 9, 2017, provisional application No. 62/382,857, filed on Sep. 2, 2016, provisional application No. 62/327,003, filed on Apr. 25, 2016.

(51) Int. Cl.
  *G01S 7/282* (2006.01)
  *G01S 13/32* (2006.01)
  *G01S 13/87* (2006.01)

(52) U.S. Cl.
  CPC .......... *G01S 13/931* (2013.01); *G01S 7/358* (2021.05); *G01S 2013/9316* (2020.01); *G01S 2013/93271* (2020.01); *G01S 2013/93272* (2020.01)

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,896,434 A * | 7/1975 | Sirven | G01S 13/24 342/132 |
| 4,078,234 A | 3/1978 | Fishbein et al. | |
| 4,176,351 A * | 11/1979 | DeVita | G01S 13/584 342/111 |
| 4,566,010 A | 1/1986 | Collins | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,376,939 A | 12/1994 | Urkowitz | |
| 5,379,322 A | 1/1995 | Kosaka et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,691,724 A | 11/1997 | Aker et al. | |
| 5,712,640 A | 1/1998 | Andou | |
| 5,724,041 A * | 3/1998 | Inoue | G01S 7/285 342/70 |
| 5,847,661 A | 12/1998 | Ricci | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A * | 9/1999 | Aoyagi | G01S 13/42 342/70 |
| 5,970,400 A | 10/1999 | Dwyer | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,396,436 B1 * | 5/2002 | Lissel | G01S 13/34 342/104 |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,888,491 B2 | 5/2005 | Richter | |
| 6,975,246 B1 | 12/2005 | Trudeau | |
| 7,119,739 B1 | 10/2006 | Struckman | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 * | 12/2008 | Nishijima | G01S 7/03 342/175 |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 * | 7/2009 | Fukuda | G01S 7/352 342/145 |
| 7,567,204 B2 | 7/2009 | Sakamoto | |
| 7,609,198 B2 | 10/2009 | Chang | |
| 7,642,952 B2 * | 1/2010 | Fukuda | G01S 7/35 342/175 |
| 7,663,533 B2 | 2/2010 | Toennesen | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 * | 12/2010 | Negoro | H04B 1/707 342/195 |
| 7,859,450 B2 * | 12/2010 | Shirakawa | G01S 13/325 342/147 |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,154,436 B2 | 4/2012 | Szajnowski | |
| 8,212,713 B2 | 7/2012 | Aiga et al. | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 8,994,581 B1 | 3/2015 | Brown | |
| 9,121,943 B2 | 9/2015 | Stirlin-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,400,328 B2 | 7/2016 | Hsiao et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,720,080 B1 | 9/2017 | Rodenbeck | |
| 9,753,121 B1 | 9/2017 | Davis | |
| 9,753,132 B1 | 9/2017 | Bordes et al. | |
| 9,772,397 B1 | 9/2017 | Bordes et al. | |
| 9,791,551 B1 | 10/2017 | Eshraghi et al. | |
| 9,791,564 B1 | 10/2017 | Harris et al. | |
| 9,806,914 B1 | 10/2017 | Bordes et al. | |
| 9,829,567 B1 | 11/2017 | Davis et al. | |
| 9,846,228 B2 | 12/2017 | Davis et al. | |

(56) References Cited

U.S. PATENT DOCUMENTS

| | | |
|---|---|---|
| 9,869,762 B1 | 1/2018 | Alland et al. |
| 9,989,627 B2* | 6/2018 | Eshraghi ............... G01S 13/347 |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1* | 8/2007 | Okai ............... G01S 13/222 342/70 |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1* | 3/2009 | Inoue ............... G01S 13/325 342/70 |
| 2009/0074031 A1 | 3/2009 | Fukuda |
| 2009/0079617 A1 | 3/2009 | Shirakawa et al. |
| 2009/0085827 A1 | 4/2009 | Grime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0039313 A1* | 2/2010 | Morris ............... G01S 7/006 342/25 F |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1* | 11/2010 | Ando ............... G01S 7/4008 342/70 |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |

(56) References Cited

U.S. PATENT DOCUMENTS

| | | |
|---|---|---|
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1 | 6/2016 | Oka et al. |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS, "in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

\* cited by examiner

FIGURE 5: Transmitter Architecture for implementing the invention

Parameter variation with receiver BT on a finer dB scale

Comparison of the spectrum of the waveforms of 6 and 13

Correlation of the handcrafted waveform of figure 17

Eye diagram after waveform handcrafting

Improved spectrum of the handcrafted waveform of figure 17

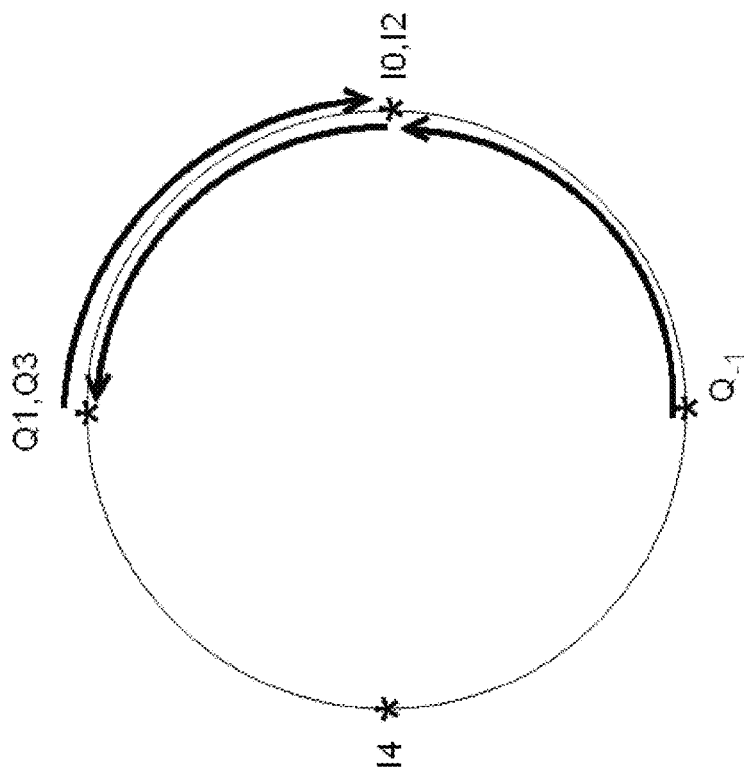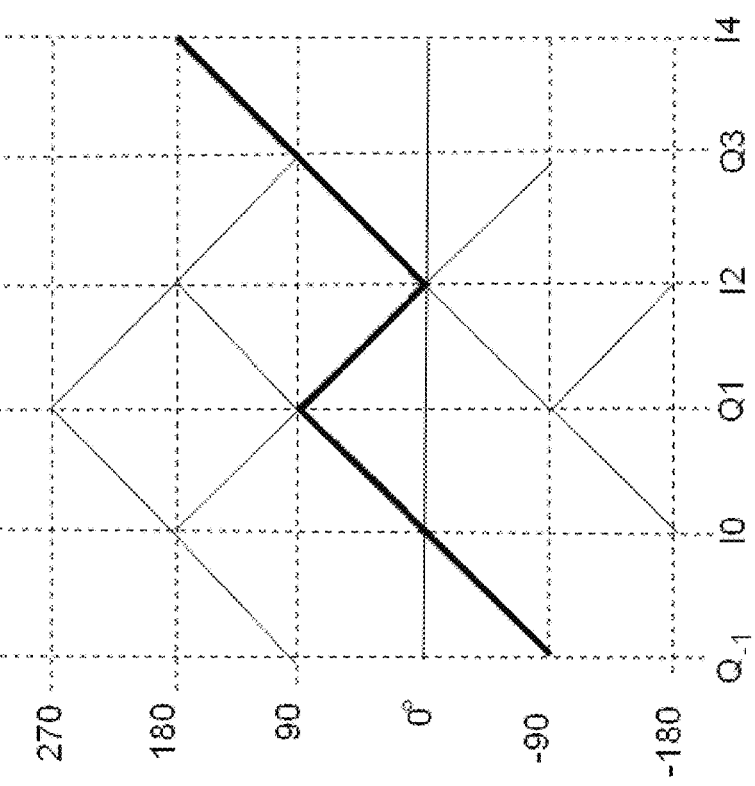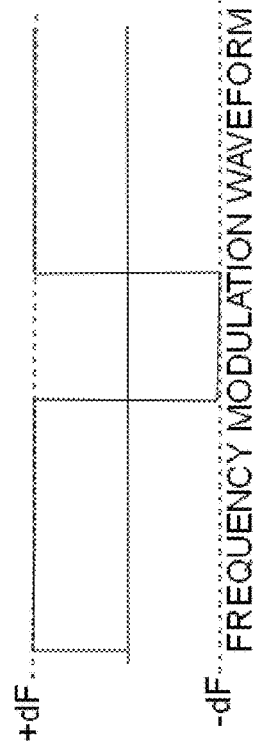
FIG. 19

Eye diagram of MSK computed using 16 samples per chip

Spectrum of unfiltered MSK

Correlation function of MSK versus the number samples per chip

Eye Diagram for Raised Cosine Digital FM

Eradicated sidelobe skirts by waveform handcrafting (MSK with 8 samples/chip)

Variation of parameters with receiver BT for Raised Cosine transmitter modulation Parameters of figure 30 on a finer dB scale FIG. 34: Flow chart for simulating the modulation One possible Eye Diagram for 4 samples per bit Correlation sidelobes for the signals of figures 35 and 36

DIGITAL FREQUENCY MODULATED CONTINUOUS WAVE RADAR USING HANDCRAFTED CONSTANT ENVELOPE MODULATION

CROSS REFERENCE TO RELATED APPLICATIONS

The present application is a continuation of U.S. patent application Ser. No. 15/953,826, filed Apr. 16, 2018, now U.S. Pat. No. 10,191,142, which is a continuation of U.S. patent application Ser. No. 15/492,159, filed Apr. 20, 2017, now U.S. Pat. No. 9,945,935, which claims the filing benefits of U.S. provisional applications, Ser. No. 62/469,165, filed Mar. 9, 2017, Ser. No. 62/382,857, filed Sep. 2, 2016, and Ser. No. 62/327,003, filed Apr. 25, 2016, which are all hereby incorporated by reference herein in their entireties.

FIELD OF THE INVENTION

The present invention is directed to radar systems, and more particularly to radar systems for vehicles.

BACKGROUND

The use of radar to determine range and velocity of objects in an environment is important in a number of applications including automotive radar and gesture detection. A radar system typically transmits a signal and listens for the reflection of the signal from objects in the environment. By comparing the transmitted signal with the received signal, a radar system can determine the distance to an object. Using multiple transmissions, the velocity of the object can be determined. Moreover, using multiple transmitters and receivers, the location (angle) of the object can also be determined.

There are several types of waveforms used in different types of radar systems. One type of waveform or radar signal is known as a frequency-modulated continuous waveform (FMCW). In an FMCW-type radar system, the transmitter of the radar system sends a continuous signal in which the frequency of the signal varies. This is sometimes called a chirp radar system. Mixing (multiplying) a waveform reflected from an object (also known as a target) with a replica of the transmitted signal results in a CW signal with a frequency that represents the distance between the radar transmitter/receiver and the target. By sweeping up in frequency and then down in frequency, the Doppler frequency can also be determined.

There is a continuous need for improved radar techniques that achieve good range performance without excessive transmitter power, which permit multiple users to share the spectrum, and which achieve an improved tradeoff between instantaneous bandwidth occupancy and range resolution.

SUMMARY

An FMCW radar system comprises one or more constant envelope transmitters for transmitting radio signals that are frequency modulated. The frequency modulation uses codes to deviate the frequency from a mean or center frequency according to one of a limited number of shaped frequency transitions associated with a limited number of successive codes. The codes of each transmitter are different and preferably exhibit low cross-correlation. In one exemplary implementation, for each transmitter, the frequency modulated signal may be produced by expressing the frequency modulation as a sequence of generated I and Q baseband vectors that are dependent on the limited number of successive codes and which have a constant envelope property where $I^2+Q^2$ is a constant, for example, unity. The values are modulated on to a microwave carrier frequency for transmission by the radar transmitting antenna, for example by using an I,Q modulator. The I and Q waveforms are precomputed to depend on a limited number (N) of successive bits of a code, for example, 2 or 3 bits, and the precomputed waveforms are stored in a memory as numerical values. A plurality of I,Q values are stored in memory for each possible pattern of the N successive bits and a state variable indicative of the phase quadrant. The plurality of values are read from the memory sequentially for each new value of a code bit, the memory being addressed by the new bit, N−1 previous bits and the state variable. Each plurality of the I,Q values is engineered to obtain an optimum compromise between a number of often conflicting criteria, including compliance with a spectral mask, range resolution, the ease or difficulty of discriminating weak targets from close by strong targets, and correlation loss with target echo delays of a non-integral number of bit periods.

For operating at very high digital code rates, the memory is organized as a plurality of N memories that are read at the code rate divided by N. Each pair of read I,Q values is digital to analog converted using a D to A converter that shapes the quantizing noise to reduce its spectral density near the microwave carrier frequency, and low-pass filtered to obtain analog I,Q signals that are applied to the I,Q modulator.

In an aspect of the present invention, a radar system for a vehicle includes a transmitter and a receiver. The transmitter transmits an amplified and frequency modulated radio signal. Each transmitter comprises a frequency generator, a code generator, a modulator, a constant-envelop power amplifier, and an antenna. The frequency generator is operable to or configured to generate the radio signal with a desired mean or center frequency. The code generator is operable to or configured to generate a sequence of chips at a selected chiprate. A modulation interval between successive chips is a reciprocal of the chiprate. The modulator frequency is operable to or configured to modulate the radio signal such that the frequency modulation comprises shaped frequency pulses. The shaped frequency pulses correspond to a first signal, the frequency of which deviates from the desired mean or center frequency during each of the modulation intervals according to a selected pulse shape. The constant-envelope power amplifier amplifies the frequency modulated radio signal at a desired transmit power level. The antenna transmits the radio signal.

These and other objects, advantages, purposes and features of the present invention will become apparent upon review of the following specification in conjunction with the drawings.

BRIEF DESCRIPTION OF THE DRAWINGS

FIG. 19 is a set of graphs illustrating trellis and constellation diagrams in accordance with the present invention;

DETAILED DESCRIPTION

Figure 1:
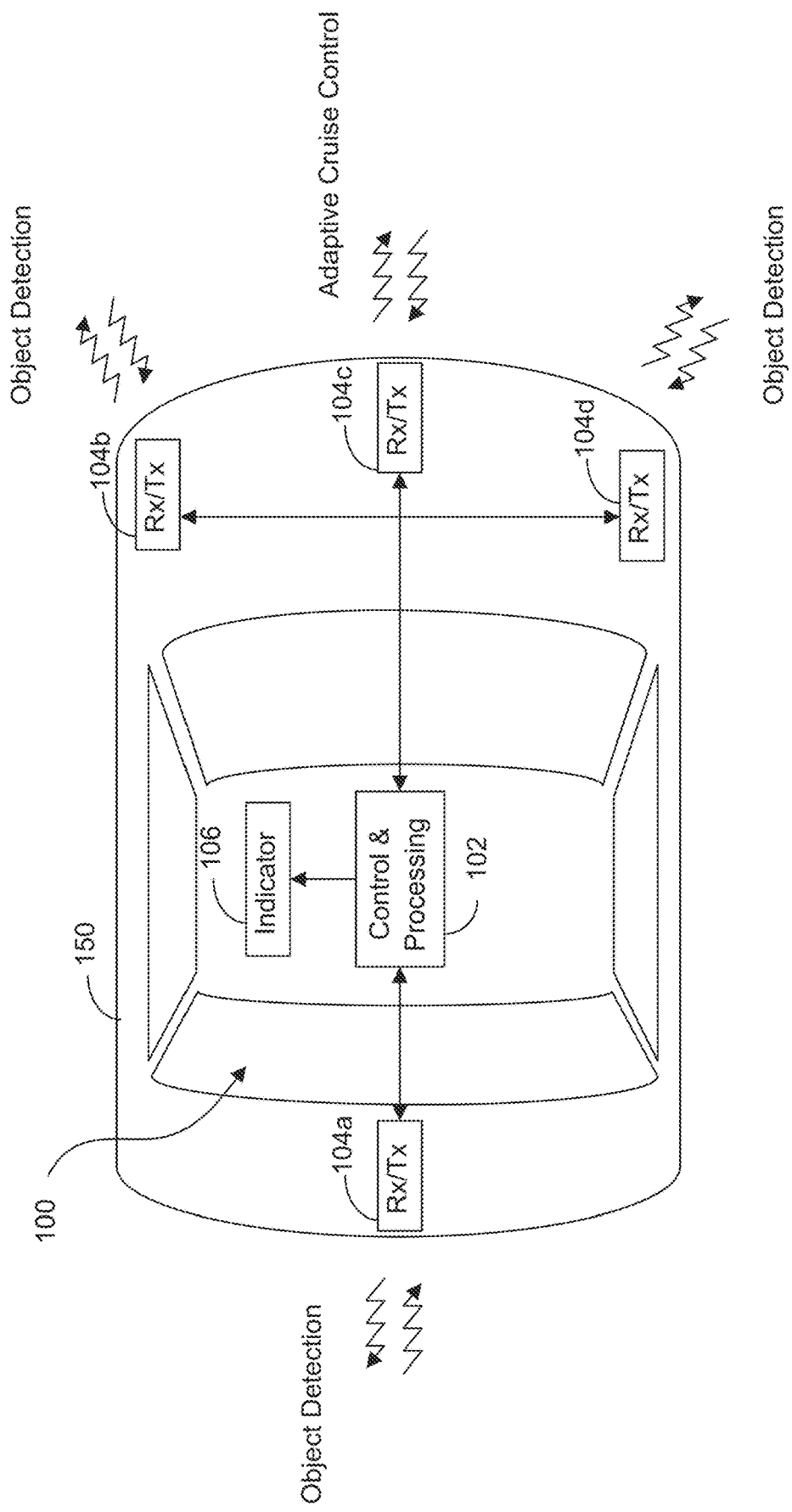
FIG. 1 is a plan view of an automobile equipped with one or more radar systems in accordance with the present invention.

The present invention will now be described with reference to the accompanying figures, wherein numbered elements in the following written description correspond to like-numbered elements in the figures. Methods and systems of the present invention may achieve a good performance range without excessive transmitter power requires and provide improved tradeoffs between instantaneous bandwidth occupancy and range resolution, through the use of constant envelope transmitter amplifiers and frequency modulation using smoothly shaped frequency deviation pulses.

Small, low-cost radar systems are increasingly becoming of interest for motor vehicle collision avoidance applications. National frequency management authorities such as the FCC in the USA have made available certain frequency bands in the millimeter wave region for this purpose, for example the frequency band 76 to 77 GHz and the band 81 to 86 GHz.

Automobile radar systems become of greater utility the greater the object resolution achieved in ultimately the three dimensions of range, azimuth and elevation, as well as in Doppler shift, which indicates relative velocity of a target object. An ultimate goal is object recognition and hazard detection using the radar data, possibly in fusion with video data, map databases, and GPS positioning.

As with communications systems such as cellular phones, the frequency band has to be shared by many users without unacceptable mutual interference, so the same concerns of multiple access efficiency, spectral efficiency and capacity arise, in terms of the number of devices per square kilometer that can be simultaneously operated. Through generations 1, 2, 3 and 4 of mobile phone systems, many different techniques of modulation and coding have been explored to optimize capacity, including Frequency Division Multiple Access (FDMA), Time Division Multiple Access (TDMA), Code Division Multiple Access (CDMA) also known as Direct Sequence Spread Spectrum (DSSS) and Frequency Hopping Spread Spectrum (FHSS). Many different modulation methods have also been explored, including Analog Frequency Modulation (FM), Digital frequency modulation, such as GSM's Gaussian Minimum Shift Keying (GMSK), and all the usual digital phase modulation schemes such as Quadrature Phase Shift Keying (QPSK), Offset QPSK (OQPSK), Quadrature Amplitude modulation (QAM, 16QAM, etc.), and latterly Orthogonal Frequency Division Multiplexing (OFDM).

In communications systems operating in the lower microwave frequencies (900 MHz to L-band) and higher (S-band to 2400 MHz), multipath propagation has increasingly become a problem. For example, transistor frequency performances have increased to the point where radio devices can be made economically at much higher frequencies than before. However, signals at shorter wavelengths are reflected by smaller objects, and such delayed reflections distort digital transmission, causing intersymbol interference (ISI). Higher frequency digital cellular communication only became possible through the use of advanced digital signal processing algorithms that could correctly decode information distorted by ISI. Research into such techniques remains the dominant subject of wireless communications and resulted in the most recent shift to OFDM.

Unlike communications systems where multiple, differently-delayed reflections are a nuisance, in radar systems, the delayed reflections are the wanted information. Also in contrast with communications systems, except in bistatic radar systems, the signal reflected from an object or target and processed by a radar receiver has originated in the radar's own transmitter, which may be in intimate proximity to the receiver. Thus, the receiver can use information on exactly what was transmitted, and when, to aid in analyzing the received signal, and to determine the delays of target echoes which indicate their range.

There are several different types of radar systems. The most well-known is pulse radar, in which a very short pulse of very high power microwave energy is transmitted during which time the receiver is blanked to prevent overload or damage; then the receiver is unblanked and listens for echoes received with various delays. The length of time the receiver can listen before the next transmitter pulse equates to the maximum range. The antenna may rotate between pulses to test for reflecting objects at different azimuths or elevations or both.

A less common variation of the above is the bistatic radar system in which the transmitter is not co-located with the receiver and uses a totally different antenna. The receiver thereby does not need to be blanked during the transmit pulse.

In pulse radar systems, the transmitter duty factor and therefore the mean power is small; therefore, to achieve enough sensitivity for long range performance a high peak pulse power must be used. To overcome that, another type of radar called continuous wave (CW) radar is used. A CW radar transmits and receives all the time. The transmitted signal has features in its waveform that enable the receiver to determine the delay of a received signal by determining the time difference between the transmitted feature and the received feature. In FMCW-type radar systems, the feature used is the instantaneous frequency. The transmitter frequency is changed linearly and very rapidly from a starting value to an ending value to create what is known as a chirp. A delayed signal will be received at an earlier value of the chirp frequency. By forming a beat between the transmit frequency and the received frequency in the receive mixer, and determining the beat frequency, which is the transmit-receive frequency difference, the delay of the reflected chirp can be calculated. Because such a frequency difference cannot be distinguished from Doppler, a forward and backward chirp may be used alternately, producing a sawtooth frequency modulation. Any Doppler has opposite effect on interpreting the forward chirp compared to the backward chirp, thus allowing range and Doppler to be separated. In FMCW radar systems, one issue is the extreme accuracy and linearity needed for the chirp signal. The greatest issue in CW radar is receiving at the same time as transmitting. The transmitted signal is much stronger than any received echo and can overload the receiver's limited dynamic range.

Another version of CW radar called pulse-CW radar aims to reduce the difficulty of receiving weak echoes from distant objects in the presence of the strong own transmitter signal. This is similar to pulse radar except that the transmitter duty factor is much higher, for example 50%. A modulated transmit pulse is transmitted for a duration that fills up the time to the furthest object and then switches off. Meanwhile, the receiver attempts to receive strong echoes from nearby objects while the transmitter is transmitting, but when receiving weak later echoes from distant objects, the transmitter has already switched off, facilitating their detection. Improving near-far performance in radar systems is described in detail in U.S. patent application, Ser. No. 15/292,755, filed Oct. 13, 2016 ("the '755 patent"), which is hereby incorporated by reference herein in its entirety.

In the following disclosure, digital codes are sometimes referred to as comprising a bit sequence and sometimes as comprising a chip sequence. The terms "chips" and "bits" are used interchangeably herein, and mean binary valued quantities. The binary values are 0 or 1 in Boolean notation or +1 and −1 in numerical notation. They may also be abbreviated to just + and − signs. The term "symbols" is also known, and may apply to binary values or multi-valued quantities selected from a finite alphabet. When a multi-valued quantity can exhibit $2^N$ different values, it can also be equated with N binary values or bits. Therefore, it should be understood that grouping a number of bits into a multi-valued symbol and describing a system in terms of symbols rather than bits or chips does not represent a significant technical departure from the teachings herein. Also, while the invention is described in terms of waveforms that have four principal constellation points of +/−90 degrees and 0/180 degrees, a person of normal skill in the art would be able to produce variations using the teachings herein that used higher order constellations such as 8-PSK or MFSK. Hereinafter, the invention shall be described in terms of binary bits or chips, but the scope of the invention encompasses all such variations as may be made by a person of normal skill in the art and described by the attached claims.

The invention is described primarily for use in a digital FMCW radar in which transmission and reception occur simultaneously at a same site. However, the modulation is also useful in digital FM radars that do not necessarily transmit and receive at the same time, but rather alternately. Hybrid radars can also be made in which transmission and reception are simultaneous for a first period and then the transmitter switches off to allow the receiver to receive weak, late echoes without strong interference from the local transmitter, as discussed in the '755 patent.

All such references to digital FMCW radar therefore, especially in the claims, shall also be interpreted to encompass the above variations, unless explicitly limited by appropriate wording.

In all radar systems, the distance resolution is ultimately related to the width of the autocorrelation function of the transmitted signal. Advanced algorithms such as Multiple Signal Classification (MUSIC) allow resolution less than, but still related to the width of the autocorrelation function.

The power spectrum is the Fourier transform of the autocorrelation function and so has a spectral occupancy inversely proportional to the range resolution. When a signal with certain spectrum S(jw) is transmitted and received with a matched filter H(jw) that has the conjugate frequency response to that of the transmit spectral shaping, namely H(j(w)=S(−jw), the output has a spectrum that is shaped by the product of the transmit shaping and its conjugate at the receiver, namely by S(jw)S(−jw)=|S(jw)|$^2$, which is the power spectrum shape, and thus has a correlation function equal to the autocorrelation function of the transmitted signal. However, in a practical realization, the receiver does not necessarily receive the transmitted signal with a matched filter, so deviations in the relationship between range resolution and signal autocorrelation function may arise. In that case, the correlation curve exhibited when the receiver correlates a received signal with a transmitted chip sequence that is received with various delays must be computed versus the delay for each case, and is herein termed the correlation function. With small delays of plus or minus two or three chips, the shape of the correlation function mimics the impulse response of the entire channel that exists between the transmitter's code generator and the point at which the received signal is extracted into the correlator. For large relative shifts of many chips or bits, the correlation function will exhibit the autocorrelation function of the digital code chosen. It is well known that Maximum Length Sequences exhibit autocorrelation functions that only have one large peak, and all sidelobes are at a level relative to the peak of −1/N, where N is the length of the code. If they can be used, this autocorrelation property is a desirable one for radar systems.

As noted above, FMCW radar typically used chirp signals to determine range and Doppler.

A digital FMCW radar on the other hand transmits an RF signal which is frequency modulated with a digital code sequence to produce a transmitted signal that has good autocorrelation properties that facilitate range resolution while exhibiting good spectral containment. One type of frequency modulation that appears to have interesting properties in this regard is minimum shift keying (MSK). In MSK, the frequency is changed between two values spaced at plus and minus one quarter (¼) the chiprate (=bitrate) from the carrier, with the result that the phase, which is the integral of frequency deviation, changes by +/− quarter (¼) of a cycle over each bit or chip. Thus, at the end of each chip, the signal vector lies at one of two diametrically opposite points along a line at right angles to the prior signal vector position. MSK is related to Offset QPSK in that the signal vector for even bits ends up at +/−1 while the signal vector for odd bits ends up at +/−j. The difference however is, that when the 1<-->0 transitions of the digital code are filtered or shaped to contain the spectrum, the MSK signal remains at a constant amplitude while an OQPSK signal acquires amplitude modulation, requiring a linear transmit power amplifier to preserve it. Such linear power amplifiers have lower efficiency than constant envelope amplifiers because they do not operate at the optimum power point 100% of the time. At low microwave frequencies such as L-band and S-band, a solid state constant envelope transmitter may achieve 60% efficiency while a linear power amplifier may achieve only 30% efficiency. Since even class-C constant envelope solid-state transmit power amplifiers operating at millimeter wave frequencies only have efficiencies of the order of 15% at the present state of the art, the extra loss of efficiency of a linear power amplifier is to be avoided. Thus, constant amplitude phase modulations such as MSK are of great interest for digital FMCW radar use.

The bandwidth of the transmitted RF signal using digital FM is proportional to the chiprate of the digital modulating code, while the rate at which the spectrum falls off outside of the main spectral lobe depends on the shaping applied to the frequency modulation. It is well known that filtering an MSK modulating waveform using a Gaussian filter produces, for some coincidental reason, the greatest ultimate rate of spectral fall-off outside the main occupied bandwidth. This was particularly exploited for the GSM digital cellular phone system which employed this modulation, termed Gaussian minimum shift keying (GMSK). In this application, versions of such modulations are described that are particularly optimized to meet criteria important in the radar application, rather than criteria important in the communications application, and other advantageous frequency modulation pulse shapes are disclosed.

Radars with a single transmitter and a single receiver can determine distance to a target but cannot accurately determine a direction or an angle of a target from the radar sensor or system unless the antenna pattern is steered between pulses either mechanically or electronically using a phased-array. To acquire angular information for each radar pulse period, which in the case of the exemplary radar system described herein comprises a sequence of frequency modulating bits with which the receiver performs correlation, either multiple transmitter antennas or multiple receiver antennas or both are needed, and which are operative in all directions all the time. Each receiver receives and separates each echoed transmitter signal, thus resulting in N×M received results, where N is the number of transmitters and M is the number of receivers. With proper design, these N×M results can be post-combined in any number of ways according to a plurality of beamforming vectors, thereby achieving elevation and azimuth location of each signal as well as range and Doppler information.

The larger the number of transmitter antennas and receiver antennas, the better the resolution possible. Each transmission antenna is connected to a separate transmitter, and each receiver antenna is connected to a separate receiver. As discussed herein, such a radar system is known as a multiple-input, multiple-output (MIMO) radar system.

Figure 4:
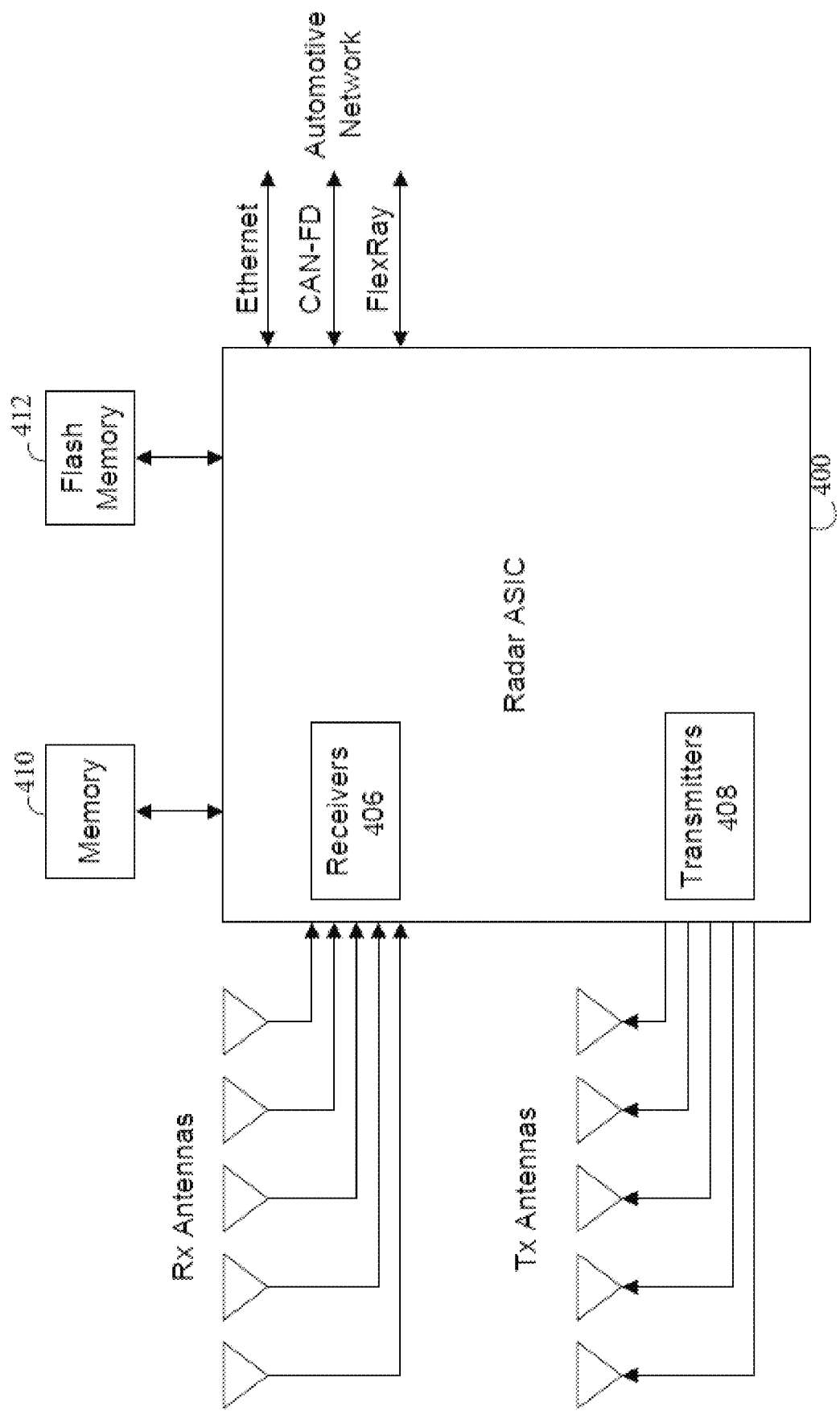
FIG. 4 is a block diagram illustrating a radar system with a plurality of receivers and a plurality of transmitters (MIMO radar) for producing the data structures of FIG. 3, in accordance with the present invention.

An exemplary MIMO radar system is illustrated in FIG. 4. With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers. A receiver may be referred to as a virtual receiver even when there is only a single transmitter, in order to avoid changing the terminology. The output of a given receiver receiving a transmitted signal from a given transmitter has a phase that depends on the loop distance from the transmitting antenna to the receiving antenna. Each transmit-receive combination produces a different loop phase due to the separation of their antennas. By combining the outputs for each transmitter/receiver combination while correcting for these different loop phase shifts, a combined output is obtained that only constructively adds for a target at a unique point in space. By repeating the combination using the precomputed loop phase shifts for many different points in space, signals may be resolved in the three dimensions of range, azimuth and elevation. The focusing effect of the above phase coherent combining is effective for resolution in azimuth and elevation but only contributes to range resolution at very short ranges, and the range resolution at long ranges is principally determined by the round-trip delay of the digital modulation. An exemplary radar system according to the invention therefore determines the range of a target or the distance to a target principally by determining how long it takes an echo of transmitted RF signals to be heard back at the receivers. From this measured time-delay and knowing that the electromagnetic RF signals travel at the speed of light (or ultrasonic signals traveling at the speed of sound), the distance can be determined.

Figure 3:
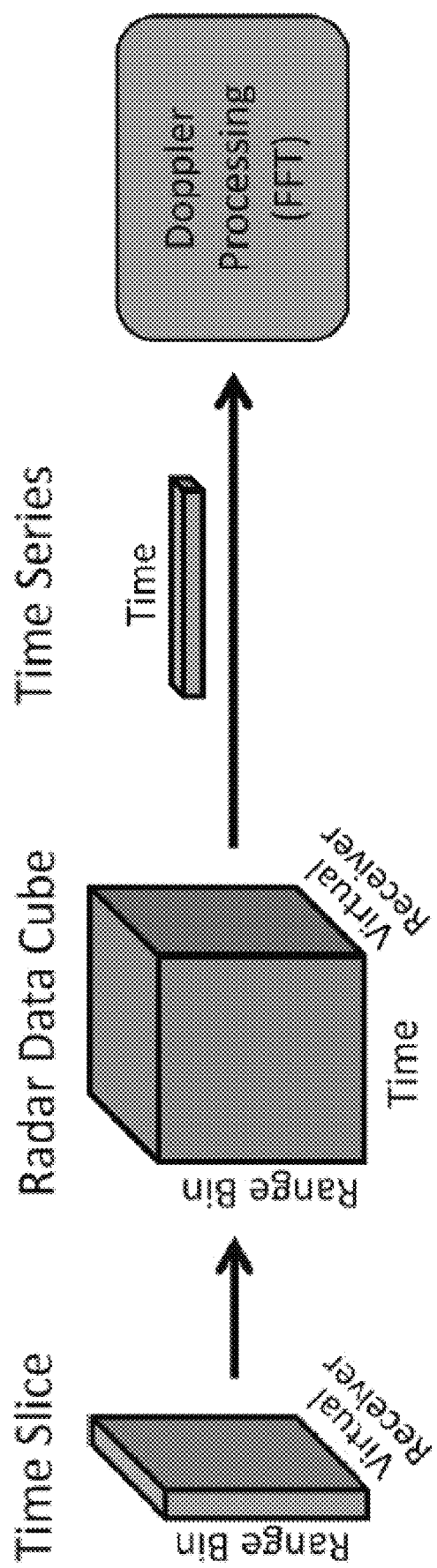
FIG. 3 is a block diagram illustrating a flow of data structures through a radar system in accordance with the present invention.

In digital FMCW radar, the method of determining the time delay is by correlating a received RF signal with multiple time-shifts of the digital modulating code to produce correlations which are stored in range bins. The length of time over which coherent correlations can be performed is limited by the phase rotation caused by Doppler shift. To continue cumulative correlation for longer times than this, partial correlations are combined while compensating for the Doppler-induced phase drift. The partial correlations may be stored for each virtual receiver and range in a 3-dimensional array called a radar data cube, as illustrated in FIG. 3, in which the three dimensions are virtual receiver number, range, and time or index of the partial correlation. Partial correlations for the same receiver and range are then submitted to an FFT, which combines them in a computationally efficient manner with many different hypotheses of the rate-of-change of phase, thus producing long correlations for each of a number of Doppler bins. The result is then stored in a radar data cube having the dimensions of virtual receiver number, range and Doppler shift. Thus, the radar data cube time dimension has been converted into a Doppler shift dimension which is more meaningful for characterizing a reflecting target or object as stationary or moving. Then, for the same range and Doppler bin, the results across different virtual receivers may be combined by using beamforming matrices as mentioned above in order to achieve angular resolution in azimuth, elevation or both.

Because there can be multiple objects in the environment, there will be multiple bins in the radar cube for which there will be a high correlation. While a virtual receiver/radar could correlate the received RF signal with all possible delays, generally there is a finite set of delays with which the virtual receiver/radar will correlate, that is, a finite set of range bins over the range of interest. Likewise, there will be a finite set of Doppler bins up to the maximum conceivable relative velocity between the radar and an oncoming vehicle. Because the transmission and return range changes at twice the relative velocity of the target to the radar, the maximum Doppler shift may be based on four times the maximum speed of any one vehicle. For a maximum vehicle speed of 250 km/hr, which can be reached on the German Autobahn for example, the maximum Doppler shift can be that of a 1000 km/hr object, which is 74 KHz at 80 GHz. If a radar system's own velocity, which is presumed to be known, is digitally removed by applying a systematic phase de-twisting to the received data, the maximum Doppler shift drops to 37 KHz.

The radar sensing system of the present invention may utilize aspects of the radar systems described in U.S. Pat. Nos. 9,772,397; 9,753,121; 9,575,160; and/or 9,599,702; and/or U.S. provisional applications, Ser. No. 62/382,857, filed Sep. 2, 2016, Ser. No. 62/381,808, filed Aug. 31, 2016, Ser. No. 62/327,003, filed Apr. 25, 2016, Ser. No. 62/327, 004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, Ser. No. 62/327,018, filed Apr. 25, 2016, and/or Ser. No. 62/319, 613, filed Apr. 7, 2016, which are all hereby incorporated by reference herein in their entireties.

FIG. 1 illustrates an exemplary radar system 100 configured for use in a vehicle 150. A vehicle 150 may be an automobile, truck, or bus, etc. As illustrated in FIG. 1, the radar system 100 may comprise one or more transmitters and one or more receivers 104a-104d which can be used jointly to realize a plurality of virtual radars. Other configurations are also possible. FIG. 1 illustrates a radar system 100 comprising one or more receivers/transmitters 104a-104d, control and processing module 102 and indicator 106. The receivers/transmitters 104a-104d are placed to acquire and provide data for object detection and adaptive cruise control. The radar system 100 (providing such object detection and adaptive cruise control or the like) may be part of an Advanced Driver Assistance System (ADAS) for the automobile 150.

Figure 2B:
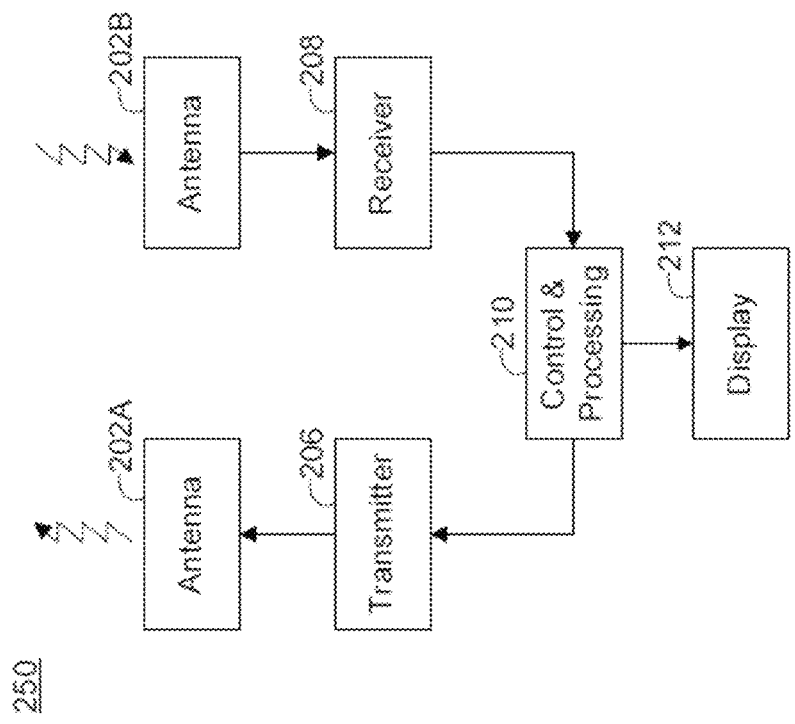
FIG. 2A and FIG. 2B are block diagrams of radar systems in accordance with the present invention.
Figure 2A:
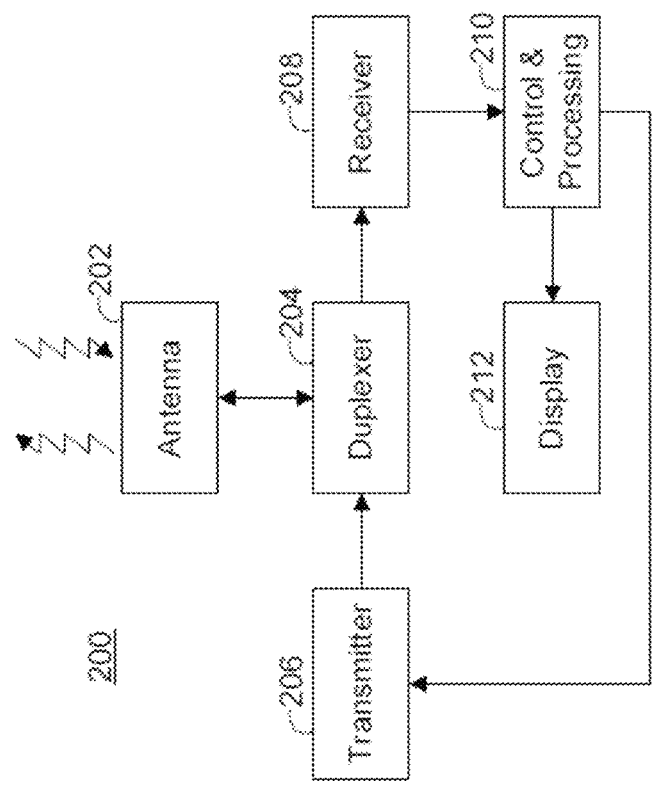

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. The control and processing module 210 is also operable to produce a radar data output that is provided to other control units. The control and processing module 210 is also operable to control the transmitter 206.

FIG. 2B illustrates an alternative exemplary radar system 250 with a pair of antennas 202a, 202b: an antenna 202a for the transmitter 206 and another antenna 202b for the receiver 208. While pulse radar systems may use shared or separate antennas, continuous-wave radars (discussed herein) will use separate antennas (for transmitting and receiving) because of their continuous operation. Despite using different antennas, local spillover from transmitter to receiver is a huge signal having a short delay. A critical issue in CW radar is the removal by subtraction of this large local spillover signal, for the success of which an accurately defined modulation, as is disclosed herein, is essential.

FIG. 4 illustrates an exemplary digitally-modulated continuous-wave radar system 400. Radar system 400 comprises a plurality of receivers and their respective antennas 406 and a plurality of transmitters and their respective antennas 408. The radar system 400 also includes a flash memory 412, and optionally a random access memory 410. The random access memory 410, for example, an external DRAM, may be used to store radar data cube(s) instead of using the limited internal (on-chip) memory (e.g., SRAM), and may also be used to store selected range bins from a greater number of radar data cubes for post processing to improve Doppler resolution or range resolution by tracking objects using Kalman filtering. The radar system may also include a variety of interconnections to an automotive network, e.g., Ethernet, CAN-FD, and/or Flexray.

As was indicated above, range resolution is related to the width of the autocorrelation function of the transmitted signal. A practical autocorrelation function width cannot be too small, otherwise it will have to be computed from the received signal with a sufficiently high sampling density to avoid missing the peak, and the results have to be stored in memory for further analysis, e.g. Doppler analysis. Therefore, computational power and on chip memory limitations, or, in the case of off-chip memory, I/O bandwidth limitations, limit the narrowness of the autocorrelation function that can be contemplated. In a digital FMCW radar system based on transmitting digital codes, one possible sampling density is one sample per chip period, obtained by correlating the transmitted sequence with different whole-chip shifts of the received signal. It could be contemplated to correlate with half-chip shifts of the received signal, but if sufficient memory is available to store that double number of results, then the chiprate may as well be doubled to reduce the width of the autocorrelation function, if bandwidth is available. In the present application, bandwidth in the 80 GHz range is not the limitation. Therefore, the practical solution is to determine how many correlations per second can be computed and stored, and to equate that with the chip rate, such that correlations are to be computed only for whole-shifts of the received signal. Therefore, the characteristics of the autocorrelation functions, computed at whole-chip shifts, need to be investigated for digital code frequency-modulated signals. Several known algorithms exist for computing many correlations between one or more codes and multiple shifts of a received signal; for example, a technique using FFTs for performing circular convolution is known.

Figure 5:
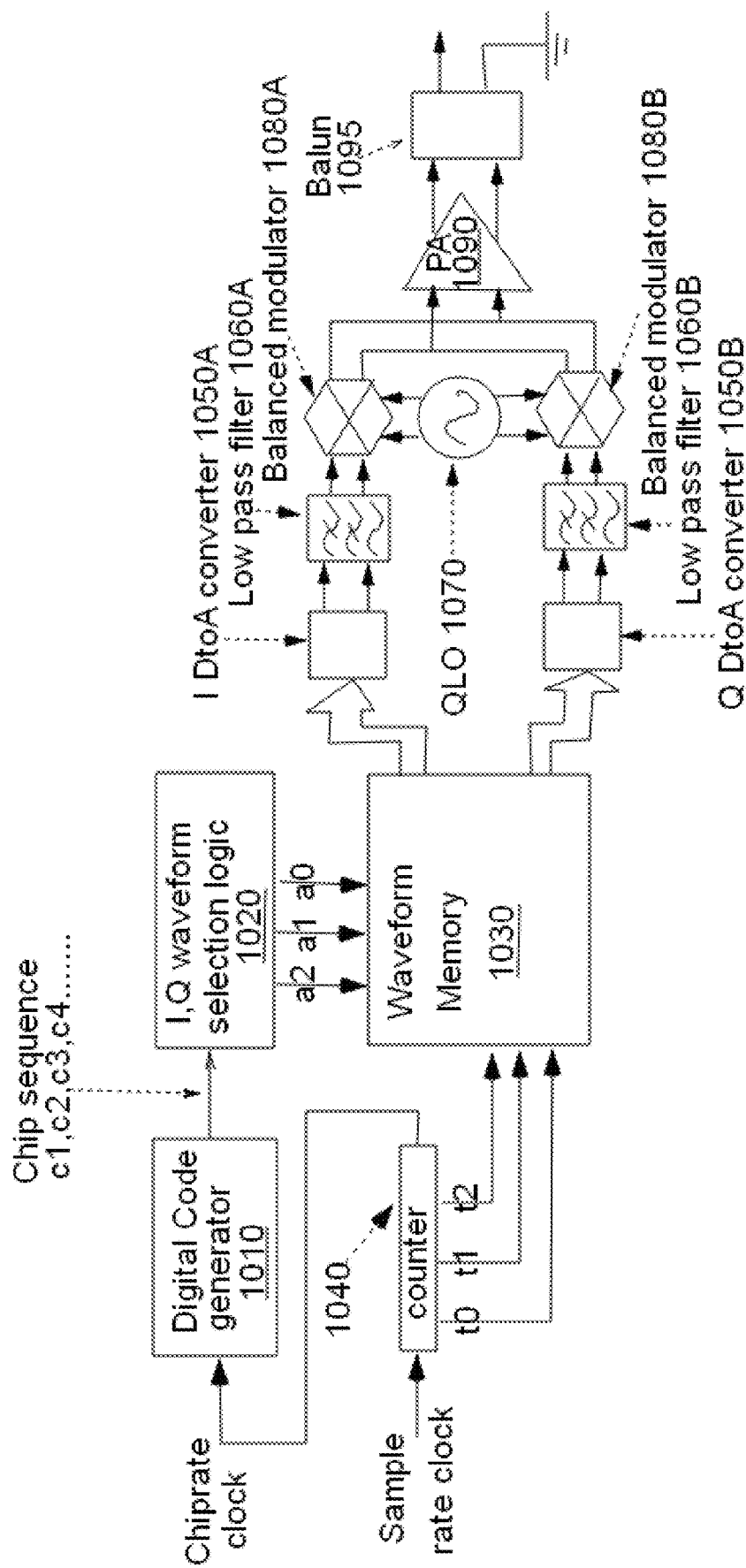
FIG. 5 illustrates an exemplary transmitter architecture in accordance with the present invention.

FIG. 5 illustrates an exemplary transmitter block diagram. A digital code generator 1010 is fed with a chiprate clock to produce a pseudorandom code for modulating the transmitter. The pseudorandom code preferably has good autocorrelation sidelobe properties at least up to a shift corresponding to the round-trip delay to a target at maximum range. The pseudorandom codes used by different transmitters of a MIMO radar should also be preferably mutually orthogonal or have low cross-correlation. In a first implementation of a radar embodying the invention, the codes are merely random and a long correlation length relied upon to reduce cross correlation and autocorrelation to the point where subtractive interference cancellation can take over and further suppress strong targets to reveal weaker targets. Optionally, the sequences of random binary values (codes or chips) may be provided by a truly random number generator or a pseudorandom number generator. Such number generators are explained in more detail in U.S. patent application, Ser. No. 15/204,003, filed Jul. 7, 2016, which is hereby incorporated by reference herein in its entirety.

The digital chip code from generator 1010 is fed to I,Q waveform selection logic module 1020, the purpose of which is to select the I,Q waveform to be modulated for the current chip period in dependence on the current chip and the chip history, in order to produce a signal having a signal frequency varying according to a predetermined shaping function. In one implementation, the number of possible waveforms is limited to eight, and thus requires three address bits (a0, a1, and a2) from selection logic 1020 to address waveform memory 1030. In another implementation, the waveform depends on fewer than three successive chips. Each waveform may be described by a number of complex I,Q sample values, such as 4, 8, or 16 samples per chip. Counter 1040 is driven by a sample rate clock which is correspondingly 4, 8, or 16 times the chip rate clock that is used to select each I,Q sample pair in turn from the memory. Counter 1040 may be a "divide by 4" using two flip-flops for the case of 4 samples per chip, a 3-stage divider for 8 samples per chip, or a 4-stage divider for 16 samples/chip. The divided, down-sample rate clock is the desired chip rate clock and may be used to clock the digital code generator 1010. Each stage of counter 1040 produces a digital output as a further address bit to memory 1030. In the case of 8 samples/chip, three counter bits (t0, t1, and t2) are provided to memory 1030 to select one of the 8 samples. The selected sample (0 to 7) of waveform (0 to 7) comprises a digital I and Q value with a word length in the range of 8 to 16 bits. The digital I and Q values are fed into respective I and Q digital to analog converters (DAC) (1050A, 1050B) where they are converted to analog voltages or currents. At very high speeds, it is desirable that high speed analog signals be balanced, as the quality of an on-chip ground cannot be relied upon for single-ended signals at very high frequencies. The balanced analog I and Q voltages from respective DACs (1050A, 1050B) are then smoothed using respective low-pass filters (1060A, 1060B) which may be deliberately engineered, or may be a collection of incidental bandwidth restrictions produced due to component frequency response limitations. Either way, the filtering needs to be sufficient to contain the transmitted spectrum to meet the out-of-band limits specified by the frequency management authority. The filtered balanced I,Q signals then modulate quadrature carrier signals produced by quadrature local oscillator (QLO) 1070 (may also be referred to as a frequency generator) using a pair of balanced modulators (1080A, 1080B) (may also be referred as I,Q modulators). The quadrature local oscillator may also be referred to as a carrier frequency generator operable to generate a carrier signal that is frequency modulated by the pair of balanced modulators (1080A, 1080B). Furthermore, the I, Q waveform selection logic 1020, the waveform memory 1030, the digital-to-analog converters 1050A, 1050B, the low pass filters 1060A, 1060B, and the balanced modulators 1080A, 1080B may be collectively referred to as the modulator. Gilbert-cell mixers using 28 nm MOSFET transistors have proven capable of modulating an 80 GHz carrier signal with 2 GB digital code rates. Gilbert cell mixers driven by similar QLOs may be used in the radar receiver in order to produce zero-IF, homodyne receivers.

In a MIMO system, all transmitters and receivers preferably have a known phase relationship in order to allow the receiver outputs to be coherently combined by beamforming matrices. In one implementation, the desired phase relationship is guaranteed by injection-locking each transmitter and receiver's QLO (frequency generator) to a common standard. For a millimeter wave radar operating around 80 GHz, the common standard may be a sub-harmonic of the desired millimeter wave frequency, such as ⅕th or 16 GHz, at which frequency it is easier to fabricate an accurate digital frequency synthesizer or generator to give programmable center or mean frequencies.

The modulated signal at the radar carrier frequency is amplified to a transmit power level in constant envelope power amplifier (PA) 1090 which also operates push-pull (i.e. balanced). The push-pull PA 1090 is cross neutralized to reduce Miller feedback, improve the high frequency gain and reduce the S12 parameter. On-chip Balun transformer 1095 may be used to convert the push-pull signal to single ended to bring the signal off-chip through a ball-bond surrounded by grounded ball-bonds.

Figure 6:
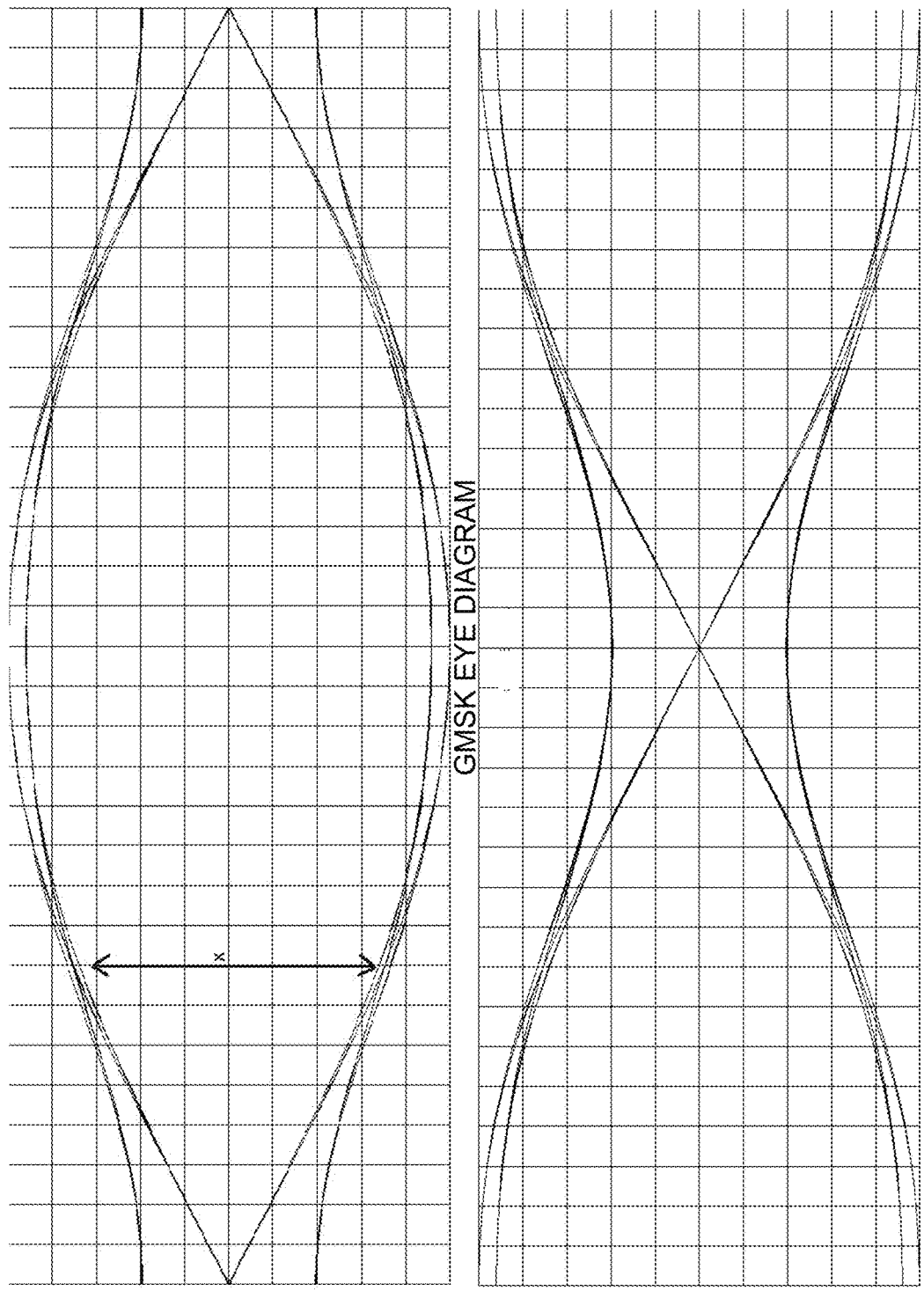
FIG. 6 illustrates an exemplary eye diagram for Gaussian minimum shift keying (GMSK) with a BT factor of 0.3 in accordance with the present invention.

FIG. 6 is a graph illustrating the typical eye diagram of the I and Q parts of the transmitted carrier using Gaussian minimum shift keying (GMSK) when no limit is placed on the number of stored waveforms; that is, each transition can depend on as much past history as the impulse response length of the selected Gaussian filter exhibits. For FIG. 6, a Gaussian filter with BT=0.3 was used. A filter with BT=1 means the −3 dB bandwidth is equal to the chiprate, and BT=0.3 means the 3 dB bandwidth is 0.3 of the chiprate. Moreover, in common with the definition of GMSK used in the GSM system, the Gaussian premodulation filter is not fed with square waves (with a polarity equal to the bit values), but by impulses of unit area (with polarities given by the bit values). A square wave bit stream already has an implied sin(x)/x frequency-response shaped filter that shapes the waveform from impulses to square waves, and it is desired to investigate the performance of filters that are not constrained to include this inherent sin(x)/x factor.

Figure 34:
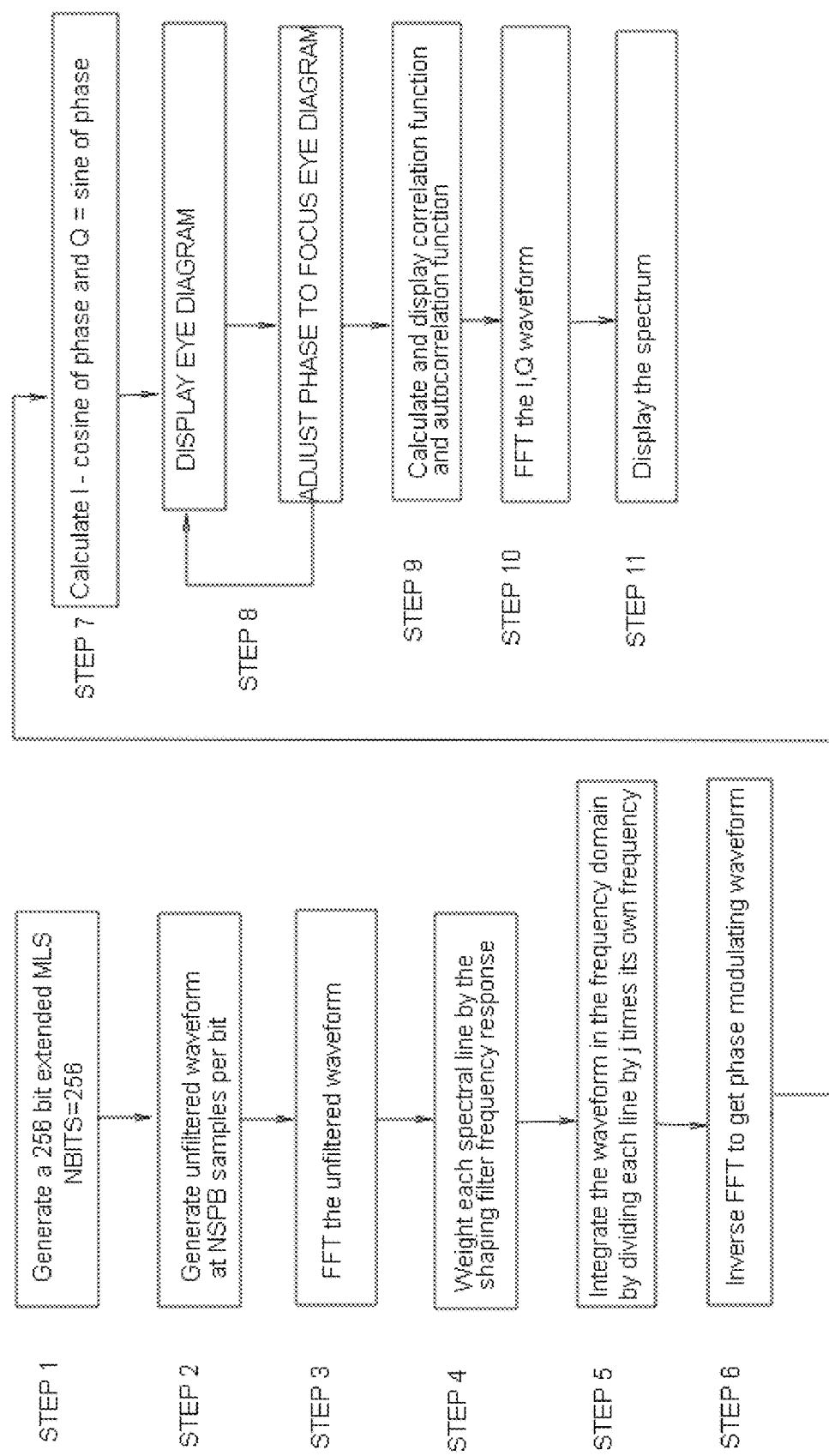
FIG. 34 is a flow diagram of a processing for simulating modulation in accordance with the present invention.

FIG. 34 illustrates a flow chart that was used to compute the waveforms of FIG. 6 and subsequent graphs. An 8-bit linear feedback shift register was used to generate a maximum length sequence of 255 bits at step 1, and the sequence extended to 256 bits by adding one more bit to obtain a power of 2 bits. If the added bit is a zero, the extended 256 bit sequence will have an equal number of 1's and 0's.

At step 2, each bit is placed in the center of a group of NSPB samples with the other samples zero, to represent an impulse having the desired bit polarity. The bit values are multiplied by NSPB to give the impulse unit area. The number of samples per bit is also chosen to be a power of 2, that is 4, 8, 16, 32, 64, 128 or 256, so that the total number of samples is a power of 2 equal to 1024, 2048, 4096, 8192, 16384, 32768 or 65536. The purpose is to allow the use of a fast, base-2 FFT at step 3 to produce the spectrum of the unfiltered impulse waveform. At step 4, the spectrum is weighted by the frequency response of the shaping filter, e.g. a Gaussian filter. The filtered frequency modulating waveform must be integrated to obtain the phase waveform. This is conveniently done in step 5 while the signal is still in the frequency domain by dividing each spectral line by j times its own frequency. When the whole sequence is 256 bits long, the line spacing is 1/256 of the bitrate, so the frequency of each spectral line is simply determined. At step 6, an inverse FFT produces the time waveform from the filtered and integrated spectrum.

At any point before step 7, a suitable scaling is applied so that the desired frequency deviation or modulation index is obtained. At step 7, the I,Q waveform is computed by taking the cosine and sine of the phase modulation samples, which also has the effect of reducing the phases modulo-$2\pi$. At this point, if the I,Q waveform does not join up end-to-end, a phase slope may be applied across the I,Q waveform to force it to join up end to end. This is equivalent to a very small frequency shift which can be used later if necessary to ensure that any filtering is correctly centered. The purpose of ensuring end-to-end continuity is that the FFT at step 10 assumes a cyclic waveform, without which artifacts may appear on the spectral sidelobes so calculated.

At step 8, the eye diagram is plotted, and manually a phase adjustment is determined that brings the eye diagram into focus such that maximum eye-openings of the I and Q bits are obtained and so that all trajectories converge to the minimum number of different I and Q waveforms.

At step 9 the correlation function and autocorrelation functions may be calculated and displayed, and then the spectrum calculated at step 10 is displayed at step 11.

The flow chart may be extended to add other filtering such as the low pass filters 1060A and 1060B of FIG. 5, and receive filtering, and the effect on eye diagram, correlation function, and spectrum may be calculated and displayed as at earlier steps.

Note that in order to display an eye diagram having the best eye openings that best indicate the values of the modulating symbols, it may be necessary to determine a common phase rotation to be applied to all I,Q values to remove any phase shift that may be an artifact of the program simulating the modulation. In the simulation program used to produce the results herein, this common phase artifact was determined to be equal to ⅝ths radians, and so the waveform was rotated by −⅝ths radians at step 8 to display the best eye openings.

After applying the above phase shift, by inspection there appear to be eight possible I,Q waveforms except at the position marked X on the rising flank and its corresponding position on the falling flank. The number of waveforms is simply determined by drawing a vertical line at any time point and counting the number of distinct trajectories that cross it. The number is four each for I and Q near the center of the I-eye or Q-eye for a total of eight, but they diverge slightly to 16 in the vicinity of point X. That means that the waveform at point X depends on four bits, while the waveform at other times depends only on three bits. The best phase shift mentioned above will be found to reduce the number of trajectories to a minimum by converging trajectories that were otherwise apparently divergent due to the phase shift produced by the modulating program. Manually adjusting the phase shift while observing the eye diagram will be seen to bring the picture into focus.

The number of bits on which the waveform depends can also be seen by computing a correlation between the output waveform and the modulating chip code. At this point it is necessary to explain the relationship between the digital code chip polarities and the polarity of the I value at the maximum I-eye opening and likewise the polarity of the Q-value in the center of its eye. When digital frequency modulation using MSK or GMSK is employed, each modulating bit polarity determines whether the I,Q vector rotates clockwise or anticlockwise by 90 degrees over the bit period. Thus, after two bit periods, the I,Q vector will have rotated by either 0 or 180 degrees. In between, the vector lies at either 90 or 270 degrees. Thus, the polarity of even bits determines whether the vector will end up at 0 or 180 degrees and the polarity of odd bits determines whether the vector will end up at 90 or 270 degrees. However, the effect is cumulative, as shown in the table below:

| 1 | 0 | 0 | 1 | 1 | 1 | 0 | 0 |
|---|---|---|---|---|---|---|---|
| 90 | 0 | −90 | 0 | 90 | 180 | 90 | 0 |

In the above table, bit number 1 is a 1, sending the phase clockwise from an assumed zero starting value to +90 degrees. The second bit is a zero, sending the phase counterclockwise 90 degrees back to 0. Bit 3 is a 0, sending the phase 90 degrees counterclockwise to −90, and so forth. Thus, the relationship between phase and frequency-modulating bit sequence is:

$$\phi n = \text{mod } 2\pi[\Sigma \pi B i/2], \quad i=0 \text{ to } n \quad (1)$$

This may also be written as:

$$\phi n = \text{mod } 2\pi[\phi n-1 + \pi B n/2] \quad (2)$$

Thus, if a 2-bit state variable is used to keep track of where the phase ended up last time (that is, the value of $\phi n-1$), then the phase at the end of the current period can be determined from equation (2).

In the GSM digital cellphone communications system, a simpler relationship between I,Q polarities and modulating bits was arranged by the use of precoding. If the desired modulating chip code is designated $C_i$, then modulating bits $B_i$ are derived from the desired modulating chip code $C_i$, according to the precoding equation (3) below:

$$Bi = C_i \cdot \text{xor} \cdot C_{i-1} \quad (3)$$

The relationship between $B_i$, $C_i$, phase, and I,Q peak value polarities may be seen in the following table:

| C | 1 | 0 | 1 | 1 | 0 | 1 | 1 | 1 | 0 |
|---|---|---|---|---|---|---|---|---|---|
| B | 1 | 1 | 1 | 0 | 1 | 1 | 0 | 0 | 1 |
| Phase | 90 | 180 | 270 | 180 | 270 | 0 | −90 | −180 | −90 |
| I + jQ | j | −1 | −j | −1 | −j | 1 | −j | −1 | −j |
| $-j^n(I + jQ)$ | 1 | −1 | 1 | 1 | −1 | 1 | 1 | 1 | −1 |

The final row is derived by multiplying the penultimate row of I+jQ values by $-(j)^n$. The result of this systematic progressive phase twist, which increases at 90 degrees per bit, is to throw the Q values up into the real plane, making all values real and in agreement with the original C-values. In GSM, this progressive twist is applied at the receiver so as to reproduce the code C generated at the transmitter. Without the progressive twist, it may be seen from the I+jQ values that the sign progression of I bits is −1 −1 1 −1 compared to the corresponding bits of C −1 1 1 1 showing that there is a sign alternation. The same is true for Q bits j, −j, −j, −j, −j compared to 1, 1, −1, 1 −1

Therefore, an alternative method of ensuring that the signs of I alternating with Q at the receiver correctly reproduce the intended code C would be to flip the signs of the C bits at the transmitter according to the pattern:

++−−++−−++−−++−− . . . .

Consequently, there are optional methods for ensuring that the chip sequence C produced by the code generator 1010 at the transmitter is reproduced at a point in the receiver chain where it can be correlated with a locally generated replica of C. If this is not done, then correlation at the receiver must use the expected signs of I and Q. The autocorrelation sidelobe characteristics when using the latter method will not be the same as the autocorrelation characteristics of code C, but of code C with bits flipped according to the above alternating sign pattern. To obtain autocorrelation characteristics intended by design, it is necessary to ensure that the receiver correlates with a code having the desired characteristics, and this is ensured by the use of appropriate transmitter precoding in the I,Q waveform selection logic unit 1020 paired with the correct signal treatment at the receiver. The method chosen for the transmitter, i.e. any desired precoding, is built into I,Q waveform selection logic 1020.

Using GMSK, the frequency pulse shaping produced by the Gaussian filter may have an effect beyond the current chip. The phase change produced over one chip period by GMSK frequency pulses may fail to reach 90 degrees over one chip period, but when integrated over all chip periods affected by a given chip, the cumulative phase change to the signal produced is exactly +90 degrees so that the four principal terminal positions of the signal vector remain fixed and do not slowly rotate. This characteristic is maintained in this invention for all frequency pulse shapes considered by constraining the area integral of a frequency pulse shape over its entire impulse response length to be a fixed value.

When the receiver is on the same silicon chip as the transmitter, the local replica for correlation is simply derived from the code generator 1010 by delaying it if necessary.

When the precoding of equation (3) is applied at the transmitter, and the receiver applies a systematic progressive 90 degree per chip twist to received signal samples, the twisted samples may be correlated with the shifts of the code C produced by the code generator 1010. If the receiver samples the received signal at N samples per chip, then selecting samples (e.g., 0, N, 2N, 3N), progressively twisting the samples and correlating with shifts of the code C, produces points on the correlation function (e.g., 0, N, 2N, 3N). Then, selecting points 1, N+1, 2N+1, 3N+1 etc., progressively twisting them and correlating with C, produces points 1, N+1, 2N+1, 3N+1 etc. of the correlation function. Continuing in this way produces the correlation function for all relative time shifts in steps of 1/N of the chip period.

Figure 7:
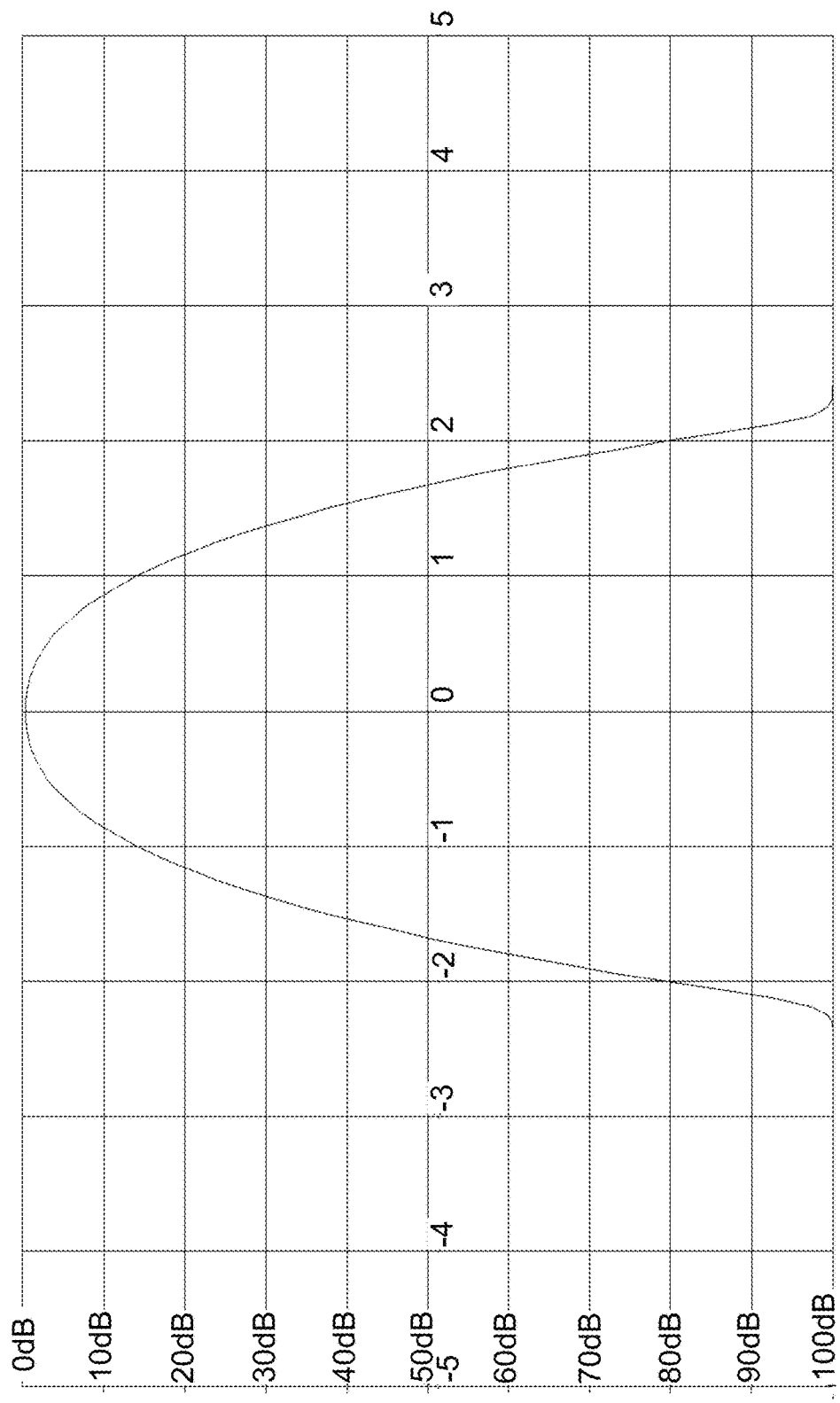
FIG. 7 is a graph illustrating the correlation of a transmitted signal with a transmitted code in accordance with the present invention.

The above described correlation function is illustrated in FIG. 7. The magnitude is plotted in dBs, and the horizontal divisions are one chip periods. This function is the correlation of the transmitted signal with the corresponding digital code, or equivalently it is the correlation of the received signal with the transmitted code when the receiver does not add additional filtering. Such a wideband receiver is undesirable however, as a bandpass filter is required to limit noise.

The correlation function of FIG. 7 illustrates that, for sampling in the center of the eye, the peak correlation is unity as it just reproduces the mean power of the signal which has been set to unity, and the correlation at +/−1 chip period is about −14 dB. The correlation at +/−2 chip periods is −80 dB, so the transmitted signal depends substantially only on 3 consecutive bits when sampled at the center of the eye. This is exactly in correspondence with what can be seen in in FIG. 6. If however, the signal is mis-sampled by half a chip period, the correlation magnitudes are shown in the table below:

| −1.5 chips | −0.5 chips | +0.5 chips | +1.5 chips |
|---|---|---|---|
| −39 dB | −4 dB | −4 dB | −39 dB |

The above table shows that a 0.5 (one half) chip mis-sampling results in a signal that depends on 4 chips. The correlation +/−2.5 chips away is however zero. This also corresponds with what may be seen in FIG. 7 at point X, where the signal has 16 different trajectories corresponding to a dependence on 4 chips.

The receiver however cannot remain wideband. The noise bandwidth must be limited. One way of limiting the bandwidth is to use a matched filter, which is known to achieve maximum signal-to-noise ratio. A matched filter corresponds to correlating the signal with the complex conjugate of itself. This produces the autocorrelation function (ACF). The ACF for the same signal is shown in FIG. 8.

Figure 8:
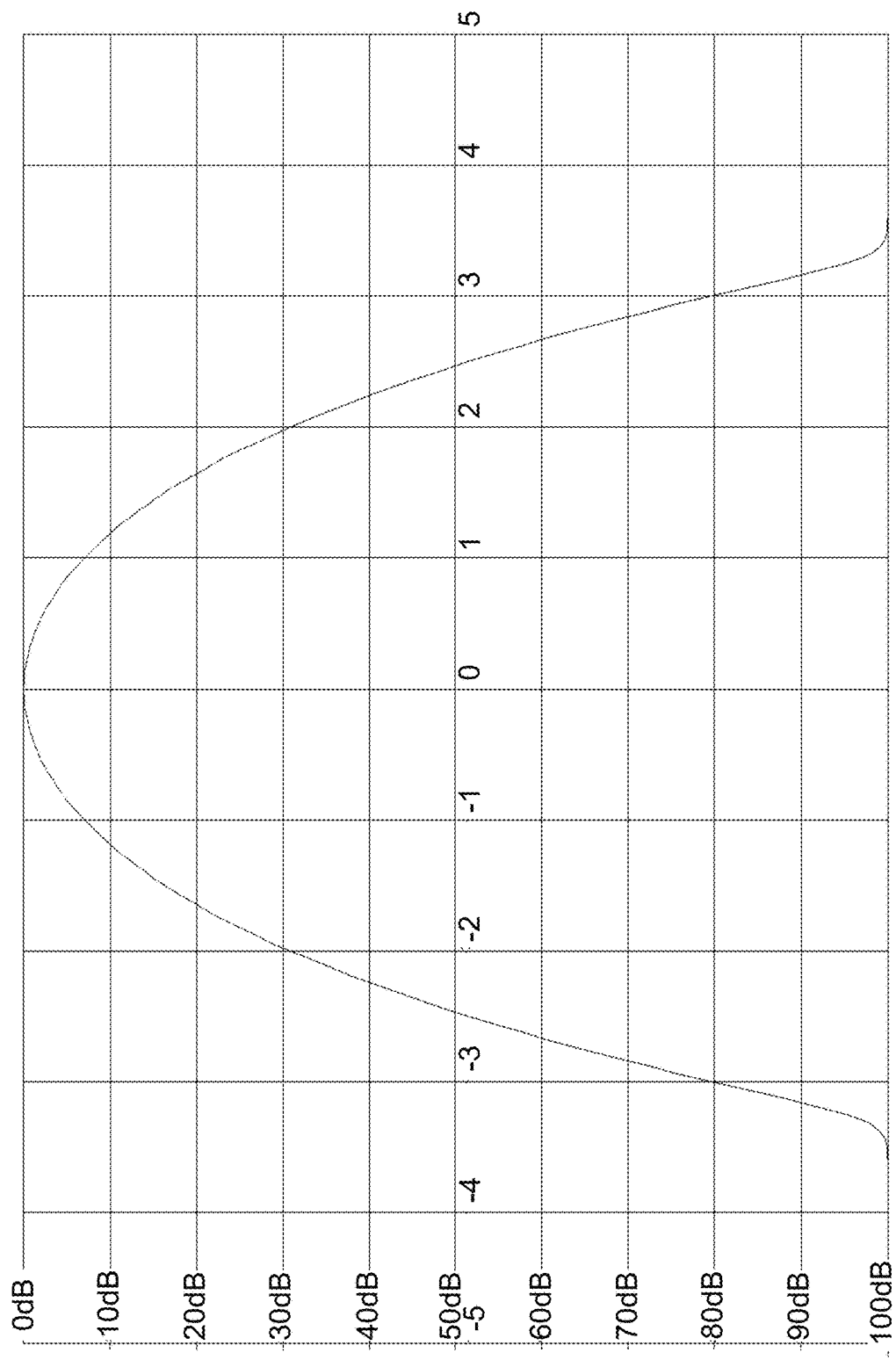
FIG. 8 is a graph illustrating an autocorrelation function for GMSK with BT=0.3 in accordance with the present invention.

FIG. 8 shows that with optimum sampling, the ACF at +/−1 chip period is about −7 dB and is +/−31 dB at +/−2 chip periods. The signal now therefore depends somewhat on five consecutive chips due to the additional ISI introduced by matched filtering. With half a chip mis-sampling, the ACF has the values shown in the table below.

| −2.5 chips | −1.5 chips | −0.5 chips | +0.5 chips | +1.5 chips | +2.5 chips |
|---|---|---|---|---|---|
| −53 dB | −17 dB | −2 dB | −2 dB | −17 dB | −53 dB |

With half a chip mis-sampling, the signal is showing a dependence on either 4 chips or 6 chips, depending on whether a correlation level of −53 dB is significant in the application.

In a communications system, correlation values on the order of −30 dB are not of significance because they do not significantly affect information error rates. In a radar system however, a strong target echo can easily be 30 dB above a weak target echo two chips away. Therefore, achieving low autocorrelation sidelobes is of greater importance in radar applications. If autocorrelation sidelobes remain high several chips away, strong target subtraction may then be necessary to reveal weaker target echoes with neighboring ranges. The complexity of strong target subtraction may therefore be reduced or eliminated entirely if correlation sidelobes can be adequately suppressed.

Figure 9:
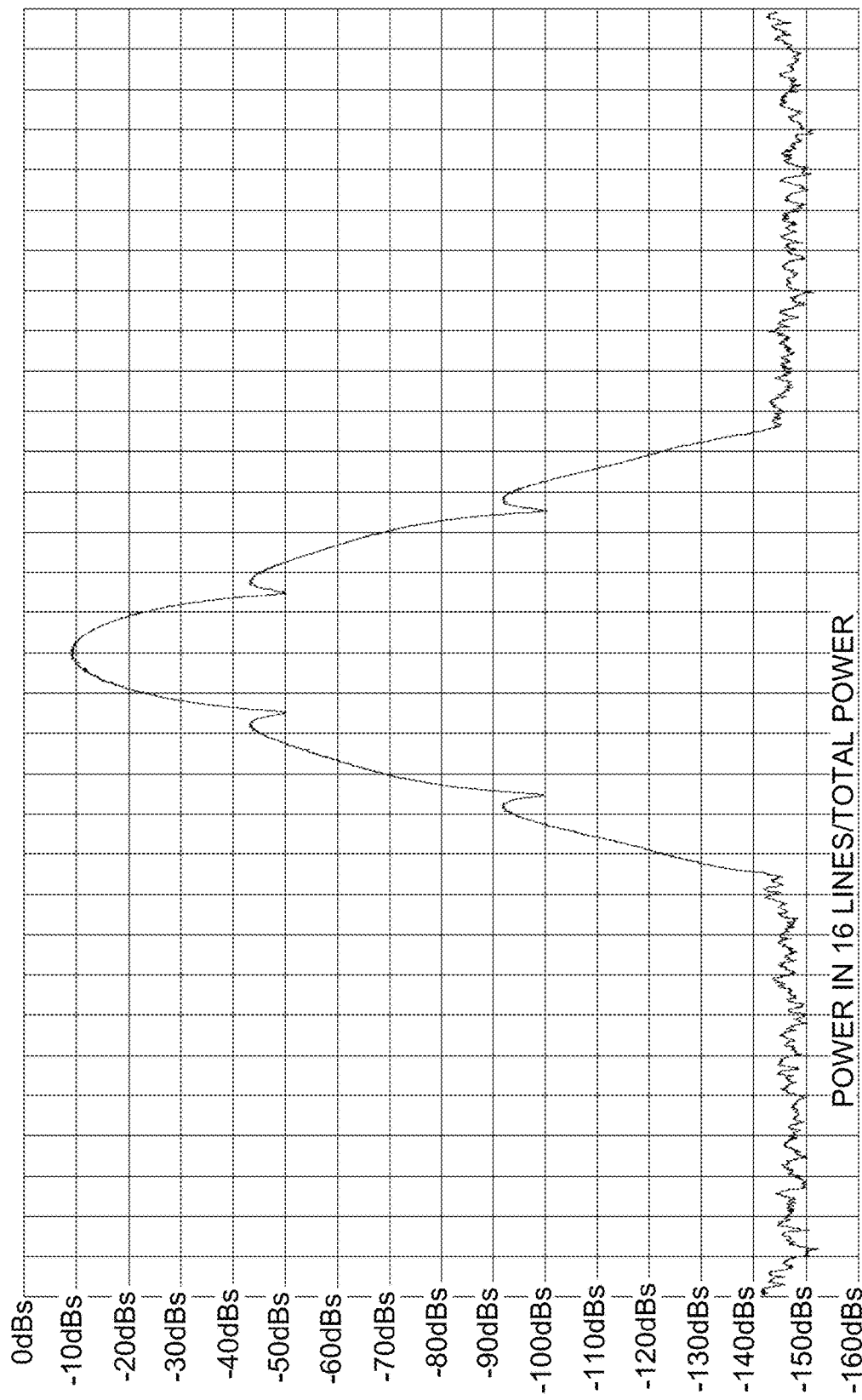
FIG. 9 is a graph illustrating a power spectrum for GMSK with BT=0.3 in accordance with the present invention.

A number of ways of reducing autocorrelation sidelobes will now be discussed. Firstly, it may be acceptable to use a slightly wider filter than the matched filter in the receiver. To get an idea of suitable receiver bandpass filter bandwidths, the spectrum of the signal shown in FIG. 9 is used. The horizontal divisions are 0.5 times the chiprate. The −3 dB bandwidth is approximately +/−0.25 times the chiprate, about the same as the Gaussian premodulation filter. Therefore, a Gaussian filter of the same BT factor can be contemplated for the receiver filter.

Figure 10:
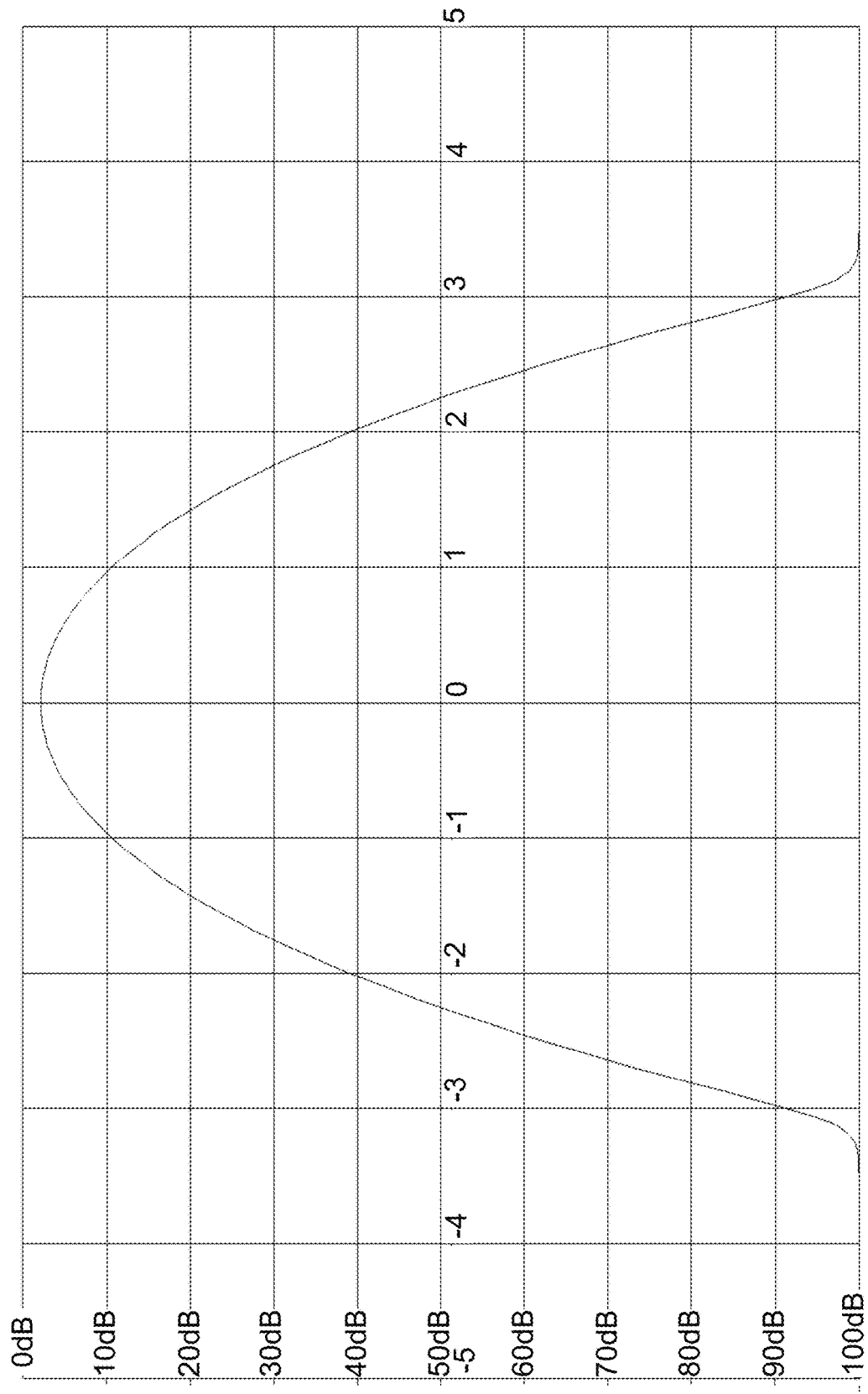
FIG. 10 is a graph illustrating correlation sidelobes using a Gaussian receiver filter with BT=0.3 in accordance with the present invention.
Figure 11:
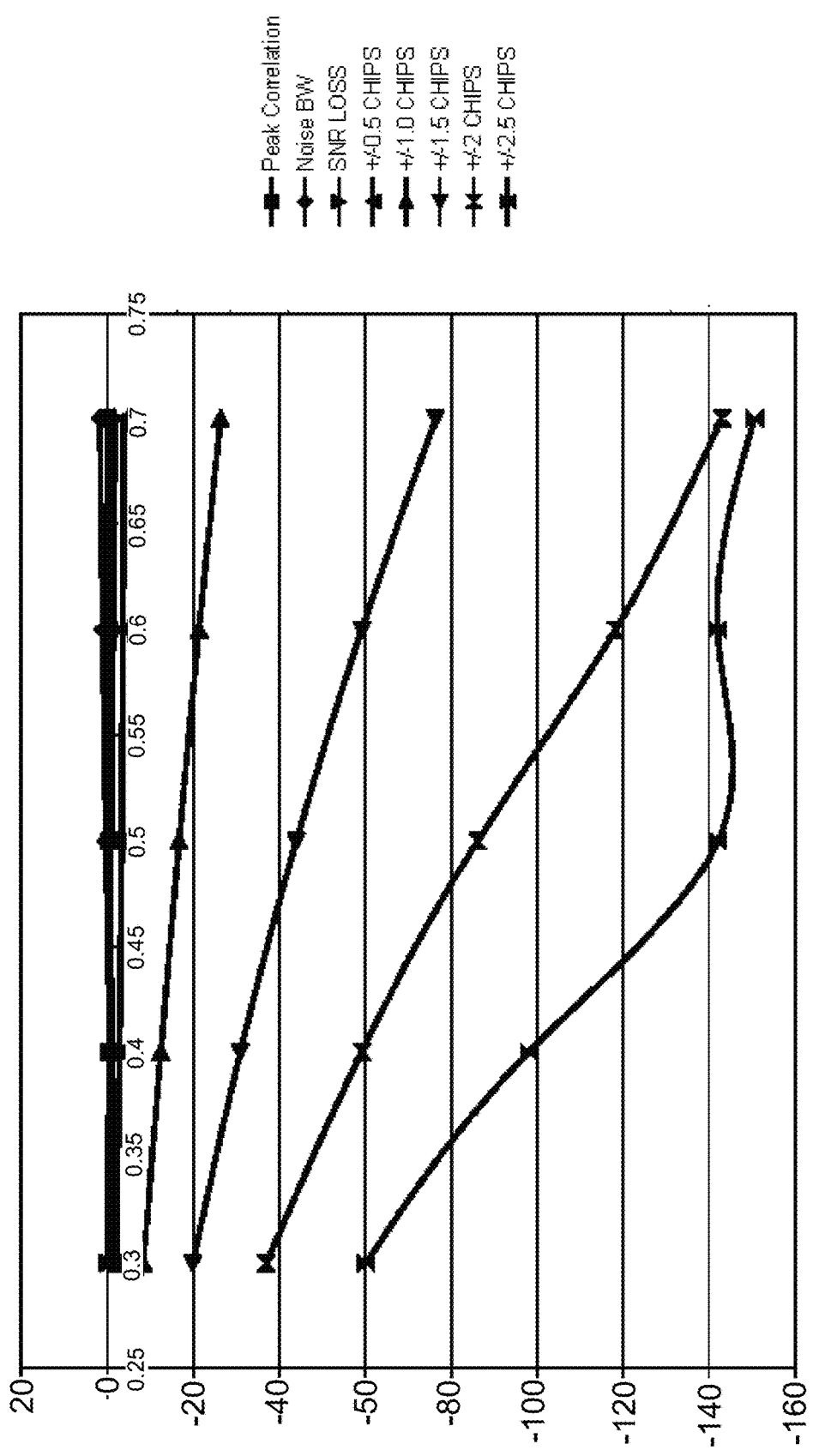
FIG. 11 is a graph illustrating variation of sidelobe levels with receiver filter BT in accordance with the present invention.
Figure 12:
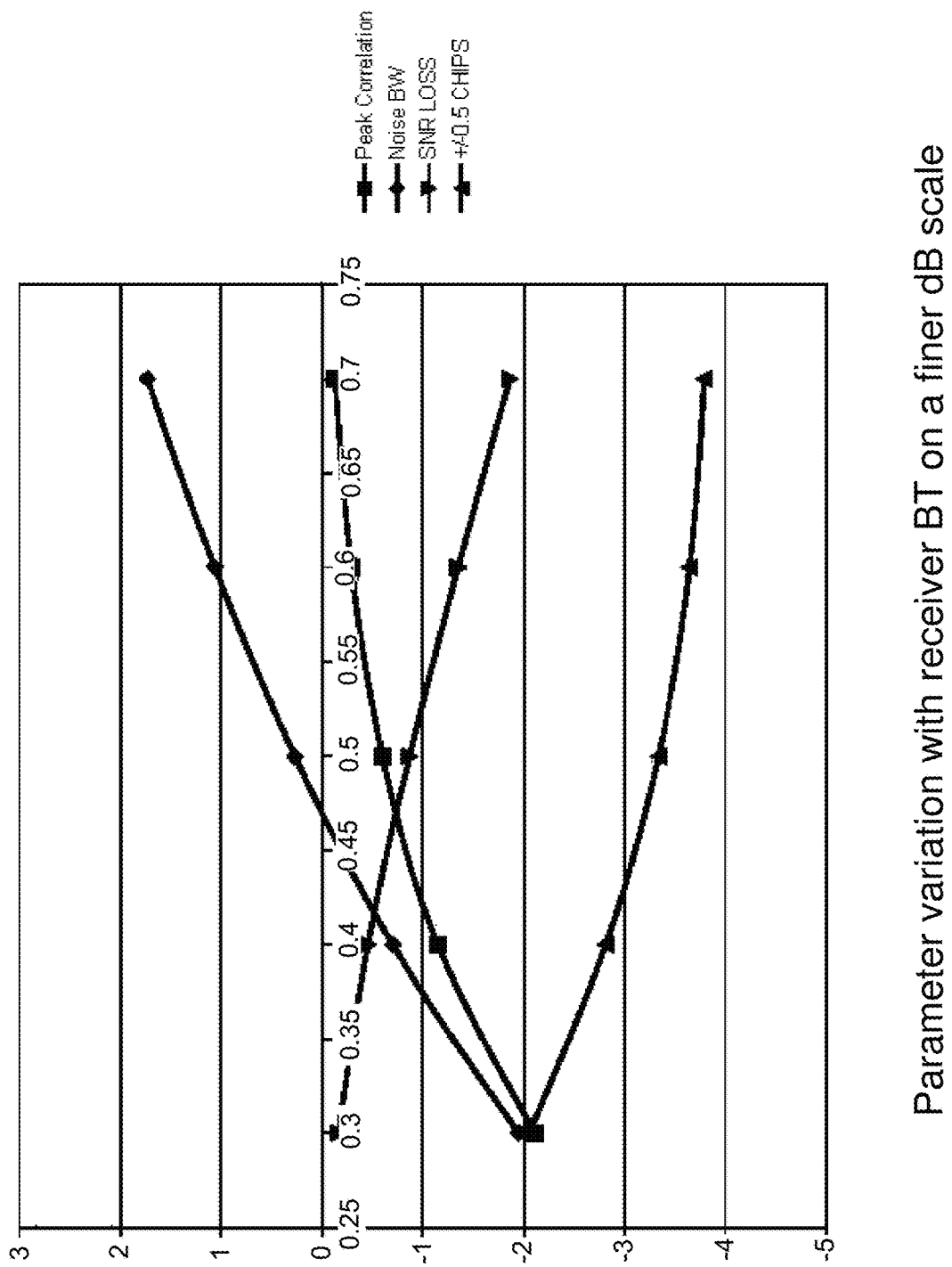
FIG. 12 is a graph illustrating variation of noise bandwidth and SNR with receiver filter BT in accordance with the present invention.

FIG. 10 illustrates correlation sidelobes using a Gaussian receive filter with BT=0.3. There is a 1.05 dB loss of power though such a filter and a 2 dB loss in peak correlation. However, the noise bandwidth of the filter is only 0.63 bitrates, which is a reduction of 1.95 dB, substantially compensating for any loss of signal power and correlation magnitude. The signal-to-noise ratio is therefore about the same as with a matched filter correlator. The sidelobes however are now reduced from −31 dB at +/−2 chips, using the matched filter, to −37 dB relative to the peak of correlation. The signal-to-noise ratio effects and the correlation sidelobes can now be explored as a function of the receiver's BT factor. FIG. 11 illustrates how the sidelobe levels at +/−0.5 chip, +/−1 chip, +/−1.5 chips, +/−2 chips and +/−2.5 chips depend on receiver filter BT. Also, the noise bandwidth and peak correlation loss are shown, and combined to show the SNR loss involved in choosing higher receiver BT factors to reduce correlation sidelobes. The correlation at +/−0.5 chip has the practical significance that it represents the loss of peak correlation that occurs due to a target echo arriving with a delay that is a non-integral number of chip periods. FIG. 12 shows the latter as well as noise bandwidth, peak correlation loss, and net SNR loss on a finer dB scale.

Many other filter responses could also be explored, such as boxcar filters, Bessel filters and the like, and the number of cases that can be explored are too numerous to address in this application, the purpose of which is directed more towards choice of modulation, which is a transmitter question rather than a receiver question. Attention is therefore turned to what can be done on the transmitter side to reduce correlation sidelobes.

FIG. 7 shows that the correlation function for GMSK with BT factor=0.3 essentially has a 5-chip spread. A 4-chip spread is evident from the 16 trajectories visible in FIG. 6, but the 5th chip dependence is there, only too small to be visible by the naked eye on the eye diagram. Were it not for the divergence of the trajectories at location X in FIG. 6, there would be no more than 8 trajectories and therefore only 3 chips of correlation spread. The waveform may therefore be handcrafted to converge these trajectories to a total of 8.

The first step in handcrafting the waveform is to compute, for a given group of three chips within +/−1 chip of a waveform point, the average of all waveform values over the four other combinations of the two chips at +/−2 chips away. The average waveform points are intended to be stored at a given number of samples per chip in waveform memory (1030) of FIG. 5 for all 8 combinations of the group of three chips, and selected from memory when those 3 chip values are presented as address a2, a1, a0 from waveform selection logic (1020). Now the waveforms exhibit many symmetries, such as I/O symmetry, time-reversal symmetry, and +/− symmetry, but for very high chiprates such as 2 GB/s it can be more burdensome to try to exploit those symmetries to reduce the memory size than to merely accept the full memory size. At lower chiprates, exploiting the symmetries might result in a net reduction of silicon area.

FIG. 12 illustrates the eye diagram of GMSK with BT=0.3 when the above waveform averaging has been done to constrain dependence to 3 successive chips. It may appear that the 4-chip dependence at point X of FIG. 13 has not been entirely eliminated. However, the correlation function of this waveform is shown in FIG. 14, and indicates that indeed there is a precipitous drop on the chip dependence beyond +/−1 chip. Substantially, 3 chip-only dependence is maintained for target echoes with up to +/−0.5 chip mis-sampling.

The apparent failure to get rid of the anomalies at location X in FIG. 6 is an artifact of the graph plotting program. There are in fact only 2 possible waveform points on each side on each anomaly, but the graph plotting program draws lines joining either one of the leftmost points to either one of the rightmost points by linear extrapolation. Nevertheless, a receive filter would do precisely that, and so it is desirable to remove this discontinuity. This arises because the three chips on which the leftmost waveform values depend are for example b2, b3, b4 and then this changes suddenly to a dependence on b3, b4 and b5, as they are now the nearest chips to the rightmost point. In order to avoid this discontinuity, those specific points at location X of the anomaly may depend only on the overlapping symbols b3 and b4 and may not depend on either the oldest bit b2 of the previous symbol shift nor the newest bit b5 of the subsequent symbol shift, but must be converged to a total of four points depending only on b3 and b4.

Figure 15:
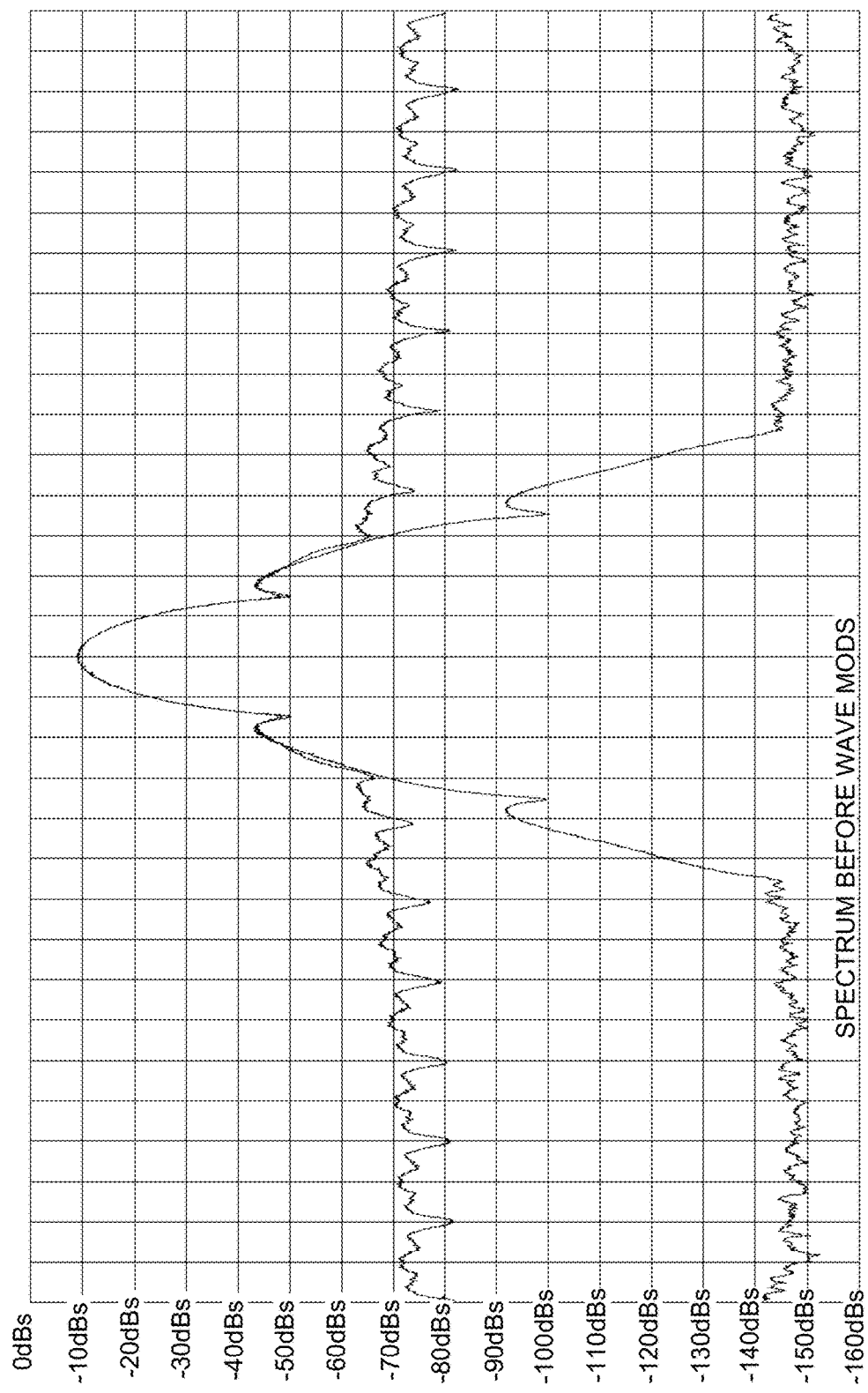
FIG. 15 is a graph illustrating a comparison of the spectrum of regular GMSK with that of FIG. 14 in accordance with the present invention.

The effect of such a waveform discontinuity is clearly seen in the spectrum of FIG. 15. While the correlation function has been improved, the far-out spectral sidelobes have risen from a −150 dB level to a −70 dB level. This is to some extent inevitable, as the power spectrum is the Fourier transform of the autocorrelation function; however, eliminating the discontinuity should not degrade the correlation function but should improve the spectrum.

Figure 13:
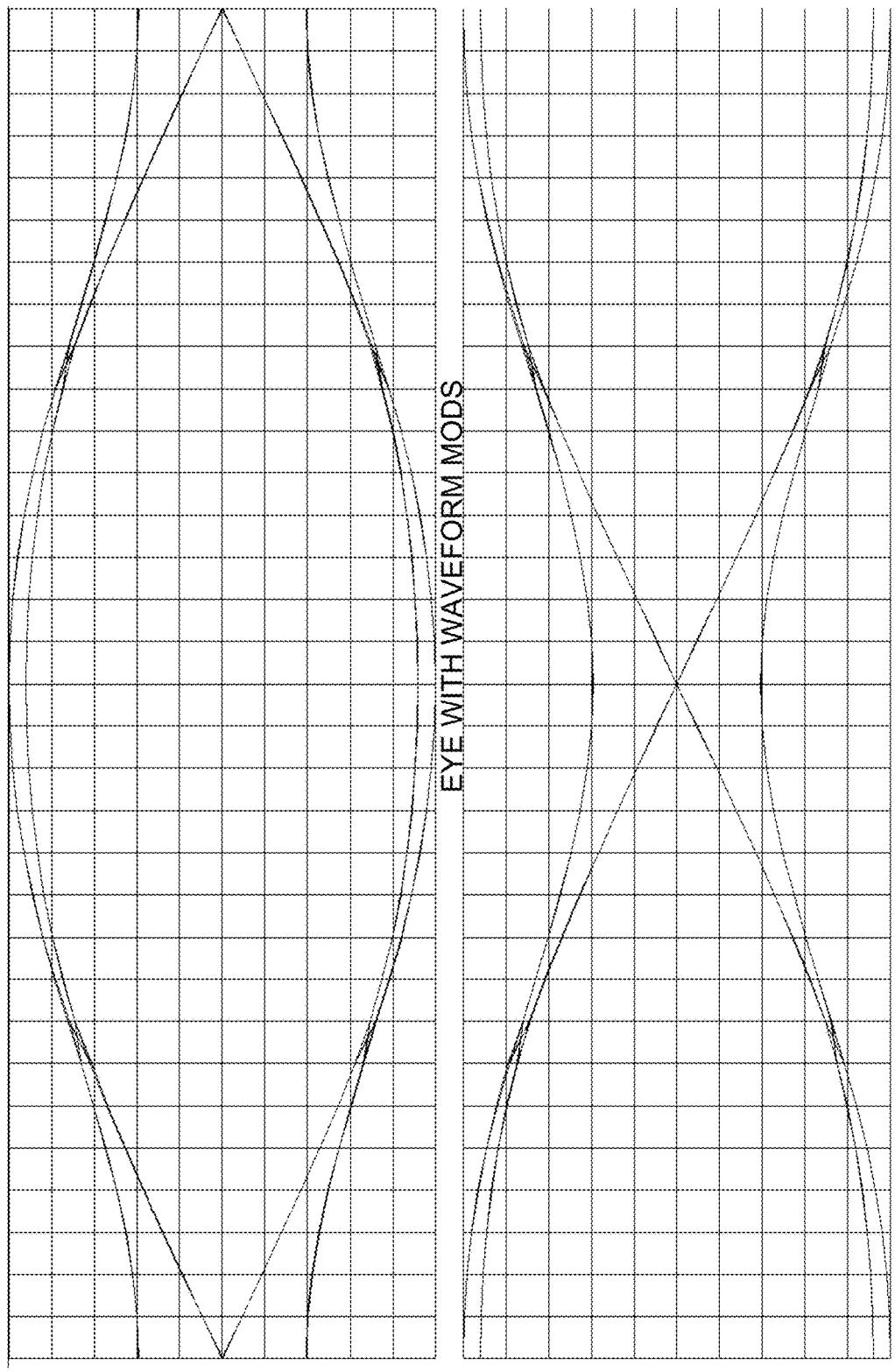
FIG. 13 is a graph illustrating an eye diagram of modulation engineered to depend on 3 chips in accordance with the present invention.
Figure 14:
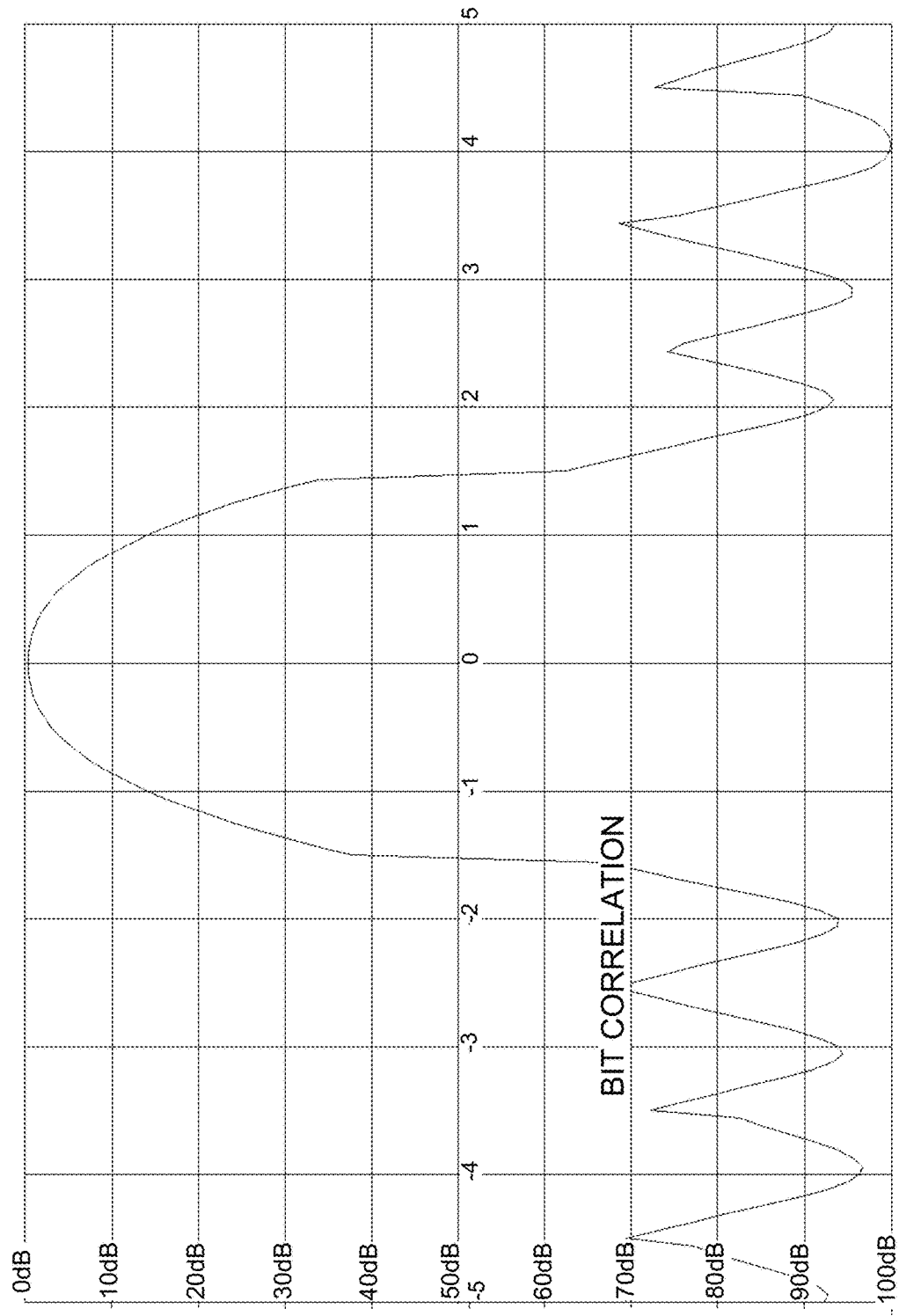
FIG. 14 is a graph illustrating the correlation function of the modulation of FIG. 13 in accordance with the present invention.

While producing the waveform of FIG. 13 was readily automated, eliminating the discontinuity in FIG. 13 is truly more akin to handcrafting. The reason is, if the points at location X of the anomaly are replaced with their average, this will cause a discontinuity with the preceding and following points. Therefore, a smooth modification of the curves along their whole length is required to force convergence at the four points X. This may be achieved by the following procedure.

In step 1, two values at the left-hand side of the anomaly are designated as a1 and b1 and those on the right are designated as a2 and b2. The values of notional points midway between the left and right points on their respective waveforms are computed as $a_{1.5}=(a1+a2)/2$; and $b_{1.5}=(b1+b2)/2$.

In step 2, if the value of $a_{1.5}$ is the greater and the value of $b_{1.5}$ is the smaller, the factor $1+\alpha$ is computed, by which waveform a must be reduced and waveform b increased at that notional point to force convergence, as:

$$(1+\alpha)b_{1.5}=a_{1.5}/(1+\alpha) \quad (4)$$

$$\alpha=\sqrt{(a_{1.5}/b_{1.5})}-1$$

Now, it is desired that the above factor should modify the waveform at the desired point of convergence, but that the factor should gradually diminish to unity at the center of the eye and at the ends where the waveforms are already acceptable.

This is done by applying a factor $1+0.5\alpha(1-\cos(\theta))$ to modify the waveform points, where $\theta$ varies from 0 to 180 degrees along the waveform from each end to the middle. This factor is unity at the ends and in the middle, but is the desired factor $1+\alpha$ at the anomaly.

Figure 16:
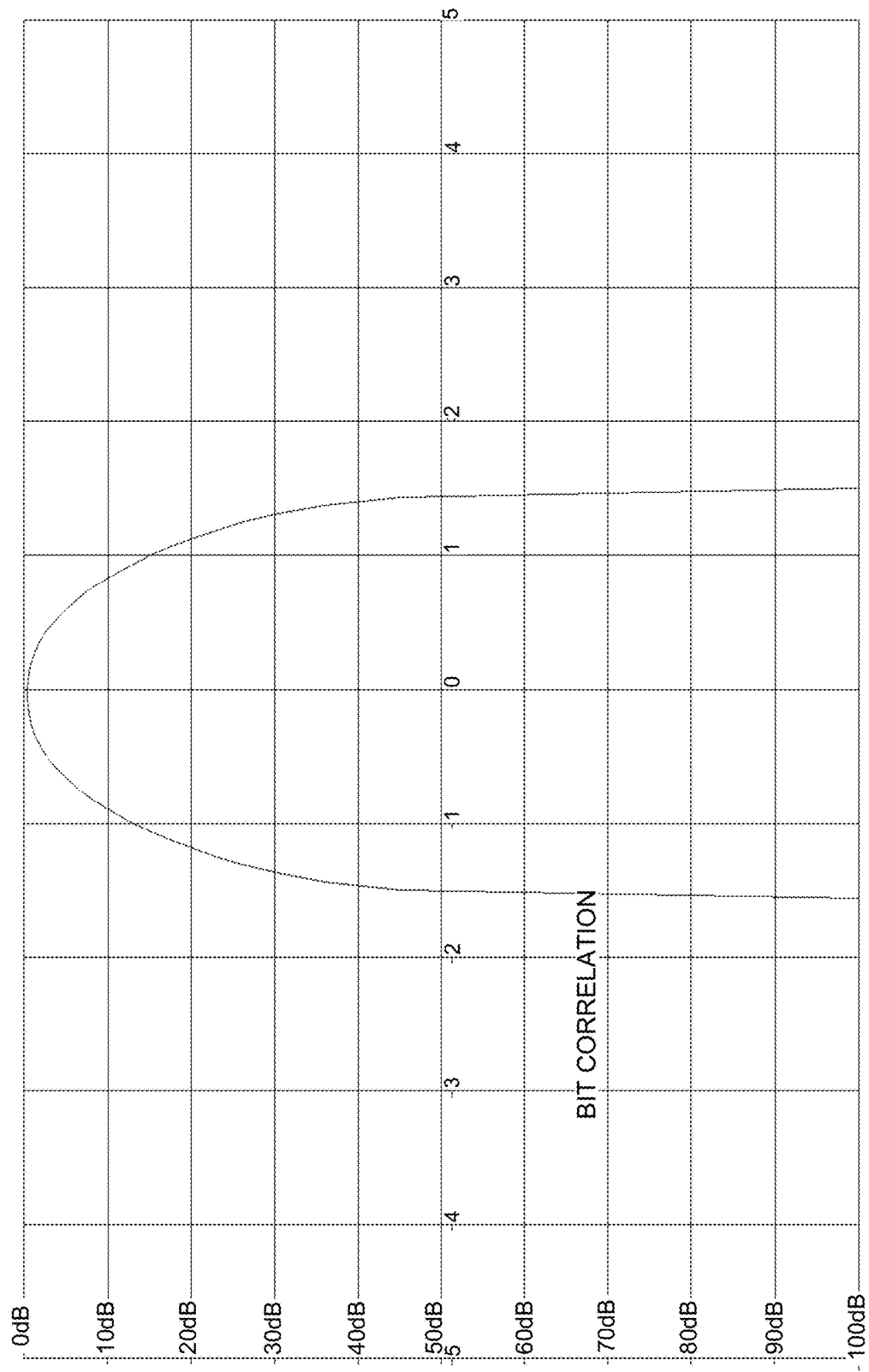
FIG. 16 is a graph illustrating the correlation function of a more handcrafted waveform in accordance with the present invention.
Figure 17:
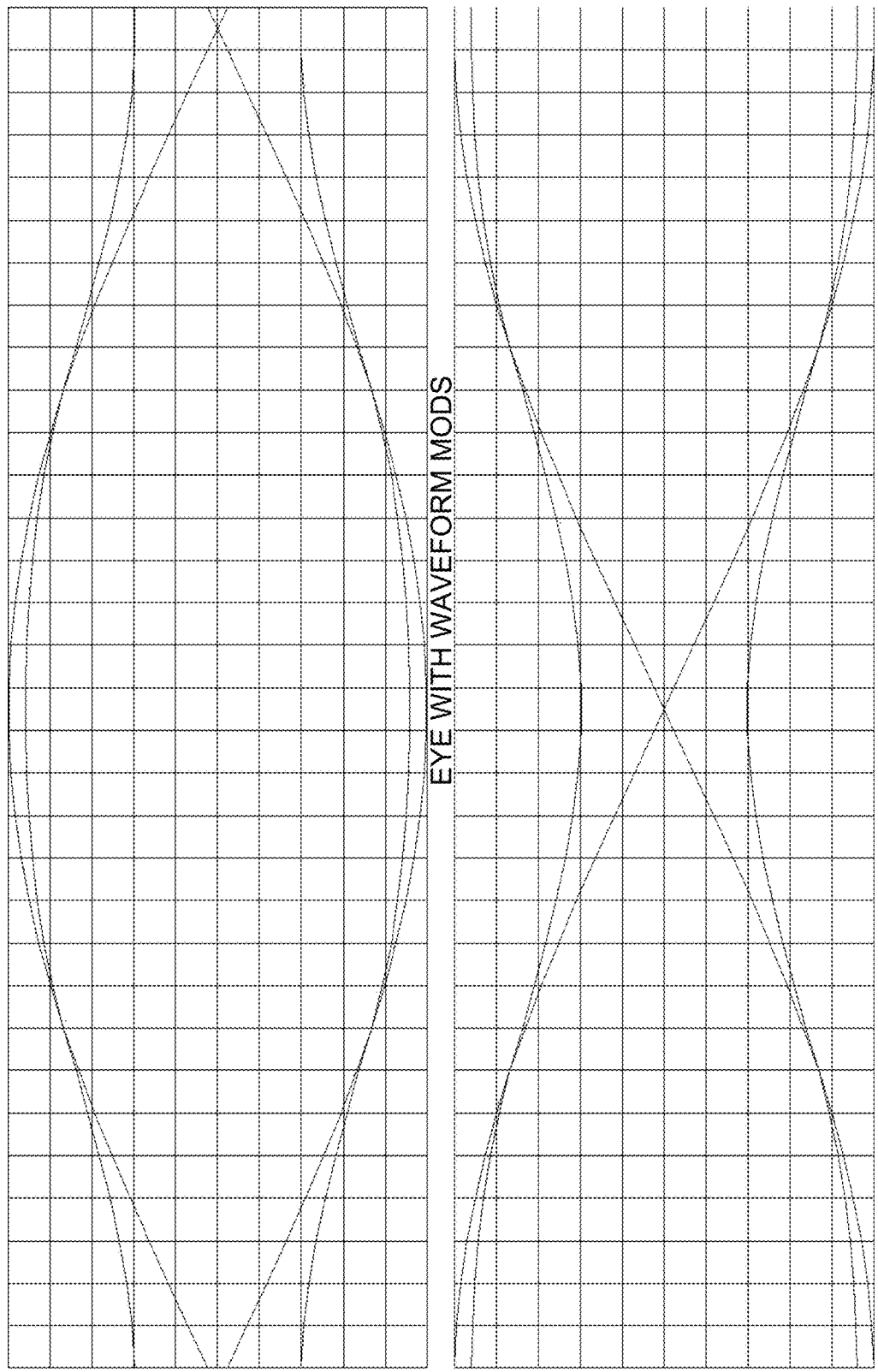
FIG. 17 is a graph illustrating an eye diagram of the handcrafted waveform in accordance with the present invention.
Figure 18:
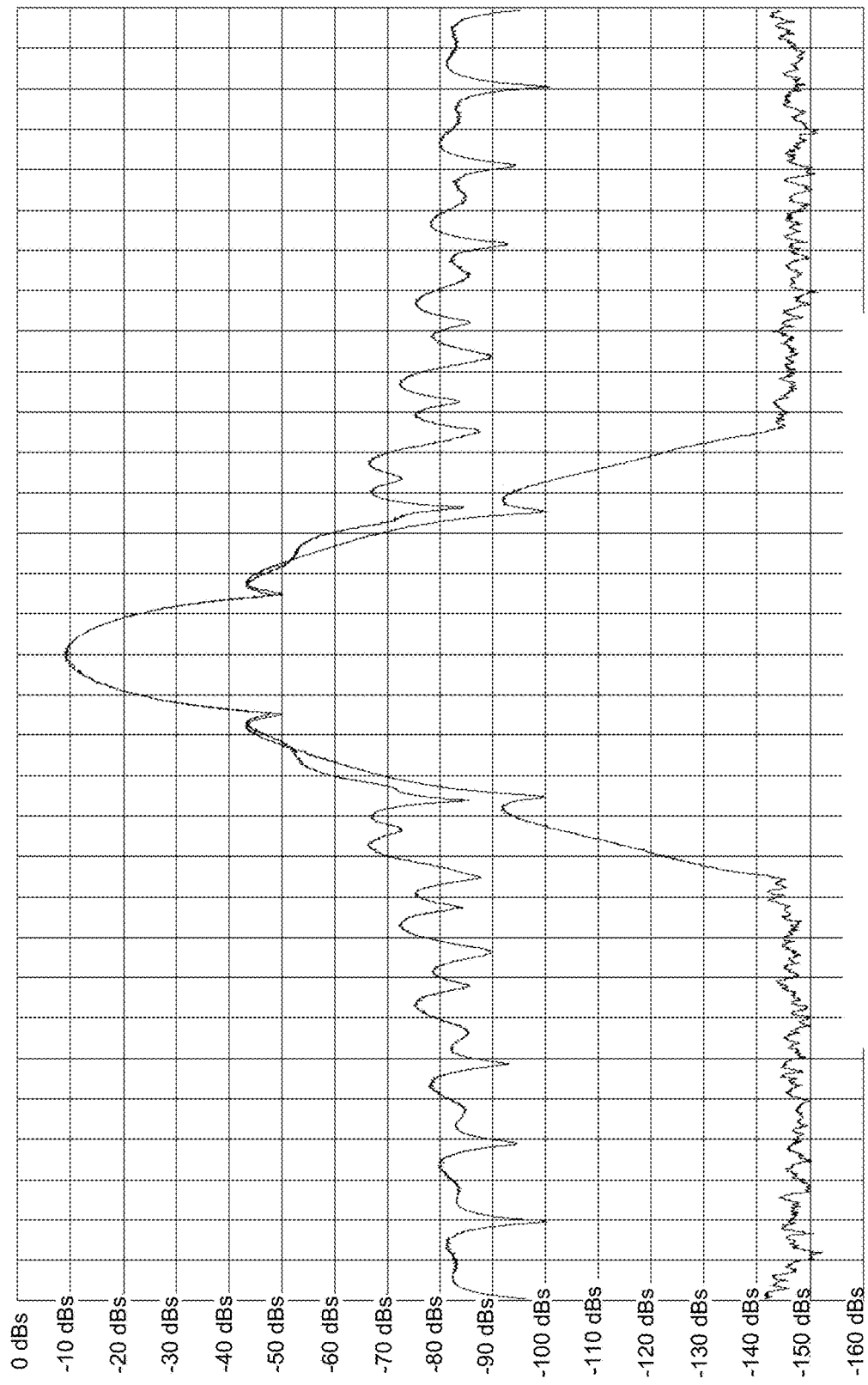
FIG. 18 is a graph illustrating the spectrum of the handcrafted waveform in accordance with the present invention.

FIG. 16 illustrates an exemplary correlation function of the waveform when handcrafted as explained above. The chip-dependence outside of +/−1 bit descends even more precipitously than before. FIG. 17 confirms that the discontinuity has been removed by handcrafting, and FIG. 18 shows that the far-out spectrum has been reduced about 10 dB. Of course, the far-out spectrum may be further reduced by the low-pass roofing filters (1060A,B) with the reintroduction of some sidelobes of the correlation function. To avoid such sidelobes becoming troublesome, the filter cutoff frequencies should be, for example, Gaussian filters with a BT in the 1.5 to 3 range. A sharp filter will produce more ringing and simulation has shown that a sharp cutoff of about 3 times the bitrate keeps the ringing on the ACF down to about the −70 dB level.

If it is desired to further reduce the correlation sidelobes, one method of achieving this is to increase the BT of the GSMK modulation. However, this is a straight choice between spectral sidelobes and correlation sidelobes. The resulting waveforms must be handcrafted anew for each choice, and sufficient information has been disclosed above for a person skilled in the art to analyze such a choice for a particular application. Attention is thus now turned to alternative waveforms that can be useful in an exemplary automotive MIMO radar system, and which may reduce correlation sidelobes further while achieving a better compromise with spectral sidelobes than GMSK.

GMSK waveforms have a 3-symbol dependence because of the 8 trajectory waveforms that may be seen in FIGS. 6, 12, and 17, even at the optimum sampling point. GSMK has that characteristic because an I-bit lying between two Q bits of equal polarity cannot achieve full amplitude as there is no Q zero crossing between the two equal Q-bits. If Q is non-zero, I cannot be unity due the constant envelope constraint where $I^2+Q^2=1$. The peak value in the center of the I-bit may in fact be predicted to be:

$$I\text{peak}=+1, \text{ if } (Q1 \cdot \text{xor} \cdot Q2)=1 \qquad (5a)$$

$$I\text{peak}=+\sqrt{(1-|Q\text{min}|^2)}, \text{ if } (Q1 \cdot \text{xor} \cdot Q2)=0 \qquad (5b)$$

In order to have single-chip dependence in the middle of the eye, Qmin must therefore be zero, that is, the Q waveform should go to zero between two Q bits, even when they are the same.

FIG. 19 introduces some new diagrams that assist in understanding constant-envelope, digital modulation.

The trellis diagram in FIG. 19 indicates how the phase changes when the frequency is modulated according to the frequency modulation waveform illustrated below the trellis diagram. Assuming that the phase at point Q−1 is −90 degrees, the first frequency step up to +dF causes the phase to change at the rate of $2\pi \cdot dF$ radians per second. If $dF=0.25B=0.25/T$, where B is the bit rate or chip rate and T is the reciprocal of B, namely the chip period, then the phase change over one chip period from Q−1 to Io is exactly 90 degrees, so that the phase moves from −90 to 0 from point Q−1 to Io. If Q1 is also encoded into a +dF frequency shift, the frequency remains at dF for a further time T and the phase changes by a further 90 degrees to the value +90 degrees at point Q1. The constellation diagram shows by asterisks where the phase ends up at points I0, Q1, I2, Q3, etc. Points denoted by In have terminal phases that are either 0 or 180, where the real part of the complex vector is +/−1 corresponding to the maximum eye-opening of the real part I, while the imaginary part goes to zero corresponding to a zero crossing of the imaginary part, Q. Correspondingly, constellation points denoted by Qn have terminal phases that are either +90 or −90, and the I-values go to zero at those points.

Figure 20:
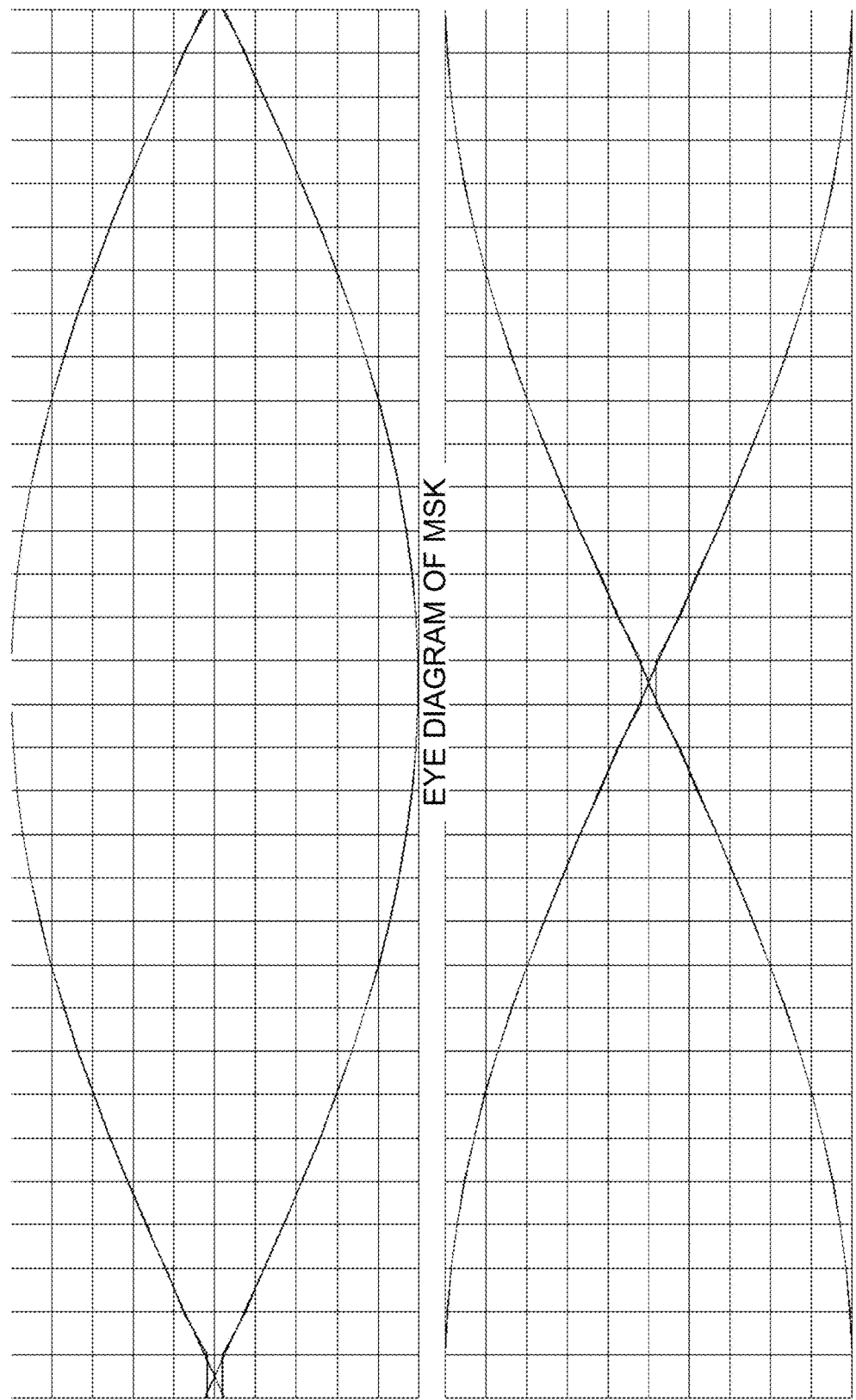
FIG. 20 is a graph illustrating the eye diagram of MSK computed using 16 samples per chip in accordance with the present invention.
Figure 21:
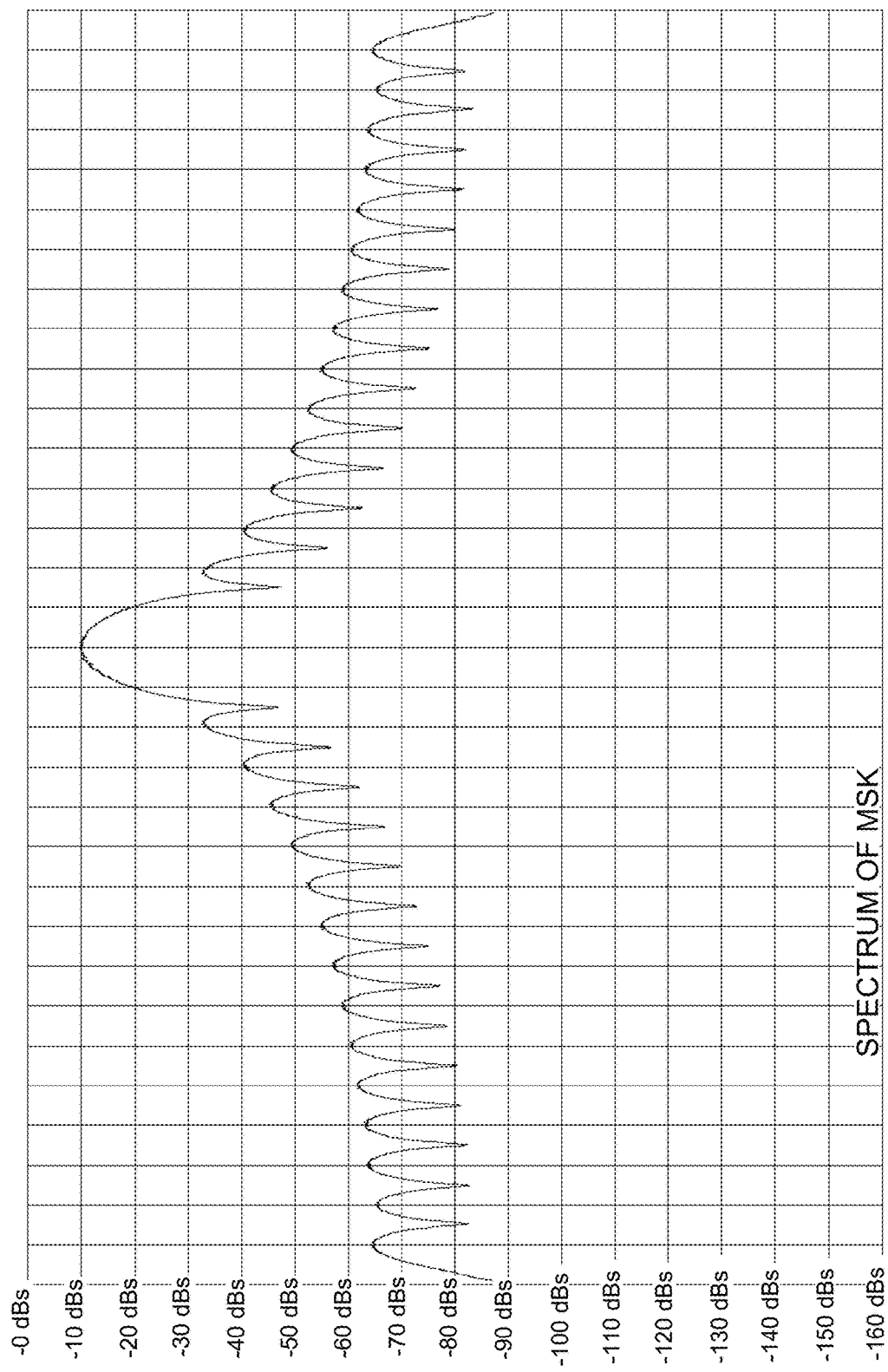
FIG. 21 is a graph illustrating the spectrum of unfiltered MSK in accordance with the present invention.
Figure 22:
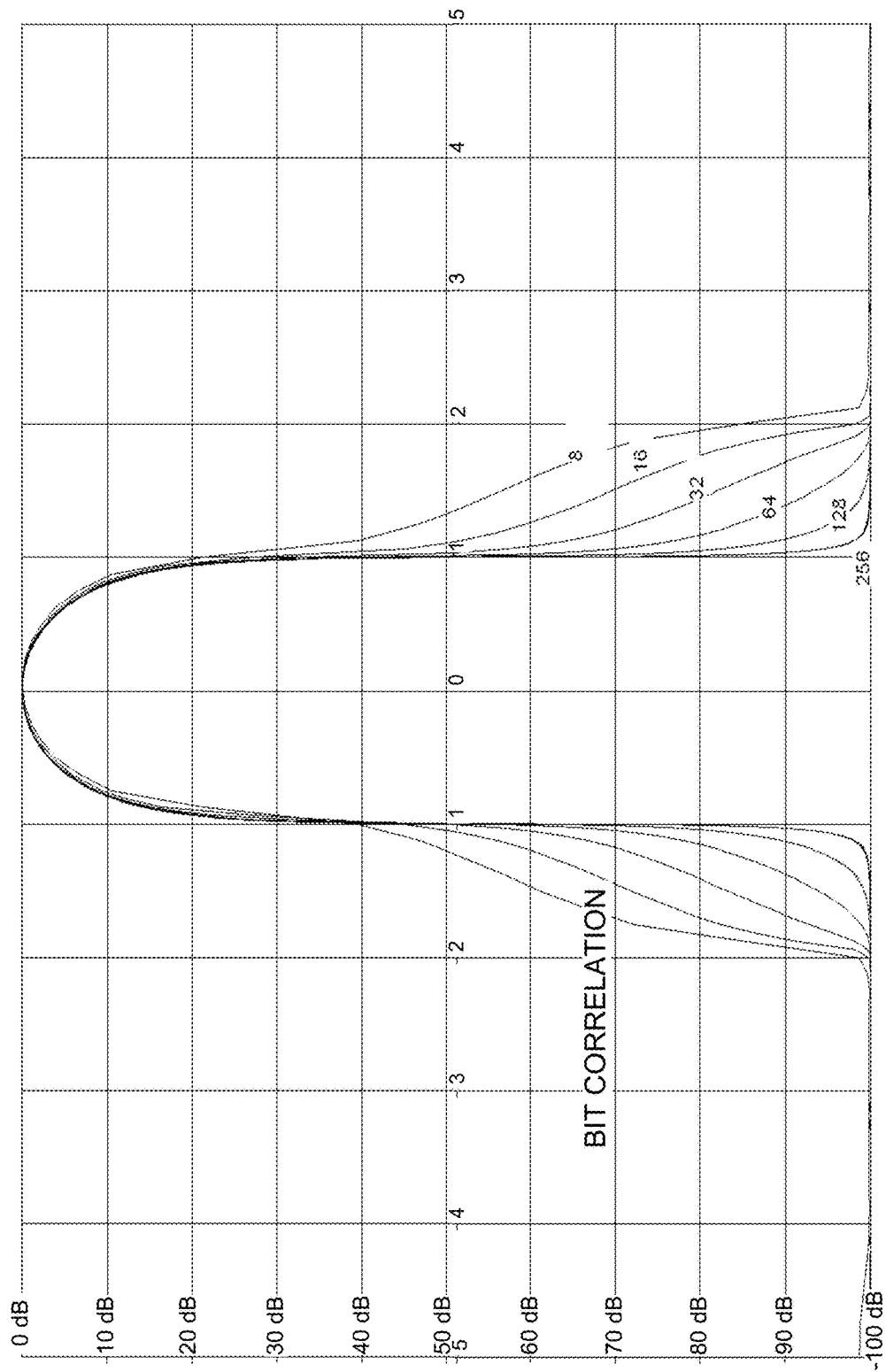
FIG. 22 is a graph illustrating the correlation function of MSK versus the number samples per chip in accordance with the present invention.
Figure 27:
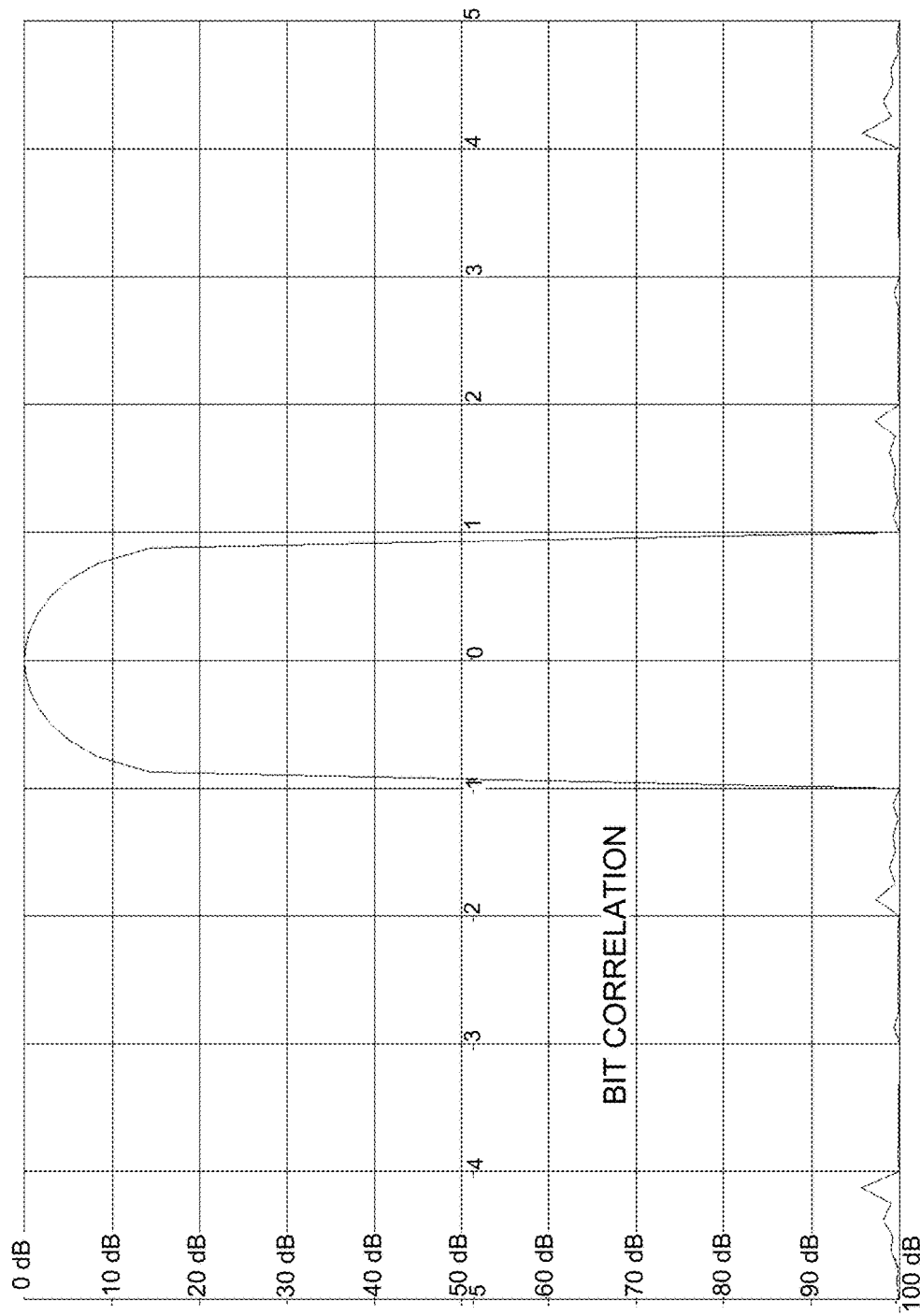
FIG. 27 is a graph illustrating the eradication of correlation sidelobe skirts of MSK with 8 samples/chip by waveform handcrafting in accordance with the present invention.
Figure 28:
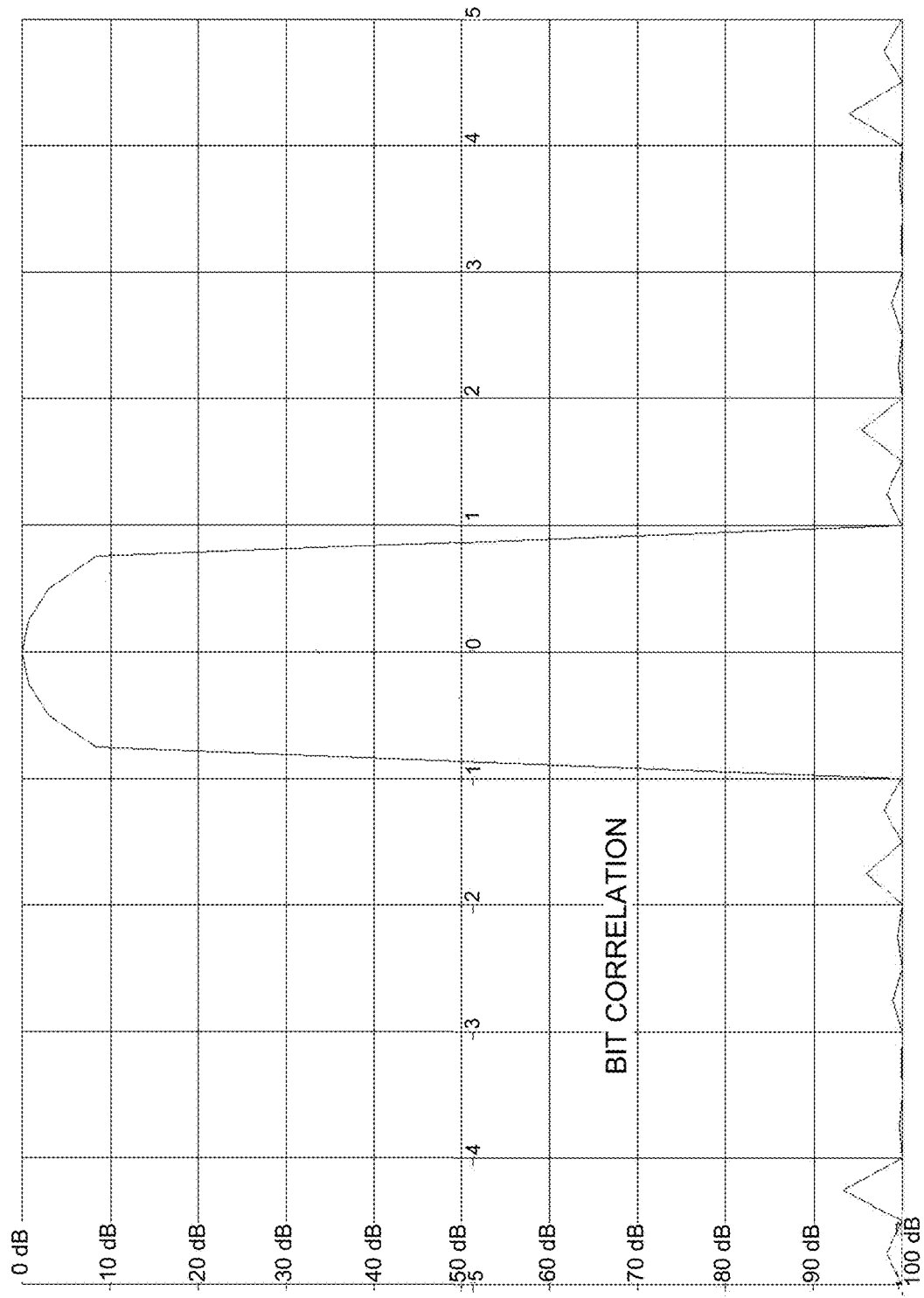
FIG. 28 is a graph illustrating the correlation function of handcrafted MSK at 4 samples/chip in accordance with the present invention.

In FIG. 19, the frequency deviation is either +dF or −dF and changes abruptly from one value to the other, while the phase changes at a constant rate from one constellation point to the next. This modulation is known as "minimum shift keying" (MSK), and has the eye diagram illustrated in FIG. 20 and has the spectrum of FIG. 21. The spectral sidelobes are seen to be of the order of 15-20 dB higher than those of the handcrafted GMSK modulation illustrated in FIG. 18, due to the absence of filtering to round the waveform transitions. The eye diagram illustrates a small anomaly at zero crossings which is partly an artifact of the graph-plotting program interpolating between the finite number of samples (16 in FIG. 20) used per bit period. Nevertheless, this is exactly what will occur in a receiver bandpass filter and affects the resulting correlation function. The correlation function is therefore plotted in FIG. 22 with the number of samples per chip varying from 8 to 256, in factors of 2. It can be seen that the limit, for a large number of samples per bit, corresponding more closely to a continuous waveform, is a correlation function that falls precipitously to zero at +/−1 chip offset. With precise mid-eye sampling, the waveform therefore depends on only one chip, but with mis-sampling it depends on two adjacent chips, one I-chip and one Q-chip, as may be seen in the eye diagram of FIG. 20. This is a reduction of GMSK's 3-chip dependence with mid-eye sampling and 4-chip dependence (or 2-chip, with handcrafting) with mis-sampling, although this only seems to be achieved with a large number of samples per bit. Using 8 samples per chip, and with 1/2-chip mis-sampling, the waveform may be seen from the correlation function value at +/−1.5 chips to depend on two additional bits that have an influence at the −60 dB level. This drops to −70 dB using 16 samples per chip and continues to reduce with greater numbers of samples per chip. However, further research shows that the skirts of the correlation function with small numbers of samples per bit were due to slight numerical inaccuracies that made the waveforms slightly different in dependence on past history. Handcrafting by averaging the corresponding points in the eye diagram, storing the averaged values in a waveform lookup table (e.g. memory 1030 of FIG. 5), and then using the average points, results in the sidelobe skirts being eradicated, which is illustrated in FIG. 27 for 8 samples per chip and in FIG. 28 for as few as 4 samples/chip.

Figure 23:
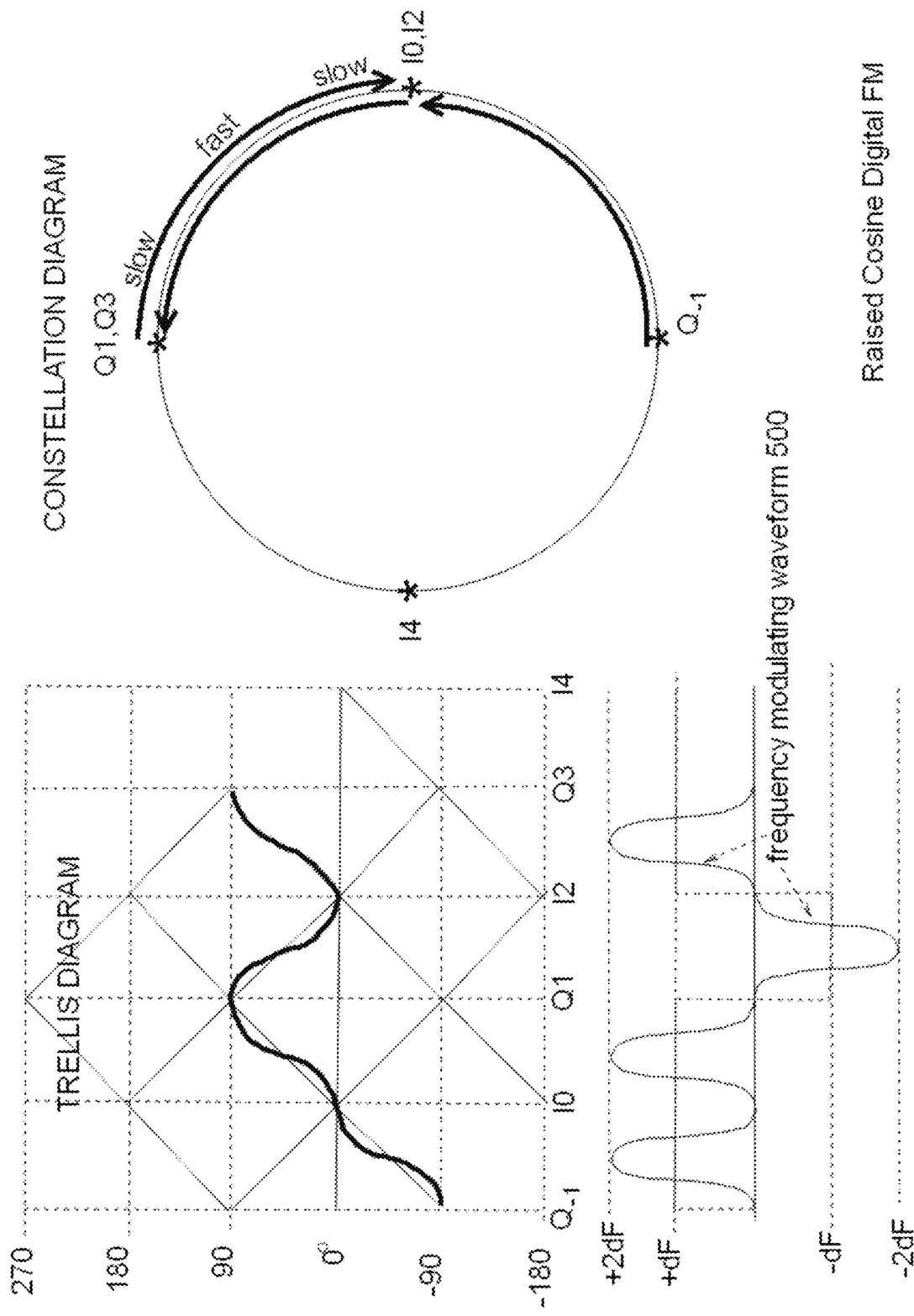
FIG. 23 is a graph illustrating raised cosine digital FM in accordance with the present invention.
Figure 24:
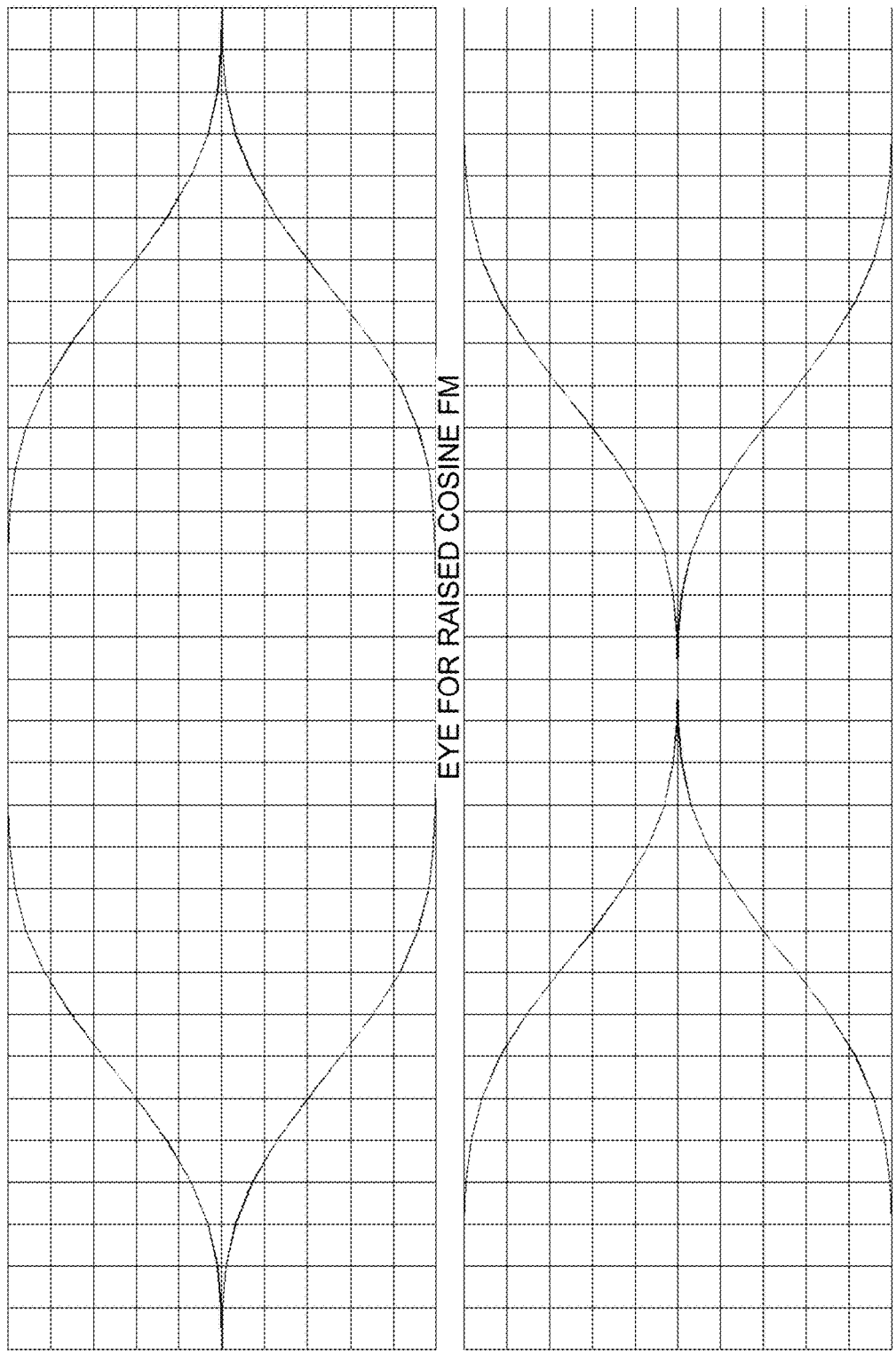
FIG. 24 is a graph illustrating the eye diagram for raised cosine digital FM in accordance with the present invention.
Figure 25:
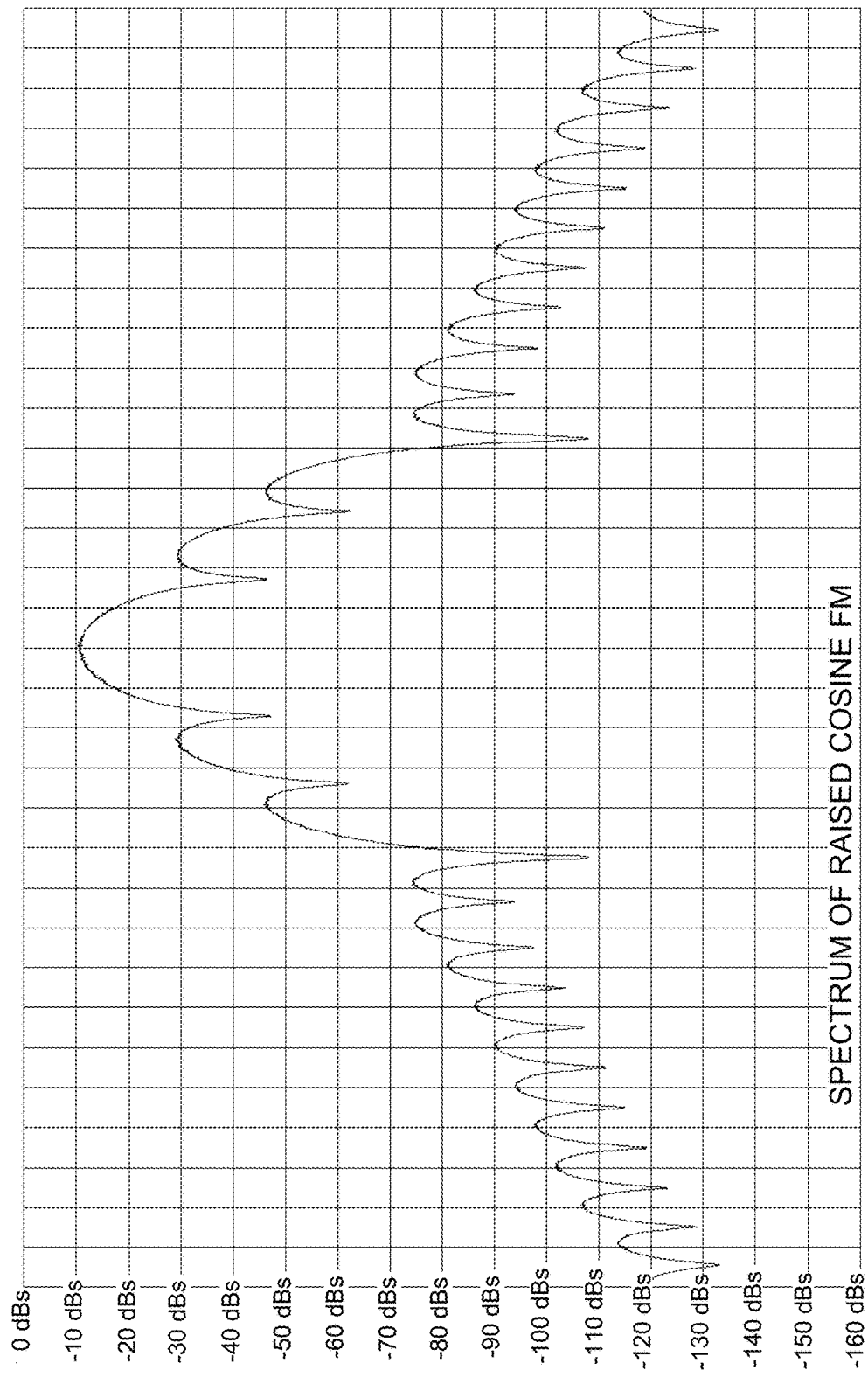
FIG. 25 is a graph illustrating the spectrum of raised cosine digital FM in accordance with the present invention.
Figure 26:
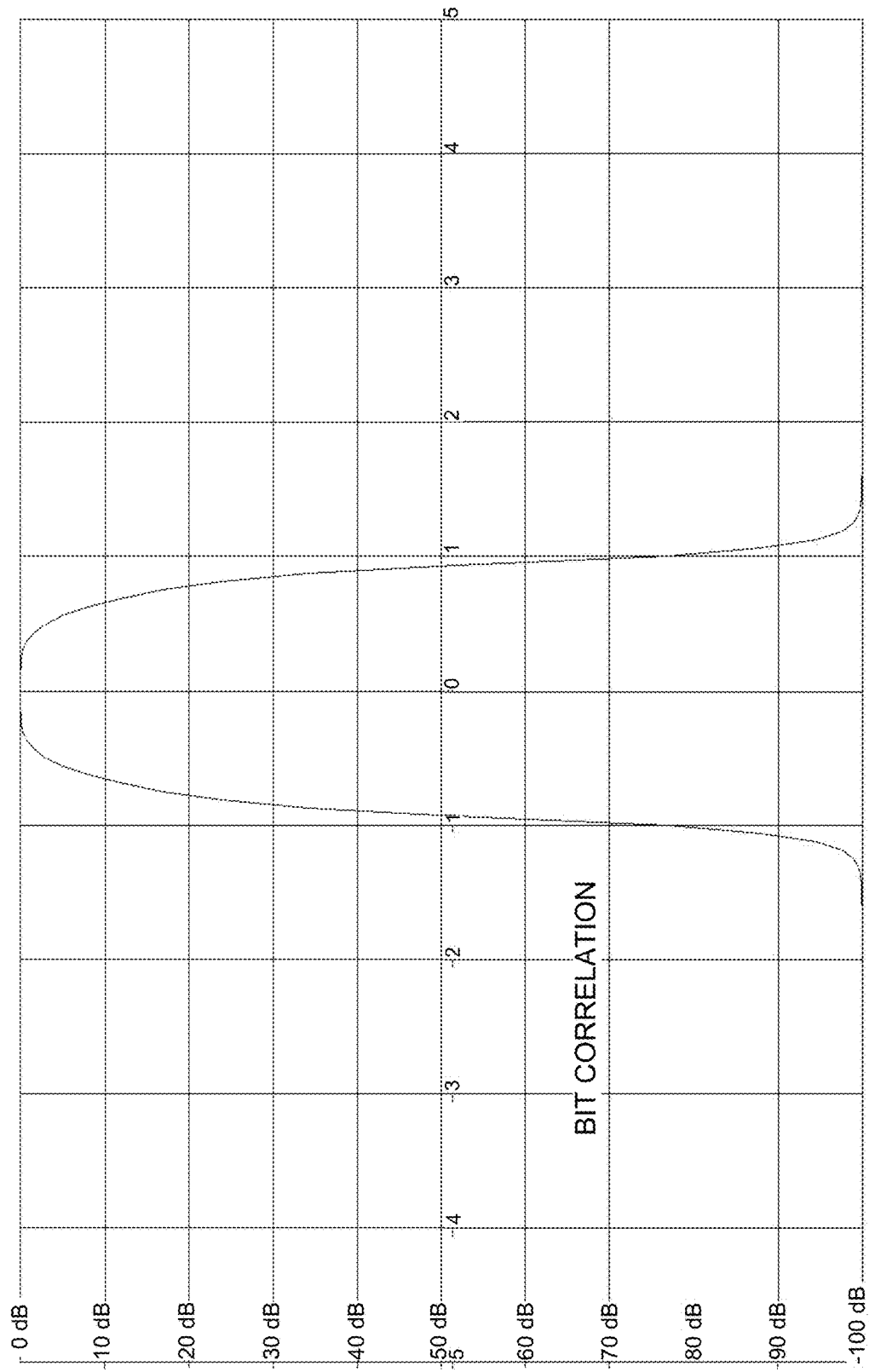
FIG. 26 is a graph illustrating the correlation function for raised cosine digital FM in accordance with the present invention.
Figure 29:
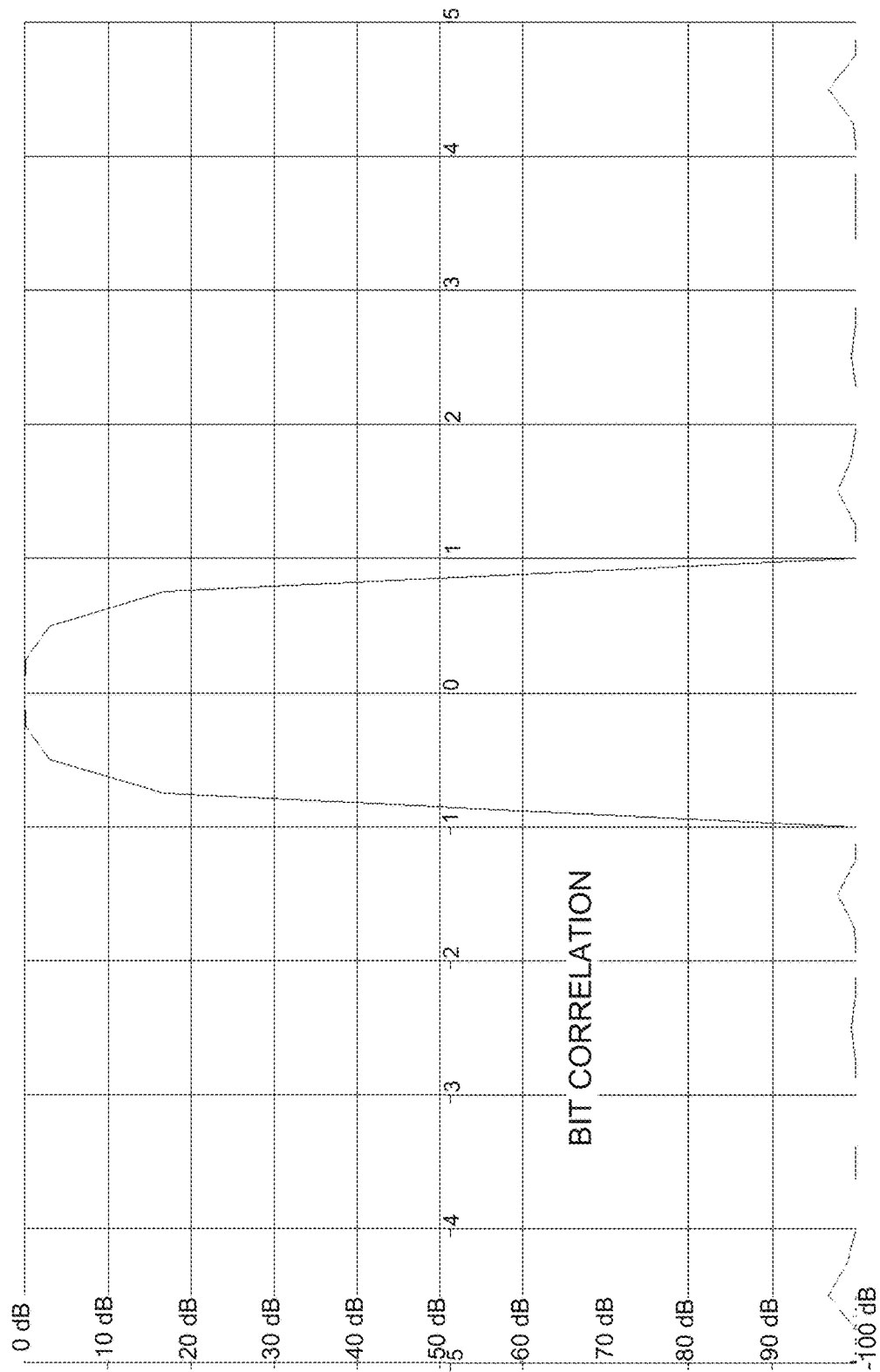
FIG. 29 is a graph illustrating the correlation function for raised cosine digital FM at 4 samples/bit after handcrafting in accordance with the present invention.

It is desirable to reduce the spectral sidelobes far away from the main lobe to a level lower than what unfiltered MSK achieves. This should be accomplished by not changing the frequency abruptly between +dF and −dF but rather by using a smoother transition. If smoother transitions are produced by low-pass filtering the frequency modulating waveform, this is tantamount to using GMSK and will re-introduce additional intersymbol interference (ISI or correlation sidelobes). To obtain a different result, shaping is used rather than filtering. The shaped waveform can be made the same for each chip and independent of the value of a preceding or following chip, thereby achieving spectral improvement without the addition of correlation sidelobes (aka ISI). Moreover, to ensure that the phase ends up at the same constellation points of +/−90 or 0/180 after each chip, and not a value depending on chip history, the area under the shaped frequency waveform must remain the same value of dF×T=0.25. FIG. 23 illustrates that a raised cosine frequency pulse that peaks at 2 dF has this property. FIG. 24 illustrates the eye diagram for this modulation and FIG. 25 illustrates the spectrum, demonstrating the more rapid fall of the spectral sidelobes as a result of the raised cosine shaping. The correlation function before handcrafting the waveform is illustrated for 16 samples per chip in FIG. 26. After handcrafting the waveform by averaging all corresponding points to form a waveform memory and using the waveforms from memory, the correlation function remains substantially ideal down to as few as 4 samples per chip, as illustrated in FIG. 29.

Figure 30:
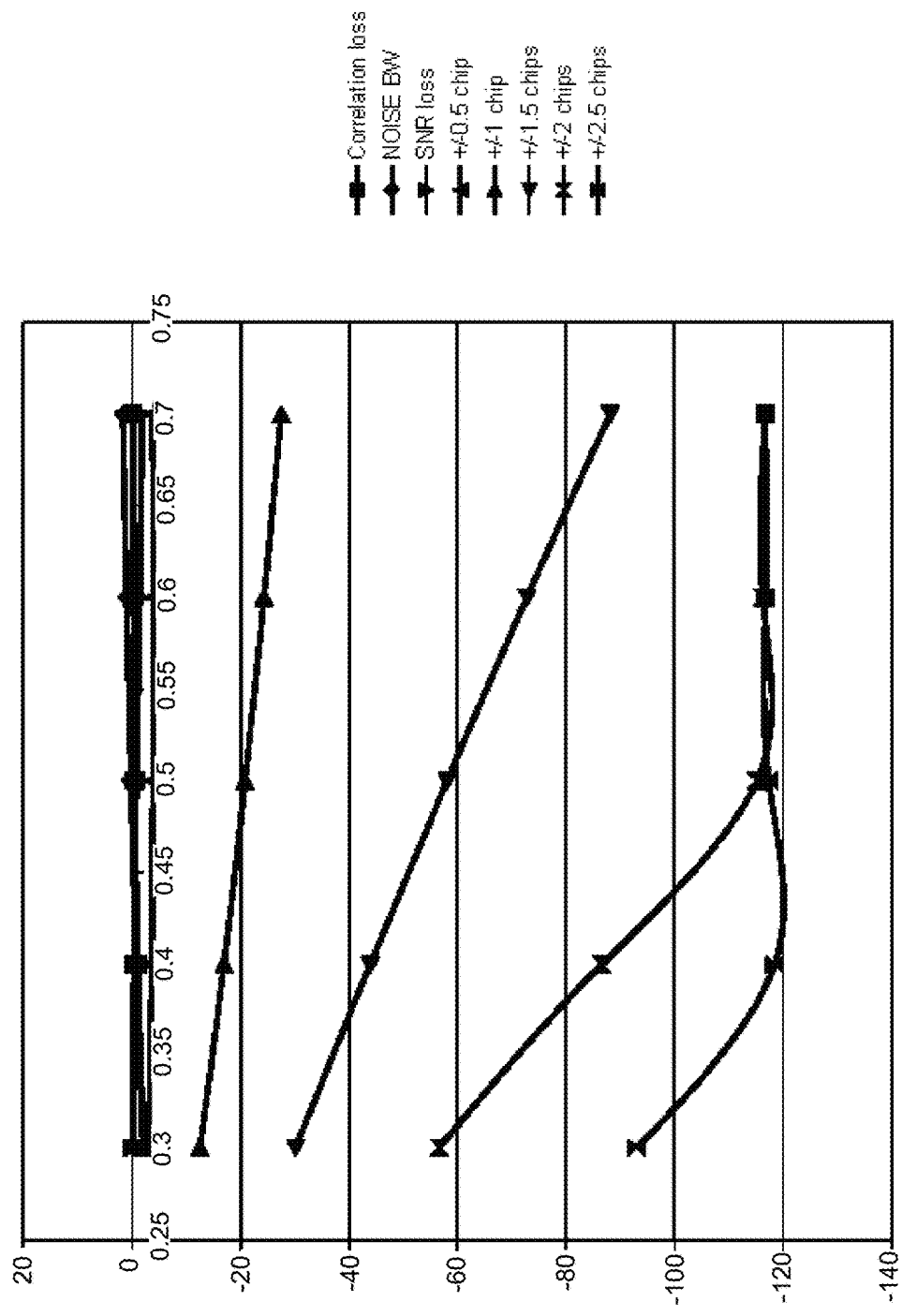
FIG. 30 is a graph illustrating the variation of parameters with receiver BT for raised cosine transmitter modulation in accordance with the present invention.
Figure 31:
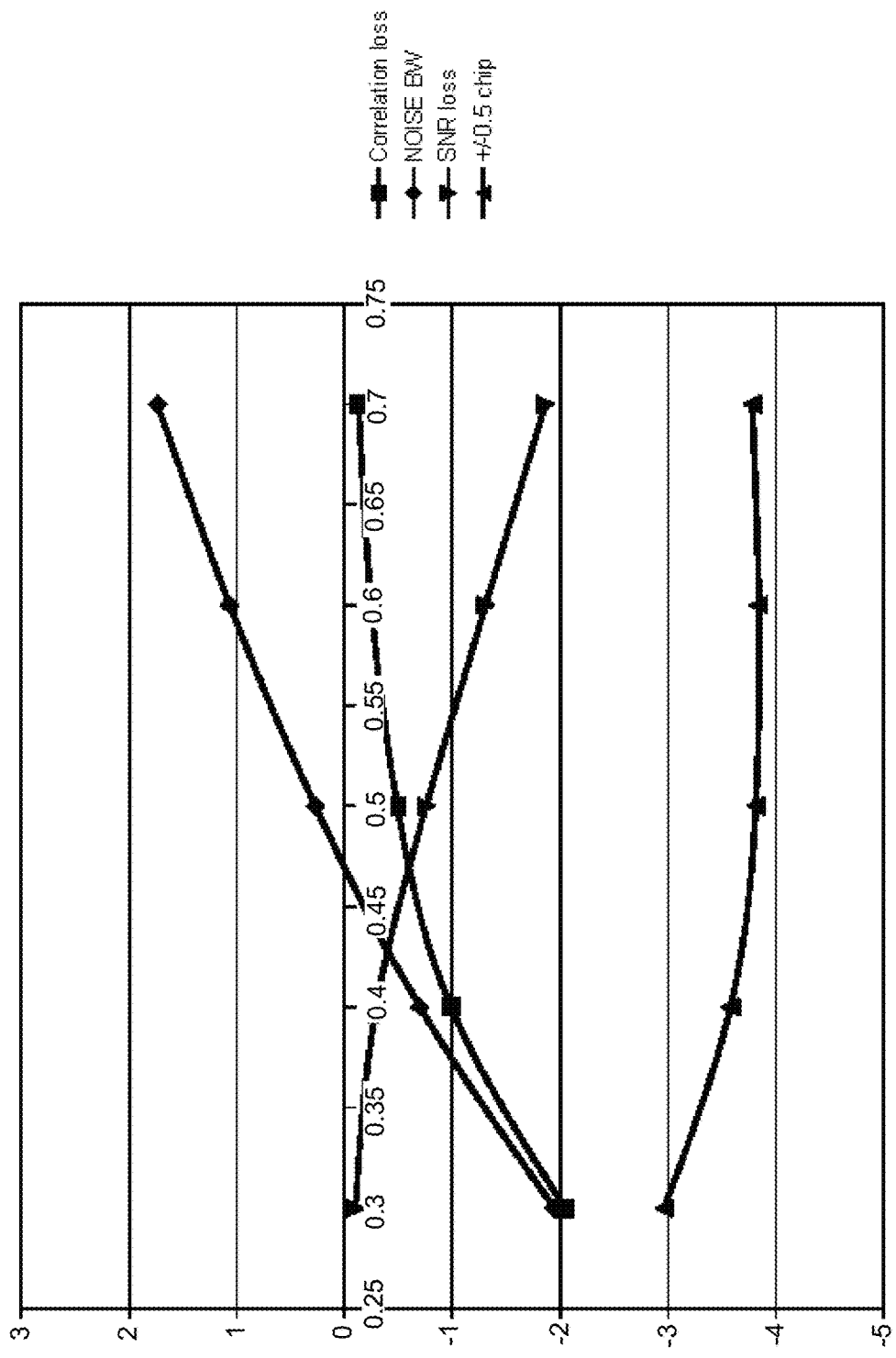
FIG. 31 is a graph illustrating the parameters of FIG. 30 on a finer dB scale in accordance with the present invention.

The effect of receiver filtering when the transmitter uses handcrafted raised cosine digital FM is now illustrated in FIGS. 30 and 31 to compare with using GMSK, which was illustrated in FIGS. 11 and 12. The practical significance of these parameters is as follows: If the radar system needs to implement strong target subtraction in order to unmask weaker target reflections that are close in both range and Doppler, then the complexity of the strong target cancellation procedure is proportional to the number of correlation sidelobes after the receive filter that are significantly strong. For example, if it is desired to cancel a strong target echo to a level of −60 dB relative its uncanceled value, then FIGS. 30 and 31 illustrate that, for a receiver filter BT factor of 0.53 that gives a 1 dB loss of signal-to-noise ratio compared to a matched filter, the correlation sidelobes at +/−1.5 chips are at a level of approximately −62 dB. Thus, canceling the principal lobe and sidelobes at +/−1 chip will result in a 62 dB suppression even with the maximum +/−0.5 chip mis-sampling. Compared with FIGS. 11 and 12, the amount of suppression using GMSK would be approximately 48 dB. Thus, the raised cosine modulation provides a significant improvement over GMSK as regards to strong target suppression with a 3-tap interference canceler.

Other receiver filters can be considered, such as Boxcar filters, Bessel filters and the like, however, the present invention is more concerned with determining an optimum transmitter modulation. The transmitter modulation performances have therefore been compared using the same range of receiver filter characteristics, typified by a Gaussian filter with a range of −3 dB points relative to the chiprate determined by using various BT factors.

Figure 32:
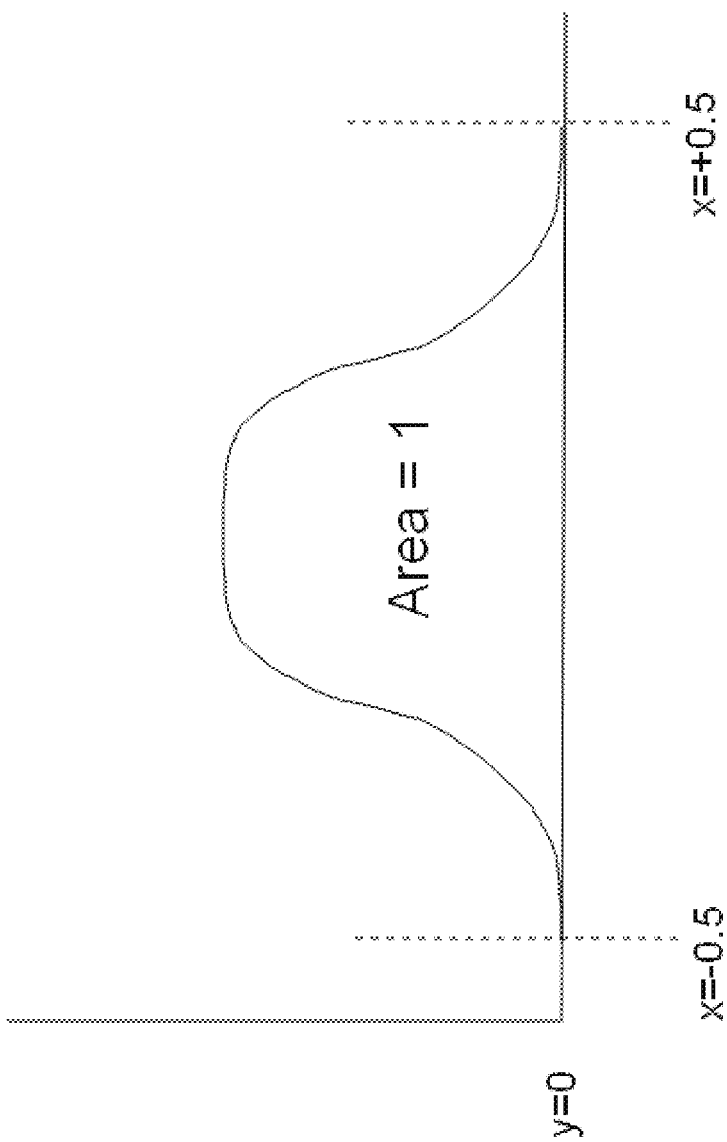
FIG. 32 is a graph illustrating a class of shaping functions to be investigated in accordance with the present invention.

The choice of a raised cosine, as mentioned above, was arbitrarily based on it being a known smooth function. A consideration may also be made as to what other properties such a function should have for a radar application, with a view to producing optimized properties. FIG. 32 illustrates the shape of the exemplary class of functions to be investigated. The function is zero for a bit interval of 0.5<x<−0.5, will have unity area, so as to equate to a unit area impulse in terms of the phase change it will cause when used as a frequency modulating waveform, and will have as many zero derivatives as possible at +/−0.5. As the function will be multiplied by the bit polarities, when the bit polarity changes at x=+0.5, any non-zero derivative at that point flips in sign, exhibiting a step, and the next highest order derivative will therefore exhibit impulses. The ultimate rate of fall off of spectral sidelobes is 6N db/octave when N is the order of the derivative of the waveform at which impulses first appear. Impulses have a flat spectrum, so working backwards, integrating N times will produce an increase in spectral roll-off slope by an extra 6 db/octave for each integration. Therefore it is desired that the function should have as many zero derivatives as possible at x=+0.5 in order to avoid discontinuities when the function is flipped by the random sign of a code chip.

Therefore, given the criteria a function f(x) should satisfy, namely:
a. (i) Unit area when integrated from x=−0.5 to x=+0.5.
b. (ii) As many zero derivatives as possible at x=+0.5, and optionally
c. (iii) a prescribed not-to-be-exceeded value at x=0, a set of simultaneous equations can be solved for the coefficients of a polynomial in $(x/2)^2$ that meet the above criteria, of which a few are plotted in FIG. 33.

The polynomials found by the above method were of the form $$ao+a1x^2+a2x^4+a3x^6 \qquad (6)$$

with the following coefficients:

|  | a0 | a1 | a2 | a3 | a4 |
|---|---|---|---|---|---|
| zero order | 1 | | | | |
| first order | 1.5 | −1.5 | | | |
| second order | 1.875 | −3.75 | 1.875 | | |
| third order | 2.1875 | −6.5625 | 6.5625 | −2.1875 | |
| fourth order | 2.46094 | −9.4375 | 14.76563 | −9.4375 | 2.46094 |

Figure 33:
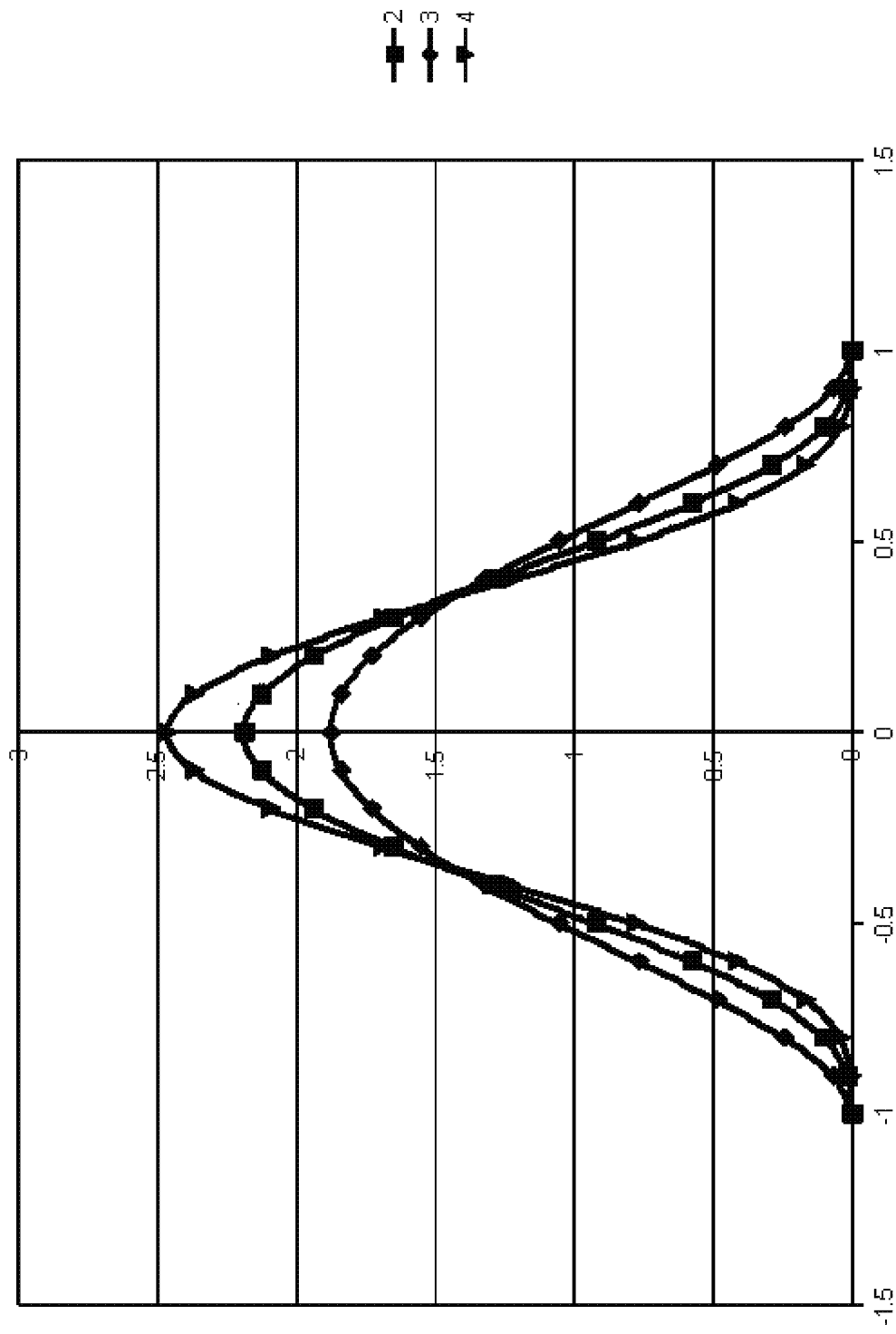
FIG. 33 is a graph illustrating other polynomial-based frequency-pulse shaping functions in accordance with the present invention.

FIG. 33 illustrates the shaping functions of second, third and fourth order that are computed without constraint (iii) above. However, if constraint (iii) is applied, curves with a peak frequency deviation limited to different values can be obtained for each order by giving up one of the zero derivative constraints (ii).

The effect on eye pattern, correlation sidelobes, and spectral sidelobes may also be explored to determine shaping functions that may be better in a given application (such as exemplified by the raised cosine shape discussed herein). However, the over-exploration of different functions has limited merit because such a function will only be used for a limited number of samples per bit (e.g., 4, 8 or 16, and those 4, 8 or 16 values are going to be quantized to a limited number of bits of accuracy). When using N samples per bit, the spectrum is only defined out to +/−N/2 chiprates, and thus, small differences in the functions that cause higher or lower far-out spectral sidelobes may be masked by the time and value quantizations. Attention is thus turned to the effect of value quantization of the I,Q waveforms and methods to determine the best quantized values and how to digital-to-analog convert them.

When I,Q values of digital FM signals are computed to a high degree of accuracy, a constant envelope will be maintained, namely $I^2+Q^2=1$. When however, the I and Q values are quantized to integer values less than some maximum value, such as +/−31 for 6-bit quantizing, +/−63 for 7-bit quantizing, or +/−127 for 8-bit quantizing, it is not possible to guarantee that the squares of all pairs of integers sum to the same integer value, and thus, a constant envelope cannot be maintained exactly, and the quantized I,Q values will have both amplitude and phase errors. However, since the transmit power amplifier is hard limiting, the amplitude errors will be substantially shaved off, leaving only the phase errors. Therefore, in one exemplary embodiment, a higher priority when selecting quantized I,Q values is given to pairs of values that are closest in phase to the unquantized vector without regard to amplitude error. Too much amplitude error may not be acceptable, but seeking pairs of quantized I,Q values (Kx,Ky) that are closest in phase angle, where Kx is within +/−1 quantizing step of the closest quantizing to I and Ky is within +/−1 quantizing step of the closest quantizing to Q, should give lower spectral sidelobes after hard limiting. This was confirmed to be so. However, there are low-pass filters (1060A,B) after the digital-to-analog converters (1050A,B) of FIG. 5 that alter the modified I,Q values, so it is necessary to compute the merit of this alternative quantization after these filters are included. This was done using Gaussian filters with a −3 dB cutoff point of 2 bitrates, and it was found that it was still beneficial to search for quantized values within +/−1 LSB that best matched the phase of I,Q.

Mathematically, integer values (Kx',Ky') within +/−1 of (Kx,Ky) are sought for which:

$(Kx'/Rk-I/R)^2+(Ky'/Rk-Q/R)^2$ is a minimum where $Rk=\sqrt{(Kx'^2+Kx'^2)}$ and $R=\sqrt{(I^2+Q^2)}$.

The modified values (Kx',Ky') were found to give lower spectral sidelobes after filters (1060A,B) and hard limiting in the transmit power amplifier.

Another practical imperfection that can give rise to elevated spectral sidelobes is digital-to-analog converter (DAC) accuracy. If the DAC does not give equal steps, this can result in additional quantizing noise. In particular, if a strong signal cancellation unit attempts to mimic the quantizing in the transmitter in order to maximize cancellation, the differences between the transmit DAC and the model used for cancellation will result in less effective cancellation. To mitigate this, a special form of DAC may be used that effectively guarantees equal quantizing steps in the mean, and this is briefly described below.

An exemplary 8-bit DAC (1050A,B) comprises 256 nominally equal current sources, each of which can be turned on and off by logic fed via an 8-bit value. When the 8-bit value is zero, no current sources are turned on, and when the 8-bit value is 255, 255 current sources are turned on (with one current source remaining turned off). In one exemplary embodiment, the 256 current sources are arranged in a ring, with those that are turned on occupying a first segment of the circle and those that are turned off occupying the other part of the circle. Whenever a new 8-bit value is received, it is first determined whether more current sources will be turned on, or whether current sources will be turned off. If more current sources are to be turned on, the additional one(s) of the currently OFF current sources clockwise of the ON segment are turned ON, while if fewer current sources are to be ON, then current sources counter-clockwise of the currently ON segment are turned OFF. In this way, the ON segment of current sources and the OFF segment of current sources continuously rotate giving all current sources equal use in the mean for contributing to every desired analog value. Moreover, the time between a current turning on and off is maximized, thus reducing the effect of any speed limitations. In this way, the error spectrum in the mean is zero and is reduced for lower frequencies so that the error power spectrum is quadratic rather than flat with reduced total net error power. In one exemplary embodiment, the digital-to-analog converter (DAC) is also balanced, like much of the rest of the high-frequency circuitry for the reasons mentioned above. A balanced DAC would transfer a current from a "+ output" to a "− output" in dependence on the digital value, thus providing a bipolar conversion with the digital value represented in the difference of the currents at the + and − outputs.

Other methods for optimizing the spectrum can be attempted when the number of samples per bit used to represent shaped digital FM signals is small. For example, at 4 samples per bit, if the vector is starting out at the 90 degree position [(I,Q)=(0,1)] and heading for the 0 degree position [(I,Q)=(1,0)] in four steps, the first sample is (0,1), the middle sample, no. 3, is at 45 degrees (0.7071,0.7071), and the 5th sample is (1,0). Only samples 2 and 4 remain to be defined and symmetry dictates that sample 2 is the same angular displacement from 90 degrees as sample 4 is from 0 degrees. Therefore, there is only one variable that can be explored to reduce spectral sidelobes.

Alternatively, the sample instants can be displaced by half a sample either side of the +/−90 and 0/180 points. The displacement is then a first variable and the angular position of the samples on either side of the 45 degree points is then a second variable. The spectrum can now be explored and optimized as a function of those two variables. The correlation function may be broader for this alternative, however, as the constellation points all depend on two bits and never only one.

Yet again, it can be beneficial if the vector dwells for two samples around each of the +/−90 and 0/180 degree points. The latter case was investigated and the values optimized for best spectrum, giving the following I,Q values quantized to 8 bits accuracy are listed below:

| I | Q |
| --- | --- |
| 0 | 127 |
| 52 | 117 |
| 117 | 52 |
| 127 | 0 |

The above values are used either with a + or − sign depending on the I and Q bit polarities required. It will be seen that the values (0,127) or (127,0) are repeated twice at the junction of two successive bits.

Figure 35:
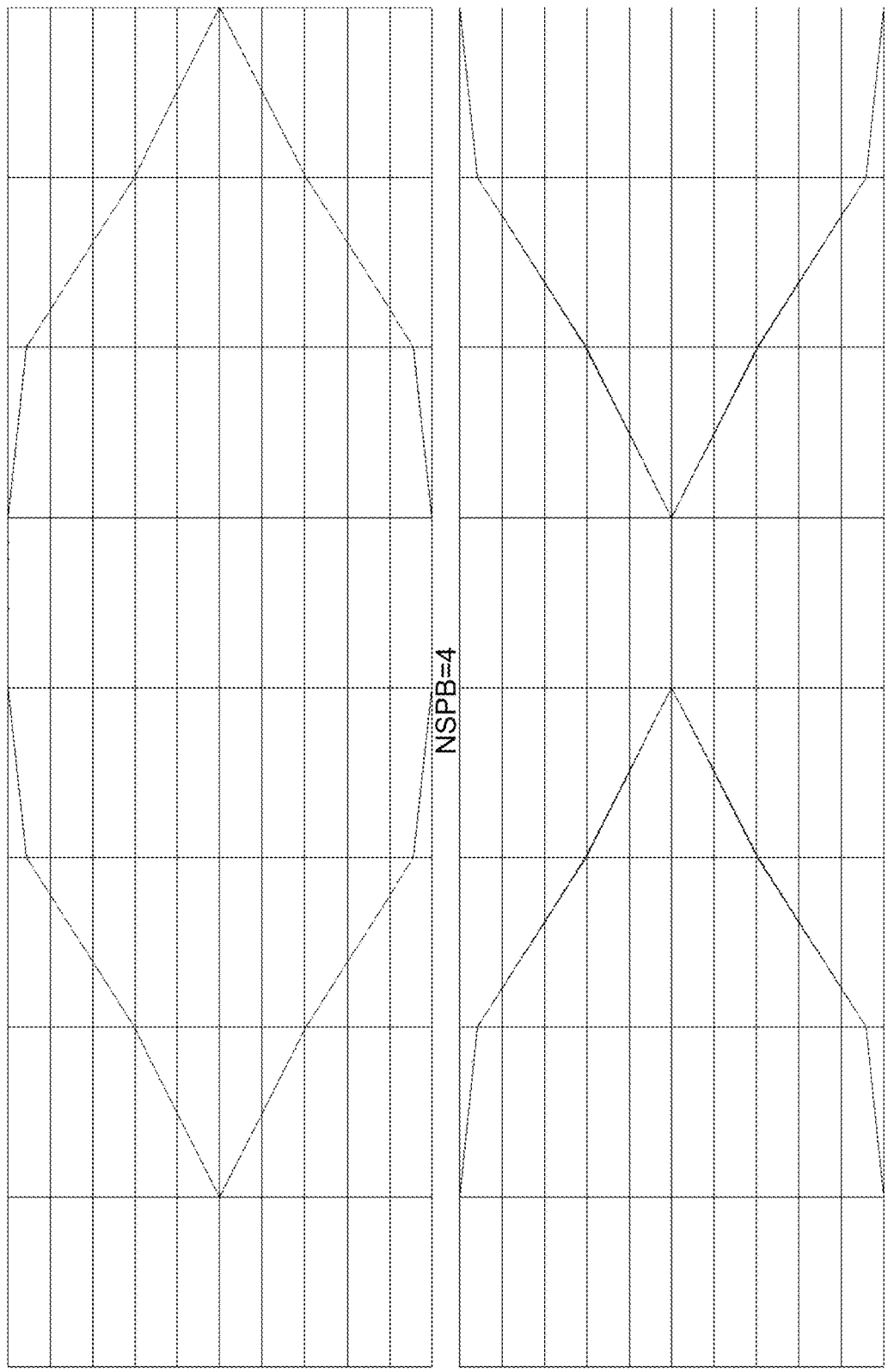
FIG. 35 is a graph illustrating one possible eye diagram optimized for four (4) samples per bit in accordance with the present invention.
Figure 36:
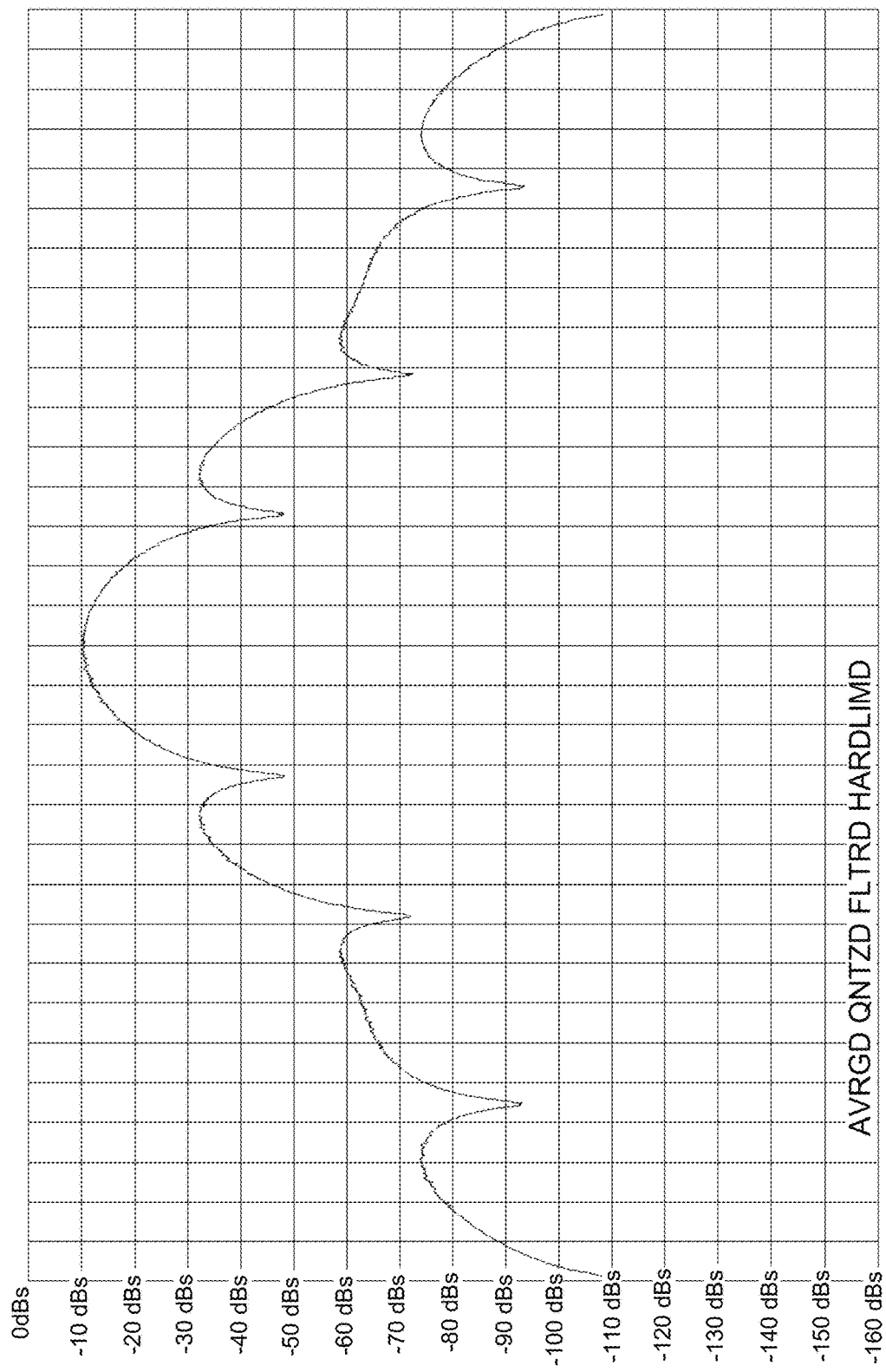
FIG. 36 is a graph illustrating the spectrum of the waveform of FIG. 35 with Gaussian post D to A filter BT=0.8 in accordance with the present invention.
Figure 37:
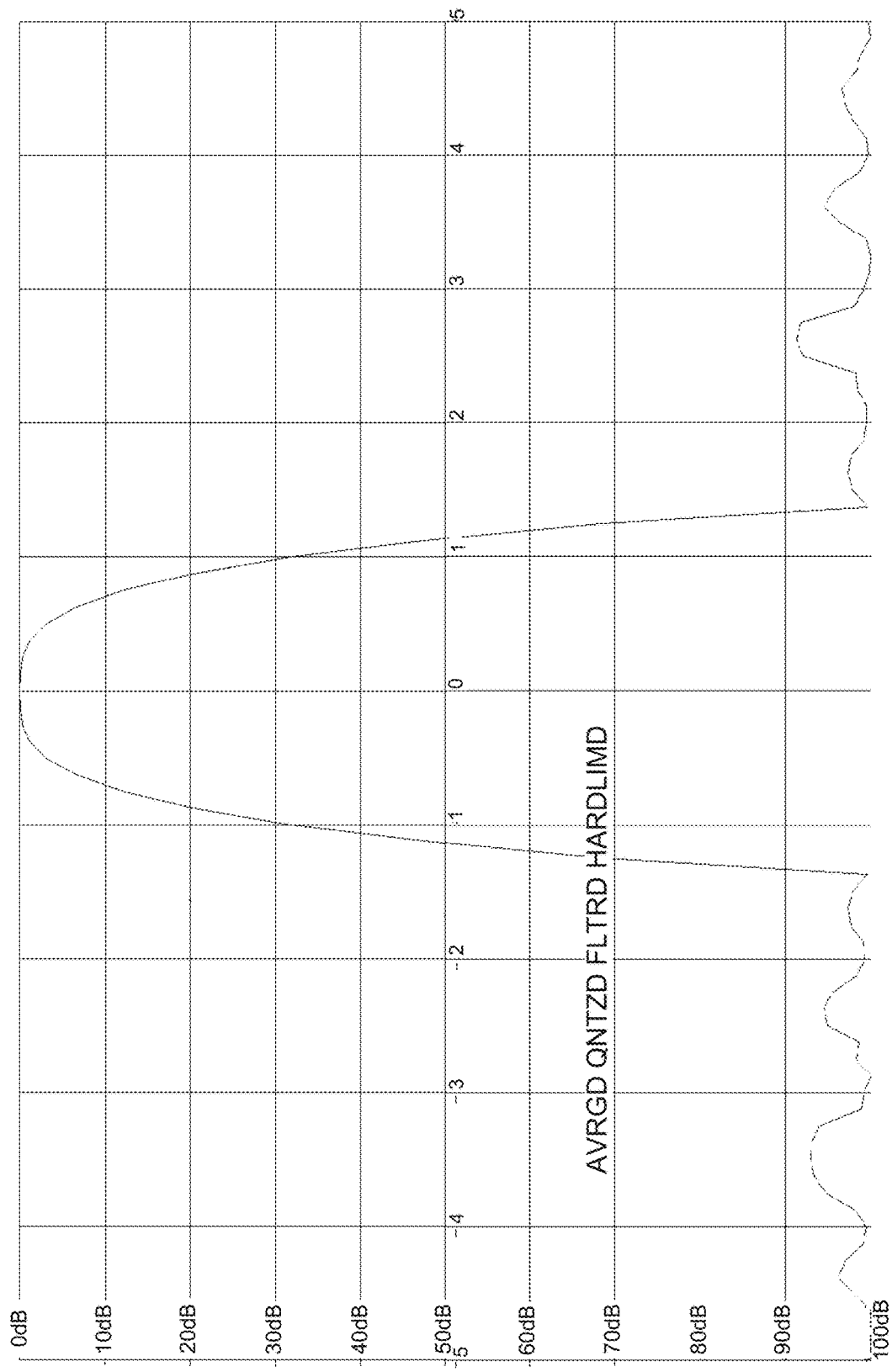
FIG. 37 is a graph illustrating the correlation sidelobes for the signals of FIGS. 35 and 36.

When sampling as coarse as 4 samples per bit, it is necessary to have a sharper cutoff in the post DAC filters to suppress sidelobes beyond +/−2 bitrates; for example, a Gaussian −3 dB cutoff in the region of 0.8 bitrates. Moreover, after hard limiting in the power amplifier, the correlation sidelobes were improved compared to using higher cutoff frequencies. The eye diagram, when using the above I,Q values, is illustrated in FIG. 35. The spectrum with a Gaussian post DAC filter BT factor of 0.8 is illustrated in FIG. 36, while the correlation sidelobes are illustrated in FIG. 37.

With 8 samples per bit, if the starting and ending sample values are as above at 90 degrees and 0 degrees respectively, then the middle sample 5 will be 45 degrees and samples 2, 3, and 4 will be at the same angles from 90 degrees, as samples 8, 6, and 7 will be from 0 degrees, so there are three variables to explore. Defining the quantity to be optimized, for example, as the total spectral energy beyond an exemplary +/−1.5 bitrates, it is within the computational capabilities of a PC to explore this as a function of three variables within a reasonable time if so desired.

Several methods have been discussed for optimizing a constant envelope modulation for use in a millimeter wave digital FMCW automotive radar with regard to the parameters that are important in such a system. The modulation is defined by a limited number of I,Q samples per bit, such as 4, 8, or 16, that are quantized in an optimum manner to a limited word length of, for example, 6, 7, or 8 bits. The I,Q samples are stored in memory (1030) from where they are recalled in dependence on the polarity of the modulation bits from a code generator, which may be precoded, and with regard to the current angular quadrant. Precoding and keeping track of the quadrant is performed by the state machine of I,Q selection logic (1020). The selected quantized I,Q samples are digital-to-analog converted using the above described analog-to-digital conversion techniques that shape the digital to analog quantization error noise to facilitate accurate subtraction of strong target echoes in the receiver by using a replica of the transmit modulator to generate a delayed, phase changed, and amplitude-weighted version that best matches the signal to be subtracted. The digital-to-analog converted analog signals are low-pass filtered by post digital-to-analog filters (1060A,B) and then a radar carrier signal is quadrature modulated at a desired center or mean frequency.

The exemplary embodiments disclosed herein cover many variations of constant envelope signals including GMSK, Raised Cosine shaped pulse-FM, and polynomial shaped pulse FM, and a person of normal skill in the art can derive many other variations using the principles exposed herein without departing from the spirit and scope of the invention as described by the attached claims.

The invention claimed is:

1. A radar system configured for mobile applications, the radar system comprising:
    a transmitter configured to transmit radio signals; and
    a receiver configured to receive radio signals that include transmitted radio signals transmitted by the transmitter and reflected from objects in the environment;
    wherein the transmitter is configured to frequency modulate the transmitted radio signal using a selected shaped frequency pulse, wherein the shaped frequency pulse is defined by a selected sequence of chips, and wherein each chip of the selected sequence of chips comprises a selected quantity of predetermined samples.

2. The radar system of claim 1, wherein the transmitter comprises a code generator configured to generate the selected sequence of chips at a selected chiprate, wherein a modulation interval between successive chips is a reciprocal of the chiprate.

3. The radar system of claim 1, wherein the transmitter comprises a modulator configured to perform the frequency modulation, and wherein the modulator is further configured to select a particular sequence of chips to realize a desired waveform.

4. The radar system of claim 3, wherein the transmitter further comprises a memory, and wherein the selected sequence of chips is selected from a plurality of chip sequences stored in the memory.

5. The radar system of claim 4, wherein the shaped frequency pulse is selected from a plurality of shaped frequency pulses, and wherein each chip sequence of the plurality of chip sequences defines a corresponding shaped frequency pulse.

6. The radar system of claim 3, wherein the plurality of chip sequences is configured such that the selection of different sequences of chips selectively realizes eight different waveforms.

7. The radar system of claim 3, wherein the desired waveform is defined by no more than three successive chips, wherein the desired waveform is defined by a selected quantity of I,Q sample values per chip, and wherein the selected quantity of I,Q sample values comprises one of 4, 8, and 16 samples per chip.

8. The radar system of claim 7, wherein the modulator comprises I and Q digital-to-analog converters, and wherein the I and Q digital-to-analog converters are configured to convert the corresponding I and Q sample values to I and Q analog signals.

9. The radar system of claim 8, wherein the modulator is configured to low-pass filter the I and Q analog signals and then modulate a carrier signal at a desired center frequency.

10. The radar system of claim 1, wherein the shaped frequency pulses correspond to a first signal, the frequency of which deviates from a desired center frequency during each of the modulation intervals according to a selected pulse shape.

11. A radar system configured for mobile applications, the radar system comprising:
    a plurality of transmitters configured for installation and use in a mobile application, wherein each transmitter of the plurality of transmitters is configured to generate a radio signal;
    a plurality of receivers configured for installation and use in the mobile application, wherein each receiver of the plurality of receivers is configured to receive radio signals that include transmitted radio signals transmitted by the transmitters and reflected from objects in the environment;
    wherein a first transmitter of the plurality of transmitters is configured to frequency modulate the transmitted radio signal using a shaped frequency pulse which is defined by a sequence of chips, wherein the sequence of chips is selected to realize a selected frequency pulse shape, and wherein each chip of the sequence of chips comprises a selected quantity of predetermined samples.

12. The radar system of claim 11, wherein the mobile application is a motor vehicle.

13. The radar system of claim 12, wherein transmitters of the plurality of transmitters are arranged within the motor vehicle.

14. The radar system of claim 11, wherein the first transmitter comprises a modulator configured to perform the frequency modulation, and wherein the modulator is configured to select a particular sequence of chips to realize a desired waveform.

15. The radar system of claim 14, wherein the first transmitter comprises a memory, and wherein the selected sequence of chips is selected from a plurality of chip sequences stored in the memory.

16. The radar system of claim 14, wherein the plurality of chip sequences is configured such that the selection of different sequences of chips selectively realizes eight different waveforms.

17. The radar system of claim 11, wherein the selected frequency pulse shape is selected from a plurality of shaped frequency pulses, and wherein each chip sequence of the plurality of chip sequences defines a corresponding shaped frequency pulse.

18. A radar system for a vehicle, the radar system comprising:
    a transmitter configured for installation and use on a vehicle, and configured to transmit a radio signal; and
    a receiver configured for installation and use on the vehicle, and configured to receive radio signals that include radio signals transmitted by the transmitter and reflected from objects in the environment;
    wherein the transmitter comprises a modulator configured to frequency modulate the transmitted radio signal, wherein the modulator is configured to generate a selected sequence of chips, wherein the selected sequence of chips is selected to realize a desired waveform, and wherein each chip of the selected sequence of chips comprises a selected quantity of predetermined samples.

19. The radar system of claim 18, wherein the transmitter comprises a memory configured to store a plurality of chip sequences, and wherein the modulator is configured to select a sequence of chips from the memory to realize the desired waveform.

20. The radar system of claim 18, wherein the frequency modulation is defined by a selected shaped frequency pulse which is a frequency deviation pulse shape defined by the selected sequence of chips, and wherein the limited quantity of samples comprises one of 4, 8, and 16 samples per chip.

* * * * *